US006859445B1

United States Patent
Moon et al.

(10) Patent No.: US 6,859,445 B1
(45) Date of Patent: Feb. 22, 2005

(54) CHANNEL ASSIGNMENT APPARATUS AND METHOD FOR A COMMON PACKET CHANNEL IN A WCDMA MOBILE COMMUNICATION SYSTEM

(75) Inventors: Hi-Chan Moon, Seoul (KR); Jae-Min Ahn, Songnam-shi (KR); Hyun-Seok Lee, Songnam-shi (KR); Hee-Won Kang, Seoul (KR); Seong-Ill Park, Kunpo-shi (KR); Ho-Kyu Choi, Seoul (KR); Sung-Oh Hwang, Yongin-shi (KR); Chang-Hoi Koo, Kyonggi-do (KR); Hyun-Woo Lee, Suwon-shi (KR); Sung-Ho Choi, Seongnam-shi (KR); Jae-Yoel Kim, Kunpo-shi (KR); Hyun-Jung Mun, Namyangju-shi (KR); Kyou-Woong Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 620 days.

(21) Appl. No.: 09/611,590

(22) Filed: Jul. 7, 2000

(30) Foreign Application Priority Data

| Jul. 7, 1999 | (KR) | 1999-27166 |
|---|---|---|
| Jul. 21, 1999 | (KR) | 1999-29658 |
| Aug. 11, 1999 | (KR) | 1999-32862 |
| Aug. 19, 1999 | (KR) | 1999-34489 |
| Aug. 23, 1999 | (KR) | 1999-35058 |
| Oct. 14, 1999 | (KR) | 1999-45178 |
| Jan. 10, 2000 | (KR) | 2000-00984 |
| Feb. 11, 2000 | (KR) | 2000-07195 |
| Feb. 15, 2000 | (KR) | 2000-07166 |

(51) Int. Cl.[7] .............................................. H04J 13/00
(52) U.S. Cl. ........................................ 370/335; 370/342
(58) Field of Search .............................. 370/441, 445, 370/462, 335, 336, 337, 342

(56) References Cited

U.S. PATENT DOCUMENTS 5,430,760 A  7/1995  Dent ........................... 375/200

| 5,884,171 A | 3/1999 | Tanabe et al. | 455/434 |
|---|---|---|---|
| 6,256,301 B1 * | 7/2001 | Tiedemann et al. | 370/342 |
| 6,259,724 B1 * | 7/2001 | Esmailzadeh | 375/143 |
| 6,393,013 B1 * | 5/2002 | Masui et al. | 370/346 |
| 6,480,525 B1 * | 11/2002 | Parsa et al. | 375/141 |

FOREIGN PATENT DOCUMENTS

| EP | 0 565 507 A2 | 10/1993 | ........... H04B/7/005 |
|---|---|---|---|
| EP | 0 765 096 A2 | 8/1996 | |
| EP | 0 877 512 A2 | 5/1998 | |

OTHER PUBLICATIONS

Japanese Office Action dated Dec. 9, 2003 issued in a counterpart application, namely, Appln. No. 2001–509167.

Samsung Electronics Co., "Enhanced CPCH Procedure", TSG–RAN Working Group 1, Meeting #6, Jul. 13–16, 1999.

Golden Bridge Technology, "Overview of System–Wide CPCH Access Procedures", TSG RAN WG 1#5 Jun. 1–4, 1999.

European Search Report dated Aug. 27, 2003 issued in a counterpart application, namely, Appln. No. 03015470.2.

* cited by examiner

*Primary Examiner*—Min Jung
(74) *Attorney, Agent, or Firm*—Dilworth & Barrese LLP

(57) ABSTRACT

A common packet channel assignment method and device in a CDMA (Code Division Multiple Access) communication system is disclosed. The method comprises transmitting an access preamble signal having channel information which is used to access a base station, and then receiving an; access preamble acquisition indicator signal from the base station in response to the access preamble signal. A collision detection preamble for detecting a collision is transmitted in response to the received access preamble acquisition indicator signal. A first signal indicating acquisition of the collision detection preamble and a second signal indicating channel assignment are received, both of which the base station has transmitted in response to the collision acquisition signal. Upon receipt of the first signal, a common packet channel is assigned according to information designated by the second signal.

22 Claims, 39 Drawing Sheets

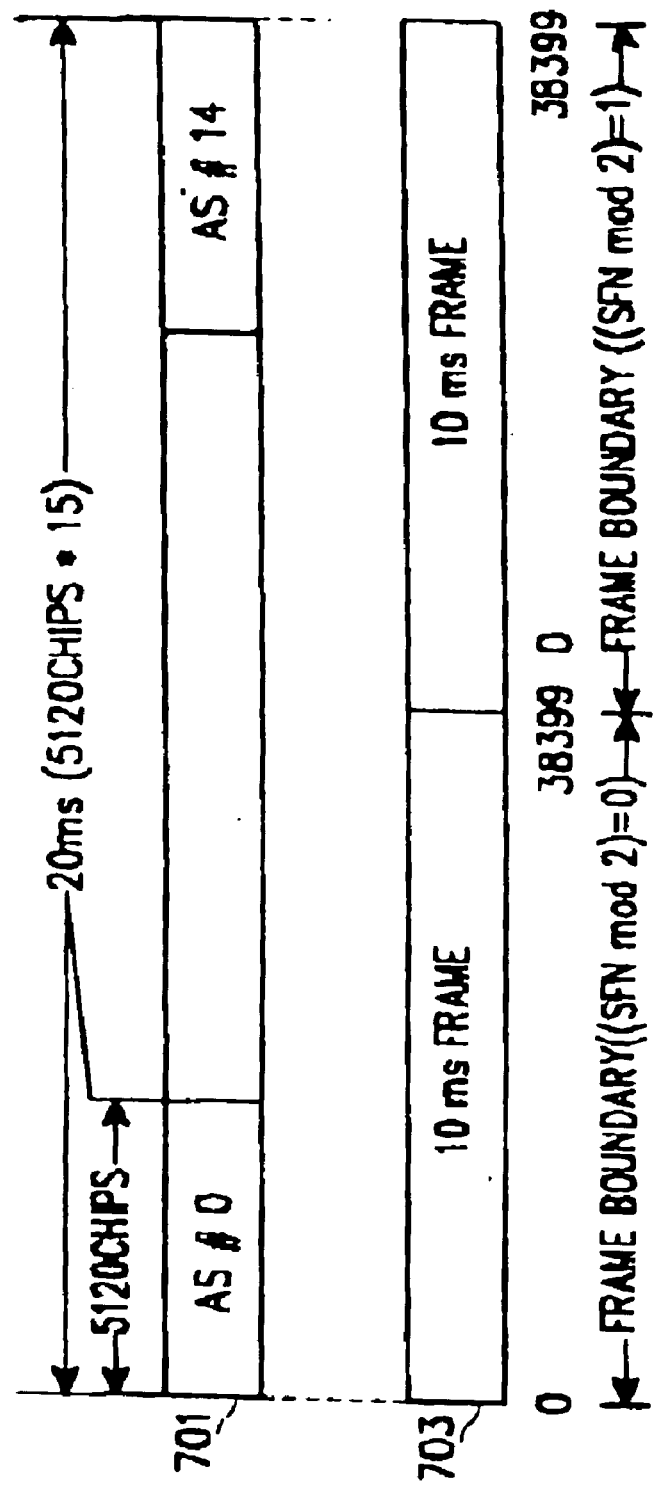

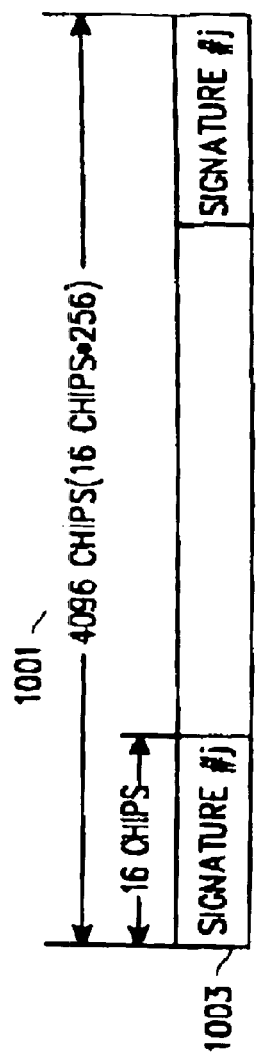
FIG. 10A
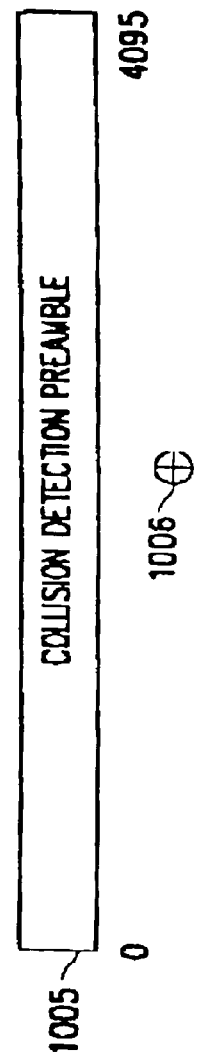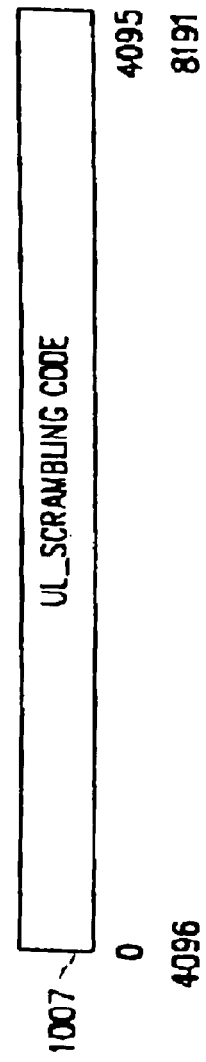
FIG. 10B

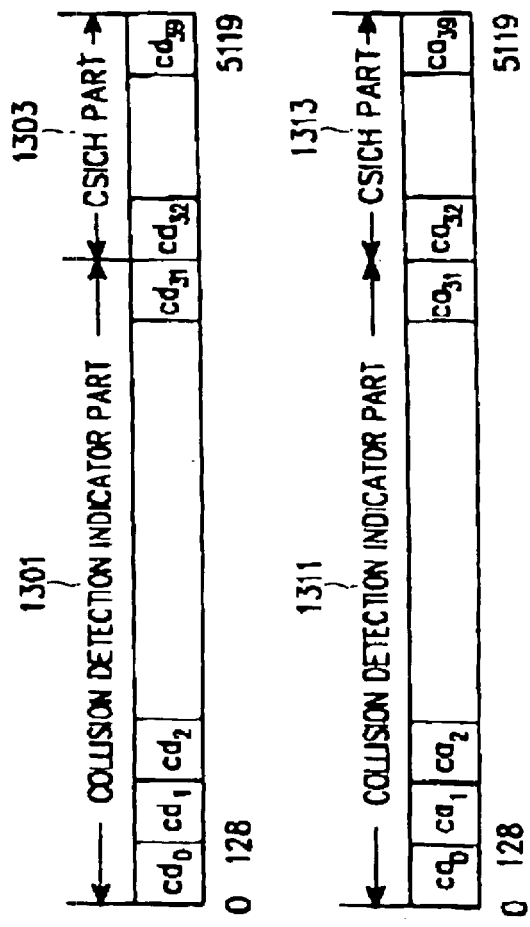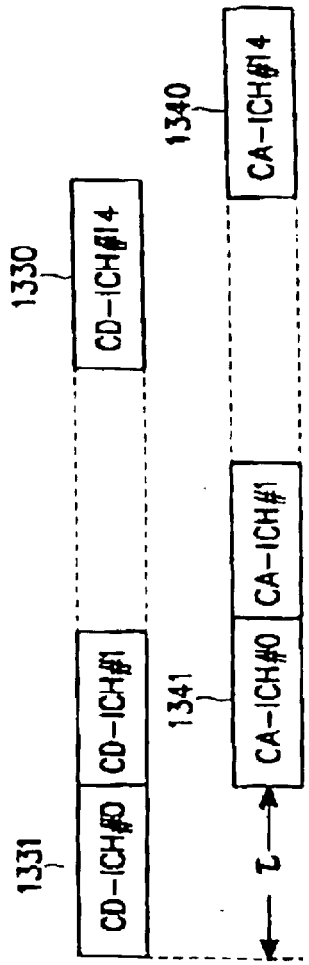

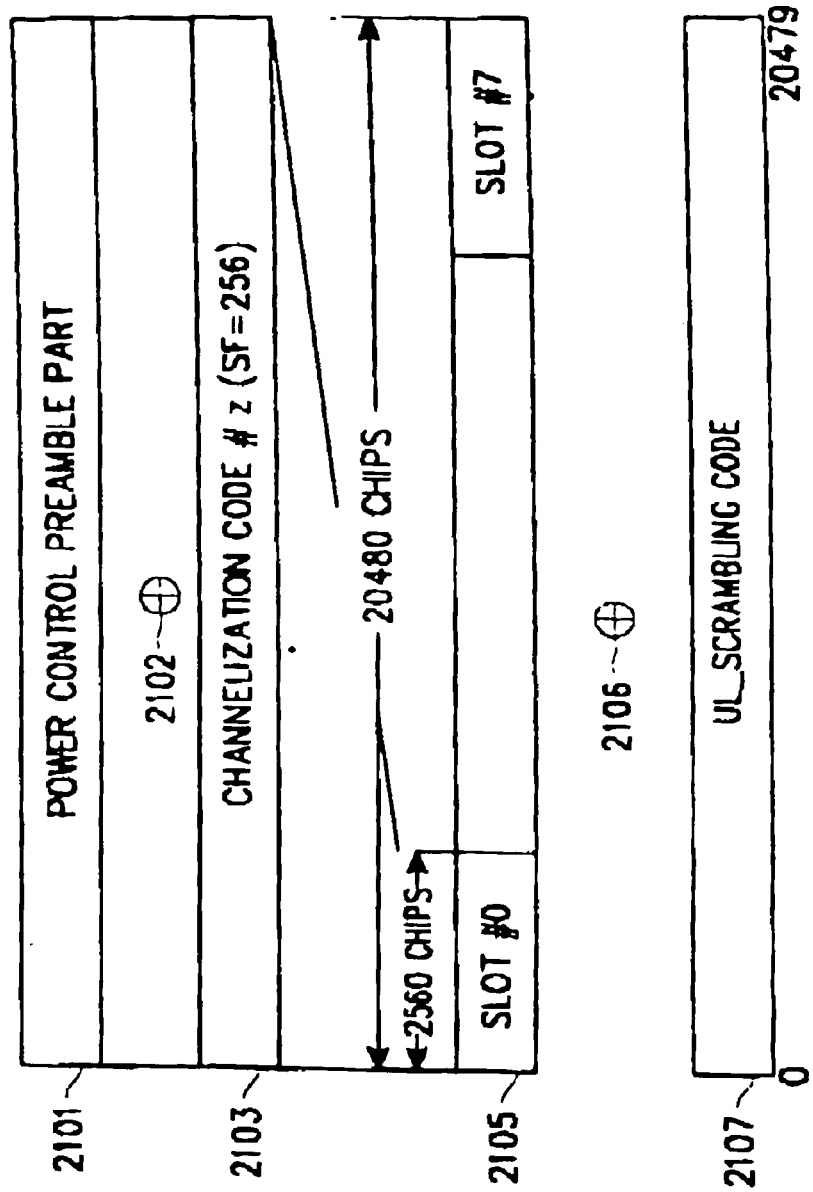

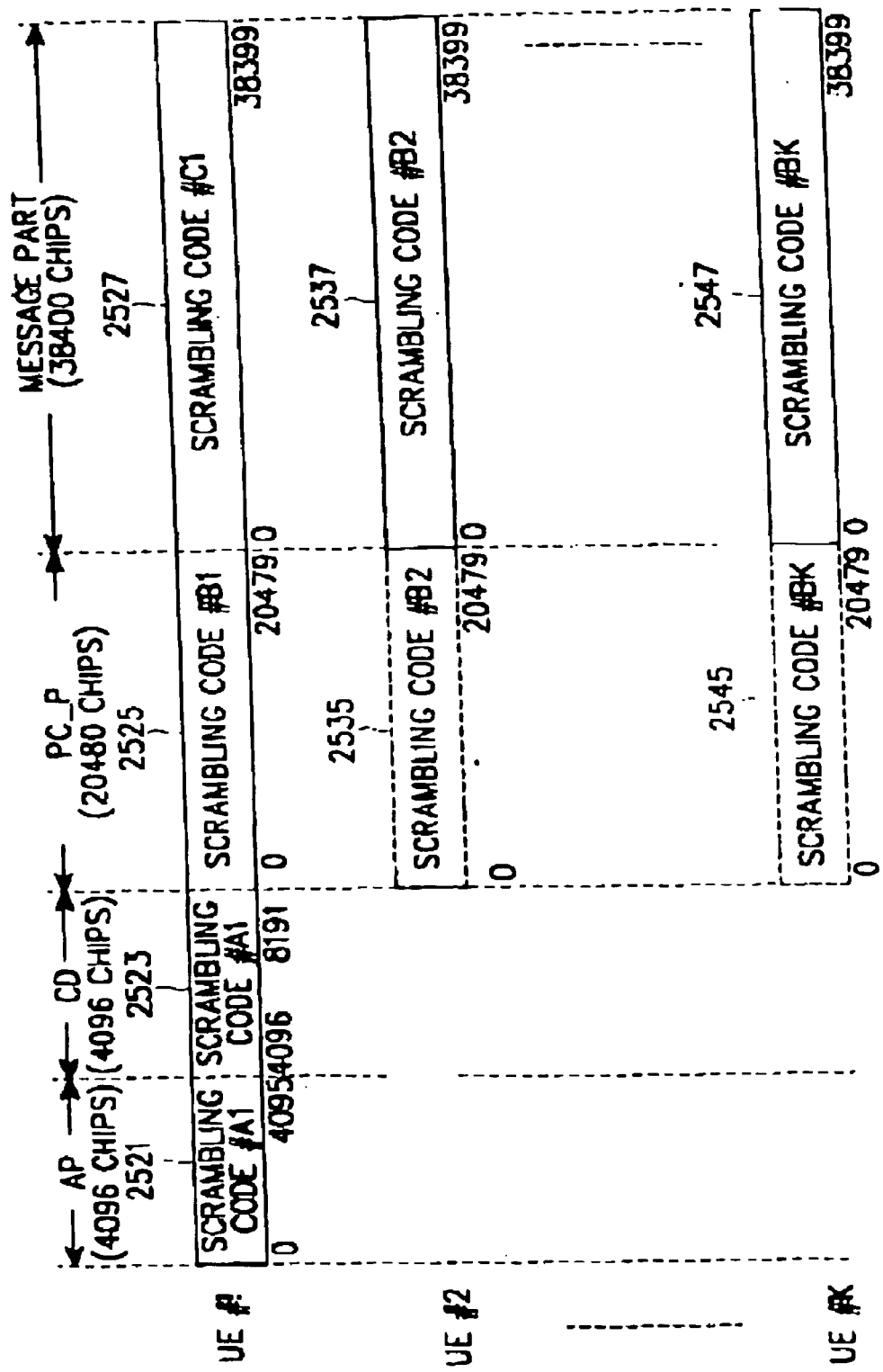

CHANNEL ASSIGNMENT APPARATUS AND METHOD FOR A COMMON PACKET CHANNEL IN A WCDMA MOBILE COMMUNICATION SYSTEM

PRIORITY

This application claims priority to applications entitled "Apparatus and Method for Communicating Data over Common Packet Channel in CDMA Communication System" filed in the Korean Industrial Property Office on Jul. 7, 1999 and allocated Serial No. 99-27166, "Apparatus and Method For Communicating Jacket Using Common Channel In CDMA Communication System" filed in the Korean Industrial Property Office on Jul. 21, 1999 and allocated Serial No. 99-29658, "Apparatus and Method For Communicating Packet Using Common Channel In CDMA Communication System" filed in the Korean Industrial Property Office on Aug. 11, 1999 and allocated Serial No. 99-32862, "Apparatus and Method For Acquisition Indication In CDMA System" filed in the Korean Industrial Property Office on Aug. 19, 1999 and allocated Serial No. 99-34489, "Apparatus and Method For Acquisition Indication In CDMA System" filed in Korean Industrial Property Office on Aug. 23, 1999 and allocated Serial No. 99-35058, "Apparatus and Method For Acquisition Indication In CDMA System" filed in Korean Industrial Property Office on Oct. 14, 1999 and allocated Serial No. 99-45178, "Apparatus and Method For Communicating Using Common Packet Channel In CDMA System" filed in the Korean Industrial Property Office on Jan. 10, 2000 and allocated Serial No. 2000-984, "Apparatus and Method For Communicating Using Common Packet Channel In CDMA System" filed in Korean Industrial Property Office on Feb. 15, 2000 and allocated Serial No. 2000-7166, and "Apparatus and Method For Communicating Using Common Packet Channel In CDMA System" filed in Korean Industrial Property Office on Mar. 23, 2000 and allocated Serial No. 2000-7195, the contents of all of which are hereby incorporated by reference.

BACKGROUND OF THE INVENTION

1. Field of the Invention

The present invention relates generally to a common channel communication apparatus and method for a Code Division Multiple Access (CDMA) communication system, and in particular, to an channel assignment apparatus and method for common packet channel in a wideband CDMA (W-CDMA or WCDMA) mobile communication system.

2. Description of the Related Art

Wideband CDMA communication systems, such as the UMTS (Universal Mobile Telecommunications System) W-CDMA (Wideband Code Division Multiple Access) communication system, which is a planned future mobile communication system, use a random access channel (RACH) and a common packet channel (CPCH) for an uplink (or reverse) common channel.

FIG. 1 is a diagram for explaining how to transmit and receive a message over the RACH, which is one of the uplink common channels, in a W-CDMA communication system.

In FIG. 1, reference numeral 151 indicates a signal transmission procedure of an uplink channel, for which the RACH may be used. The RACH is one of the common channels, over which a user equipment (UE, or a mobile station) transmits a signal to a UMTS terrestrial radio access network (UTRAN, or a base station). Further, reference numeral 111 indicates a signal transmission procedure of a downlink (or forward) channel, for which an access preamble-acquisition indication channel (AICH) may be used. The AICH is a channel over which the UTRAN responds to a preamble upon receipt of the preamble signal transmitted over the RACH. The preamble transmitted over the RACH is an access preamble (AP), which is created by selecting one of the signatures for the RACH.

The RACH consists of a preamble part and a message part. To transmit a message over the RACH, the UE selects an access service class (ASC) according to the type of transmission data, selects a RACH sub-channel group, which is defined in the ASC, and transmits the AP to the UTRAN at the selected RACH sub-channel. Thereafter, the AP signal is acquired by the UTRAN. The UTRAN response to the AP signal over the AICH. If the UE receives an acknowledgment AICH signal from the UTRAN, the UE transmits the RACH message part signal to the UTRAN.

Referring to FIG. 1, the UE transmits an AP of specific length using a signature, represented by 162, and then awaits a response from the UTRAN for a predetermined time $\tau_{P-P}$. If there is no response from the UTRAN for the predetermined time $\tau_{P-P}$, the UE increases transmission power by a specific level as represented by 164 and retransmits the AP at the increased transmission power. Upon detecting the AP transmitted over the RACH, the UTRAN transmits a signature of the detected AP after a predetermined time $\tau_{P-AP\_A1}$, represented by 122, over the AICH for the downlink. After transmitting the AP, the UE examines the AICH in order to detect the signature used for the AP. If the signature used for the AP transmitted over the RACH is detected, the UE judges that the UTRAN has detected the AP, and transmits a RACH message and control part after a predetermined time $\tau_{AP\_AI-MSC}$, represented by 170, over the RACH.

Otherwise, upon failure to receive the AICH signal transmitted from the UTRAN within a set time ($\tau_{p-p}$) after transmission of the AP 162, or upon failure to detect the transmitted signature from the received AICH, the UE judges that the UTRAN has failed to detect the AP, and retransmits the AP after a lapse of a preset time ($\tau_{p-p}$). At this point, the AP is retransmitted at a transmission power increased by ΔP (dB), represented by 164, as compared with the transmission power at which the AP was previously transmitted. For the retransmitted AP, a signature can be used which is randomly selected from the signatures defined in the ASC selected by the UE. If the AICH signal using the signature transmitted by the UE itself is not received from the UTRAN after transmission of the AP, the UE changes, after a lapse of a set time ($\tau_{P-P}$), the transmission power and signature of the AP and repeatedly performs the above operation. When the AICH signal is received and if the signature transmitted by the UE itself is received, the UE spreads, after a lapse of a preset time ($\tau_{P-AP\_A1}$), the RACH message 170 with a scrambling code for the signature, and transmits the spread RACH message using a predetermined channelization code at transmission power which will be determined with consideration of the AP transmission power.

As described above, it is possible for the UTRAN to efficiently detect the AP and to readily set the initial power of an uplink common channel message by using the AP. However, the uplink common channels, such as the RACH, are not power controlled channels. Accordingly it is very difficult for the uplink common channel to transmit a packet data because the packet data has a long transmission time or requires a high data rate. In the long transmission time or the high data rate transmission, the power control is essential to transmit data without an error. In addition, since the UTRAN allocates the RACH through one AP_AICH (Access Preamble Acqusition Indicator Channel), the same channel may be allocated to several UEs that have transmitted the AP using the same signature. In this case, the data transmitted by the different UEs collide with one another, so that the UTRAN cannot receive the data.

To solve this problem, a method for suppressing a collision between the UEs while power controlling the uplink common channel has been proposed for the W-CDMA system. This method is called the CPCH (Common Packet Channel). The CPCH enables power control of the uplink common channel, and shows a high reliability as compared with the RACH in allocating the channel to different UEs. Further, the CPCH is a common channel over which the UE can transmit high rate data for a predetermined time (from several tens to several hundreds of ms). One purpose of using the CPCH is to enable the UE to quickly transmit an uplink transmission message, which is smaller in size than a specific value, to the UTRAN without using a dedicated channel.

That is, in order to establish a dedicated channel, many related control messages are exchanged between the UE and the UTRAN, and a long message transmission/reception time is required. Therefore, when the dedicated channel is allocated to transmit data of a small size (e.g., data of a comparatively small size of several tens to several hundreds of ms), exchanging the many control messages during channel assignment becomes a needlessly large amount of overhead. Thus, it is more effective to use the CPCH, when transmitting data of a small size.

However, since several UEs transmit preambles using several signatures in order to acquire the right of using the CPCH from the UTRAN, there may occur a collision between the UEs. To avoid this phenomenon, a method is needed for allocating the right of using the CPCH to the UEs.

The W-CDMA communication system uses a downlink scrambling code to distinguish the UTRANs, and uses an uplink scrambling code to distinguish the UEs. Further, the channels transmitted from the UTRAN are distinguished using an orthogonal variable spreading factor (OVSF) code, and the channels used in the UE are also distinguished using the OVSF code.

Therefore, the information required by the UE to use the CPCH, includes a scrambling code used for a message part of the uplink (or reverse) CPCH channel, an OVSF code used for the message part (UL_DPCCH) of the uplink CPCH, an OVSF code used for a data part (UL_DPDCH) of the uplink CPCH, a maximum data rate of the uplink CPCH, and a channelization code for a downlink (or forward) dedicated channel (DL_DPCCH) used for power control of the CPCH. The above information is typically required when establishing a dedicated channel between the UTRAN and the UE. Further, the above information is transmitted to the UE through transmission (overhead) of signals before establishment of the dedicated channel. However, since the CPCH is a common channel rather than a dedicated channel, the above information can be conventionally represented by a combination of the signatures used in the AP and the CPCH sub-channels, which is similar to the ASC used in the RACH, in order to allocate the information to the UE.

FIG. 2 shows a conventional signal transmission procedure of the downlink and uplink common channels. In FIG. 2, in addition to the method used for the RACH for transmitting the AP, a collision detection preamble (CDP) is used to prevent a collision between CPCH signals from the different UEs.

In FIG. 2, reference numeral 211 indicates an operating procedure of an uplink channel performed when the UE operates to be allocated the CPCH, and reference numeral 201 indicates an operating procedure of the UTRAN to allocate the CPCH to the UE. In FIG. 2, the UE transmits the AP 213. A signature constituting the AP 213 can be selected from a signature group used in the RACH or the same signature for the RACH. If the signature for CPCH is identical to the signature for RACH., the signature for CPCH can be distinguished from the signature for RACH by using different scrambling codes. The signature constituting the AP is selected by the UE based on the followed-stated information, and such a method is different from the method where the RACH randomly selects the signature. That is, onto each signature are mapped an OVSF code to be used for the UL_DPCCH, an OVSF code to be used for the UL_DPDCH, a UL_Scrambling code to be used for CPCH, an OVSF code for DL_DPCCH, the maximum frame number which indicates the length of data, and a data rate which indicates the data transmission speed. Therefore, selecting one signature is equivalent to selecting six kinds of the information mapped to the corresponding signature. In addition, the UE examines a status of the CPCH channel by using CSICH (CPCH Status Indicator Channel) before transmitting AP. The CSICH using an ending part of the $AP_{13}$ AICH is transmitted by the UTRAN. The UE transmits the AP after selecting the signatures used for the CPCHS that are available at present. The AP 213 is transmitted to the UTRAN at initial transmission power set by the UE. In FIG. 2, if there is no response from the UTRAN within a time 212, the UE retransmits the AP 215 at a greater transmission power than that of the first AP transmission. Before the CPCH channel acquisition process, the retransmission number of the AP and the waiting time 212 are set, and the UE stops the CPCH channel acquisition process when the retransmission number exceeds a set value.

Upon receipt of the AP 215, the UTRAN compares the received AP with the APs received from other UEs. Upon selecting the AP 215, the UTRAN transmits AP_AICH 203 as ACK after a lapse of a time 202. There are several criteria based on which the UTRAN compares the received APs to select the AP. 215. For example, the criteria may correspond to a case where the CPCH, for which the UE has requested the UTRAN through the AP, is available, or a case where the receiving power of the AP satisfies the minimum receiving power requested by the UTRAN. The AP_AICH 203 includes a value of the signature that constitutes the AP 215, are received and selected by the UTRAN.

If the signature transmitted by the UE itself is included in the AP_AICH 203 after transmitting the AP 215, the UE transmits a collision detection preamble CD_P 217 after a lapse of a time 214. A reason for transmitting the CD_P 217 is to prevent a collision between the UEs. In other words, many UEs belonging to the UTRAN may request the right of using the same CPCH by simultaneously transmitting the same AP to the UTRAN, and as a result, the UEs receiving the same AP_AICH may try to use the same CPCH, thereby causing a collision. To prevent such a collision, the UE transmits the CDP and the UTRAN selects one UE among the UEs which had transmitted the same AP and have transmitted the different CD_P.

The detailed operation of the UE and UTRAN is as follows. To prevent a collision, each of the UEs which have simultaneously transmitted the same AP, selects the signature to be used for the CD_P and transmits the CD_P. Upon receipt of the CD_Ps, the UTRAN can select one of the received CDPs and respond to the selected CDP. For example, a criterion for selecting the CD_P can be a receiving power level of the CD_P received from the UTRAN. For the signature constituting the CD_P 217, one of the signatures for the AP can be used, and it can be selected in the same manner as in the RACH. That is, it is possible to select randomly one of the signatures used for the CD_P and transmit the selected signature. In addition, for the CD_P, only one signature can be set and used. When there is only one signature used for the CD_P, the UE transmits the CD_P at a specific time point during a certain time period. This method can distinguish the UEs which use one signature for CD_P but use a different transmission point.

Upon receipt of the CD_P 217, the UTRAN compares the received CD_P with the CD_Ps received from other UEs to select a UE which can use the CPCH. Upon selecting the CD_P 217, the UTRAN transmits a collision detection indicator channel (CD_ICH) 205 to the UE after a lapse of a time 206. CD_ICH has the same structure and function as AP_AICH in the RACH transmission. But CD_ICH transmits only one ACK. Upon receipt of the CD_ICH 205 transmitted from the UTRAN, the UEs check whether a value of the signature used for the CD_P transmitted by themselves (i.e., CD_ACK) is included in the CD_ICH 205, and the UE, for which the signature used for the CD_P is included in the CD_ICH 205, transmits a power control preamble (PC_P) 219 after a lapse of a time 216. The PC_P 219 uses an uplink scrambling code determined while the UE determines a signature to be used for the AP, and the same channelization code (OVSF) as a control part (UL_DPCCH) 221 during transmission of the CPCH. The PC_P 219 is comprised of pilot bits, power control command bits, and feedback information bits. The PC_P has a length of 0 or 8 slots. The slot is a basic transmission unit used when the UMTS system transmits a physical channel, and has a length of 2560 chips when the UMTS system uses a chip rate of 3.84 Mcps (chips per second). When the length of the PC_P 219 is 0 slots, the present radio environment between the UTRAN and the UE is good, so that there is no need to control transmission power of CPCH message part and the CPCH message part can be transmitted at the transmission power determined by the UE in consideration of the transmission power of CD_P. When the length of the PC_P 219 is 8 slots, it is necessary to control transmission power of the CPCH message part.

The AP 215 and the CD_P 217 may use the scrambling codes which have the same initial value but have different start points. For example, the AP can use 0th to 4095$^{th}$ scrambling codes of length 4096, and the CD_P can use 4096$^{th}$ to 81915$^{th}$ scrambling codes of length 4096. The AP and CD_P can use the same part of the scrambling code having the same initial value, and such a method is available when the W-CDMA system separates the signatures used for the uplink common channel. into the signatures for the RACH and the signatures for the CPCH. For the scrambling code used for the PC 219, are used the 0$^{th}$ to 21429$^{th}$ values of the scrambling code having the same initial value as the scrambling code used for AP 215 and CD_P 217. Alternatively, for the scrambling code for the PC_P 219, a different scrambling code can also be used which is mapped one-to-one with the scrambling code used for AP 215 and CD_P 217.

Reference numerals 207 and 209 denote a pilot field and a power control command field, respectively, of a dedicated physical control channel (DL_DPCCH) which is a part of downlink dedicated physical channels (DL_DPCHs). The DL_DPCCH can use a primary downlink scrambling code for distinguishing the UTRANs and can also use a secondary scrambling code for expanding the capacity of the UTRAN. The channelization code OVSF to be used for the DL_DPCCH is a channelization code which is determined when the UE selects the signature for the AP. The DL_DPCCH is used when the UTRAN performs power control on the PC_P or CPCH message transmitted by the UE. The UTRAN measures receiving power of a pilot field of the PC_P 219 upon receipt of the PC_P, and controls transmission power of the uplink transmission channel transmitted by the UE, using the power control command 209. The UE measures power of a DL_DPCCH signal received from the UTRAN to apply a power control command to the power control field of the PC_P 219, and transmits the PC_P to the UTRAN to control transmission power of a downlink channel incoming from the UTRAN.

Reference numerals 221 and 223 denote a control part UL_DPCCH and a data part UL_PDCH of the CPCH message, respectively. For a scrambling code for spreading the CPCH message of FIG. 2, a scrambling code is used which is identical to the scrambling code used for the PC_P 219. For the used scrambling code, are used 0$^{th}$ to 38399$^{th}$ scrambling codes of length 38400 in a unit of 10 ms. The scrambling code used for the message of FIG. 2 can be either equal to the scrambling code used for the AP 215 and the CD_P 217, or a different scrambling code which is mapped one-to-one. The channelization code OVSF used for the data part 223 of the CPCH message is determined according to a method previously appointed between the UTRAN and the UE. That is, since the signature to be used for the AP and the OVSF code to be used for the UL_DPDCH are mapped, the OVSF code to be used for the UL_DPDCH is determined by determining the AP signature to be used. For the channelization code used by the control part (UL_DPCCH) 221, a channelization code is used which is identical to the OVSF code used by the PC_P. When the OVSF code to be used for the UL_DPDCH is determined, the channelization code used by the control part (UL_DPCCH) 221 is determined according to an OVSF code tree structure.

Referring to FIG. 2, the prior art enables power control of the channels in order to increase an efficiency of the CPCH and decreases the chance of a collision between uplink signals from the different UEs, by using the CD_P and the CDICH. In the prior art, the UE selects all the information for using the CPCH and transmits the selected information to the UTRAN. This selecting method can be performed by combining a signature of the AP transmitted from the UE, a signature of the CD_P and the CPCH sub-channel. In the prior art, the UE requests an assignment of the certain CPCH channel by analyzing CSICH which transmits the present status of CPCH in the UTRAN and the information is predetermined by the UE in consideration of the data transmitted over CPCH. That is, the assignment of CPCH depends on the UE and not on the UTRAN. Accordingly, even though the UTRAN has the CPCHs which have the same characteristic required by the UE, if the UE requires a specific CPCH the UTRAN cannot assign a CPCH to the UE. So this will cause a limitation in assignment of the CPCH channel and a delay in acquiring the CPCH.

The limitations in assignment of the CPCH channel are as follows. There exist several available CPCHs in the UTRAN. If the UEs in the UTRAN require the same CPCH, the same AP will be selected. Although the same AP_AICH is received and the CD_P is transmitted again, the UEs which transmitted the non-selected CD_P should start the process for allocating the CPCH from the beginning. In addition, although the CD_P selecting process is performed, many UEs still receive the same CD_ICH and are increasing a probability that a collision will occur during uplink transmission of the CPCH. Moreover, even if the CSICH is checked and the UE requests the assignment of the CPCH in consideration of the current CPCH status transmitted over the CSICH, all the UEs in the UTRAN which desire to use the CPCH receive the same CSICH. Therefore, even though an available channel is required out of the CPCHs, there is a case where several UEs simultaneously requests a channel assignment of a specific CPCH. In this case, the UTRAN cannot but allocate the CPCH requested by the several UEs to only one UE, even though there are other CPCHs which can be allocated. This is due to the channel assignment determined by the UE.

With regard to a delay in acquiring the channel, when the case occurs which has been described with reference to the limitations in assignment of the CPCH channel, the UE should repeatedly perform the CPCH assignment request to allocate the desired CPCH channel. When there is used a method for transmitting the CDP at a given time for a predetermined time using only one signature for the CD_P introduced to reduce the complexity of the system, it is not possible to process the CD_ICH of other UEs while transmitting and processing the CD_ICH of one UE.

In addition, in the prior art, one uplink scrambling code is used in association with one signature used for the AP. Thus, whenever the CPCH used in the UTRAN increases in number, the uplink scrambling code also increases in number, causing a waste of the resources.

SUMMARY OF THE INVENTION

It is, therefore, an object of the present invention to provide a device and method for transmitting a message over a common channel in a CDMA communication system.

It is another object of the present invention to provide a downlink acquisition indicator channel (AICH) over which a receiver of an UE can receive an acquisition indicator transmitted with a low complexity.

It is further another object of the present invention to provide a receiving method for a UTRAN, which can simply detect several signatures transmitted over the downlink acquisition indicator channel.

It is yet another object of the present invention to provide a channel assignment method in order to perform efficient power control on an uplink common channel over which a message is transmitted in a CDMA communication system.

It is still another object of the present invention to provide a channel assignment method for a quick assignment of an uplink common channel over which a message is transmitted in a CDMA communication system.

It is still another object of the present invention to provide a reliable channel assignment method for an assignment of an uplink common channel over which a message is transmitted in a CDMA communication system.

It is still another object of the present invention to provide a method for correcting errors occurring in an uplink common channel assignment method for transmitting a message over a common channel in a CDMA communication system.

It is still another object of the present invention to provide a method for detecting and managing a collision of an uplink between UEs in an uplink common channel communication method for transmitting a message over a common channel in a CDMA communication system.

It is still another object of the present invention to provide a device and method for allocating a channel so as to transmit a message over an uplink common channel in a W-CDMA communication system.

It is still another object of the present invention to provide a device and method which can detect an error which has occurred in a channel assignment message or a channel request message in an uplink common channel communication method for transmitting a message over a common channel in a CDMA communication system.

It is still another object of the present invention to provide a method for correcting an error which has occurred in a channel assignment message or a channel request message in an uplink common channel communication system for transmitting a message over a common channel in a CDMA communication system.

It is still another object of the present invention to provide a device and method which uses a power control preamble to detect an error which has occurred in a channel assignment message or a channel request message in an uplink common channel communication method for transmitting a message over a common channel in a CDMA communication system.

It is still another object of the present invention to provide a method for dividing uplink common channels into a plurality of groups and efficiently managing each group.

It is still another object of the present invention to provide a method for dynamically managing radio resources allocated to the uplink common channels.

It is still another object of the present invention to provide a method for efficiently managing uplink scrambling codes allocated to the uplink common channels.

It is still another object of the present invention to provide a method in which the UTRAN informs the UE of the present status of the uplink common channel.

It is still another object of the present invention to provide a device and method for transmitting information, with increased reliability, used when the UTRAN informs the UE of the present status of the uplink common channel.

It is still another object of the present invention to provide a coding device and method for transmitting information, with increased reliability, used when the UTRAN informs the UE of the present status of the uplink common channel.

It is still another object of the present invention to provide a device and method for enabling the UE to rapidly know the present status of the uplink common channel transmitted from the UTRAN.

It is still another object of the present invention to provide a method for determining whether the UE uses an uplink common channel in consideration of the status of the uplink common channel transmitted by the UTRAN.

To achieve the above and other objects, there is provided a common packet channel assignment method for user equipment in a CDMA communication system. The method comprises transmitting an access preamble signal having channel information used to access a base station; receiving an access preamble acquisition indicator signal received from the base station in response to the access preamble signal; transmitting a collision detection preamble for detecting a collision in response to the received access preamble acquisition indicator signal; receiving a first signal indicating acquisition of the collision detection preamble and a second signal indicating channel assignment, that the base station has transmitted in response to the collision acquisition signal; and upon receipt of the first signal, allocating a common packet channel according to information designated by the second signal.

BRIEF DESCRIPTION OF THE DRAWINGS

The above and other objects, features and advantages of the present invention will become more apparent from the following detailed description when taken in conjunction with the accompanying drawings in which:

FIG. 7 is a diagram illustrating a structure of an access slot used for transmitting an access preamble according to an embodiment of the present invention;

FIG. 8A is a diagram illustrating a structure of an uplink scrambling code according to the prior art;

FIG. 8B is a diagram illustrating a structure of an uplink scrambling code according to an embodiment of the present invention;

FIGS. 10A and 10B are diagrams illustrating a structure of a collision detection preamble according to an embodiment of the present invention, and a scheme for generating the same;

FIGS. 13A and 13B are diagrams illustrating an CA_ICH according to an embodiment of the present invention;

FIG. 21 is a diagram illustrating a structure of a PC_P shown in FIG. 20;

FIG. 25B is a diagram illustrating a method for transmitting the PC_P using the method of FIG. 25A;

DETAILED DESCRIPTION OF THE PREFERRED EMBODIMENT

Preferred embodiments of the present invention will be described herein below with reference to the accompanying drawings. In the following description, well-known functions or constructions are not described in detail since they would obscure the invention in unnecessary detail.

In a CDMA communication system, according to the preferred embodiments of the present invention, the UE checks a status of the uplink common channel through the CSICH and transmits a desired access preamble (AP) to the UTRAN in order to transmit a message to the UTRAN over the uplink common channel. The UTRAN then acquires the transmitted AP and transmits a response signal (or access preamble acquisition indication signal) transmitted over the access preamble acquisition indication channel (AP_AICH) to the UE. Upon receipt of the access preamble acquisition indication signal, the UE transmits a collision detection preamble (CDP), if the received access preamble acquisition indication signal is an ACK signal, then, upon receipt of the collision detection preamble CD_P, the by UTRAN transmits to the UE a response signal for the received collision detection signal (or a collision detection indication channel (CD_ICH) signal) and a channel assignment signal for an uplink common channel. Upon receipt of the CD_ICH signal and the channel assignment signal are transmitted from the UTRAN, the UE transmits an uplink common channel message over an uplink common channel allocated by the UTRAN assignment, if the CD_ICH signal is an ACK signal. Before transmission of this message, it is possible to transmit a power control preamble (PC_P). In addition, the UTRAN transmits power control signals for the power control preamble and the uplink common channel message, and the UE controls transmission power of the power control preamble and the uplink common channel message according to the power control command received over the downlink channel.

In the above description, if the UE has several APs which can be transmitted, a preamble transmitted by the UE can be one of them, and the UTRAN generates AP_AICH in response to the AP and may transmit CA_ICH for allocating the above-stated channel after transmitting the AP_AICH.

Figure 1:
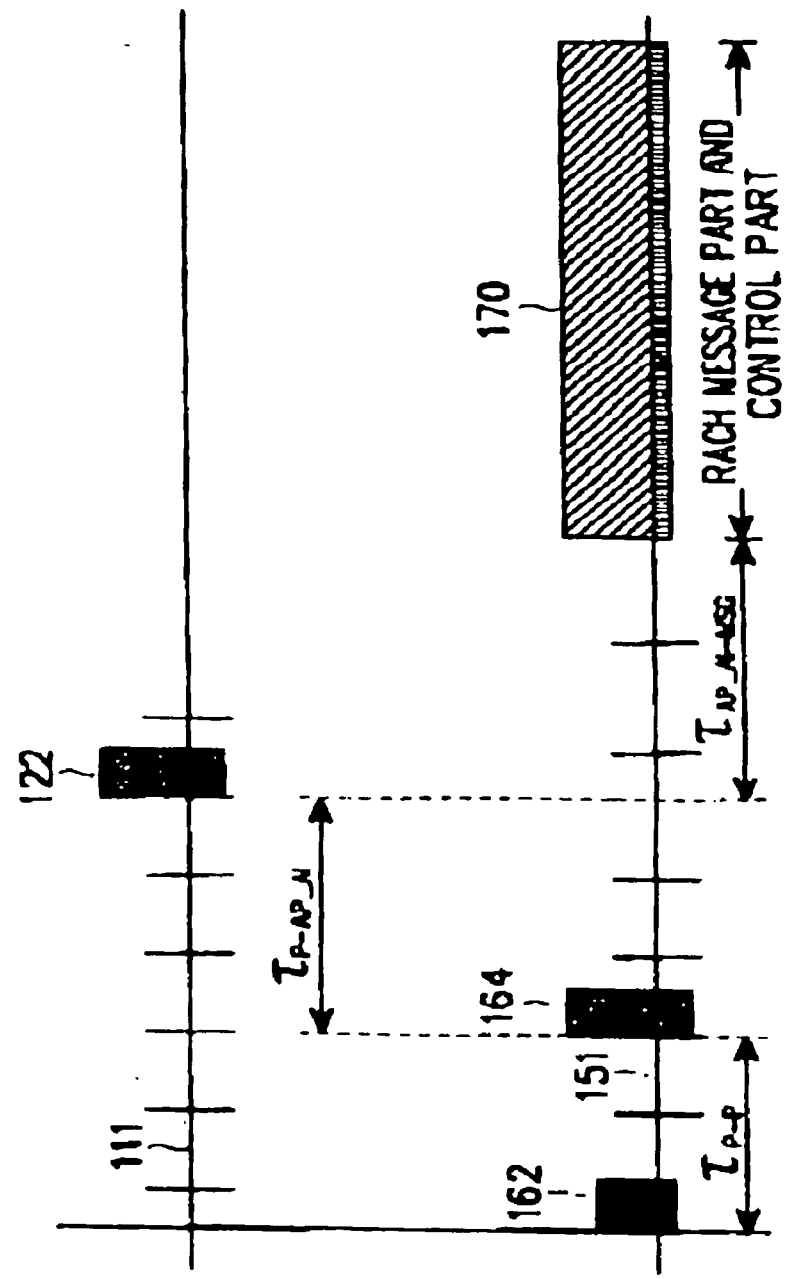
FIG. 1 is a diagram for explaining how to transmit and receive a communication signal over a RACH out of the conventional asynchronous uplink common channels.
Figure 2:
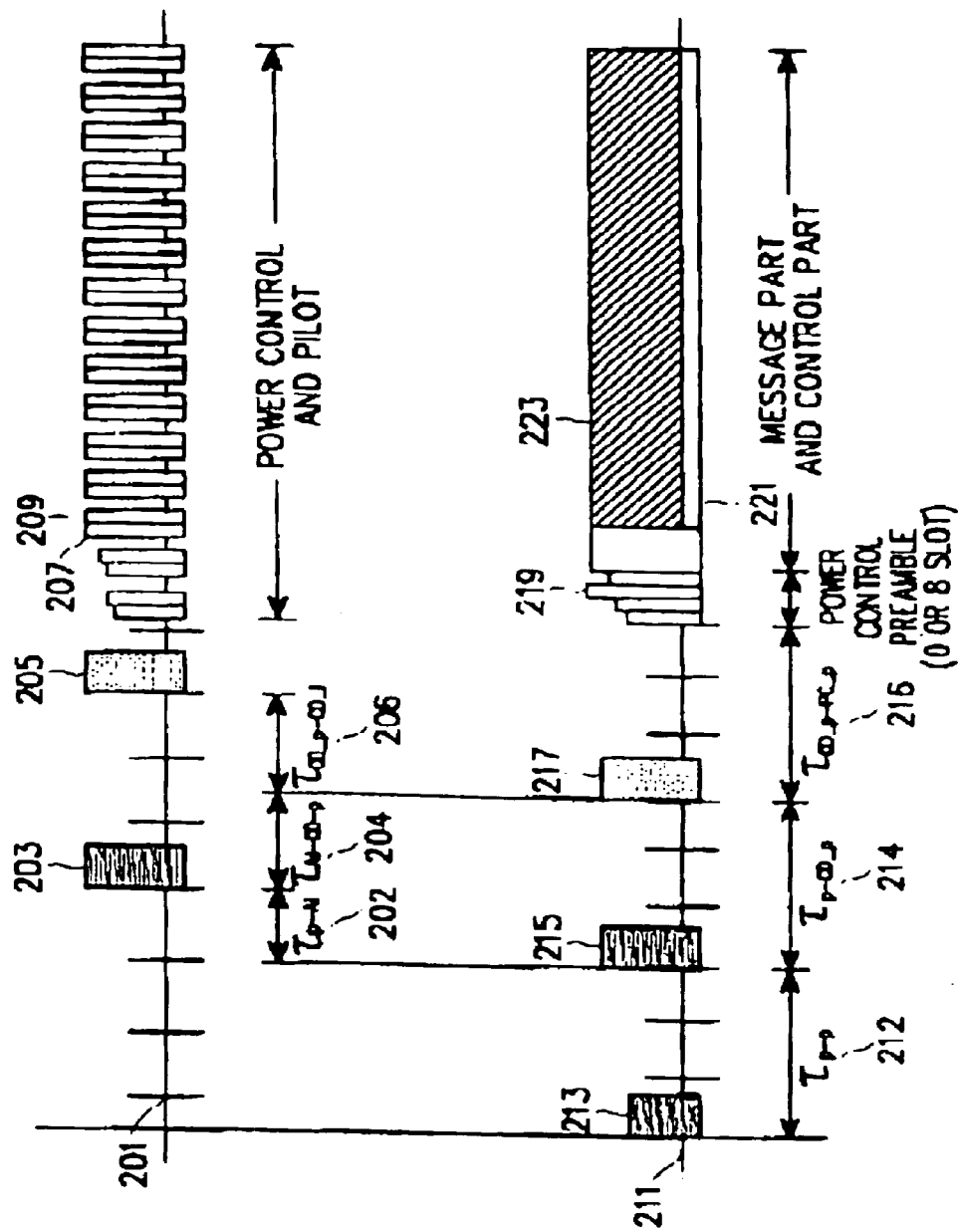
FIG. 2 is a diagram illustrating a signal transmission procedure of conventional downlink and uplink channels.
Figure 3:
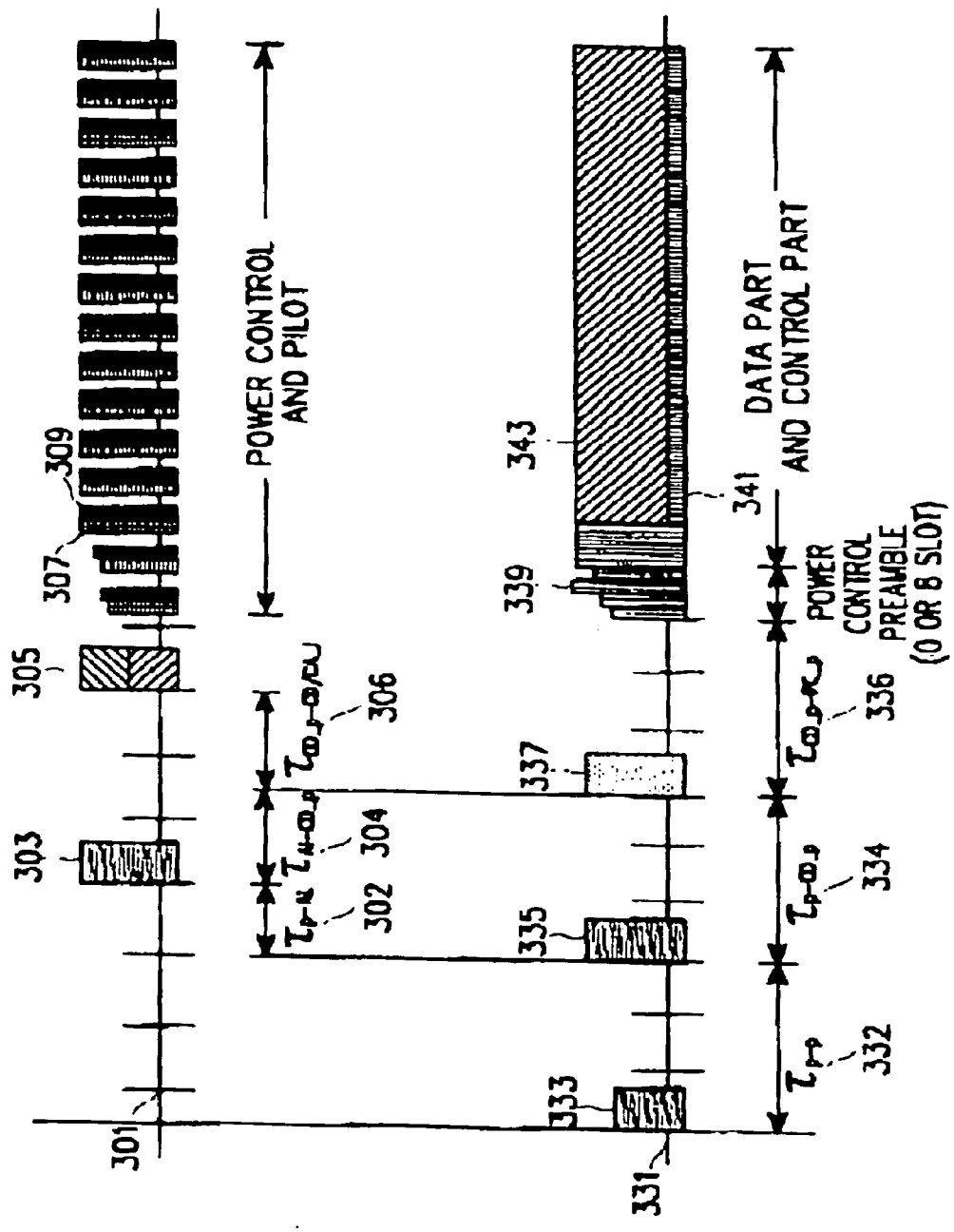
FIG. 3 is a diagram illustrating a signal flow between a UE and a UTRAN for an uplink common channel according to an embodiment of the present invention.

FIG. 3 shows a signal flow between the UE and the UTRAN to establish an uplink common packet channel (CPCH) or an uplink common channel proposed in the preferred embodiments of the present invention. In the preferred embodiments of the present invention, it will be assumed that an uplink common packet channel is used for the uplink common channel. However, a different common channel other than the uplink common packet channel can also be used for the uplink common channel.

Referring to FIG. 3, the UE performs time synchronization on the downlink through a downlink broadcasting channel, and acquires an information related to the C) 15 uplink common channel or the CPCH. The information related to the uplink C) common channel includes the information about the number of scrambling codes C) and signatures used for the AP, AICH timing of the downlink, and so on. Reference C) numeral 301 indicates a downlink signal transmitted from the UTRAN to the UE, and reference numeral 331 indicates an uplink signal transmitted from the UE to the UTRAN. When the UE attempts to transmit a signal over the CPCH, the UE first receives the information about a status of the CPCHs in the UTRAN over a CPCH status indicator channel (CSICH). Conventionally, the information about a status of the CPCHs refers to information about the CPCHs in the UTRAN, i.e., the number of CPCHs and availability of the CPCHs. However, in the preferred embodiments of the present invention, the information about a status of the CPCHs refers to information about the maximum available data rate for each CPCH and how many multi-codes can be transmitted when the UE performs multi-code transmission on one CPCH. Even when the information about availability of each CPCH is transmitted as in the prior art, it is possible to use the channel assignment method according to the present invention. The available data rate stated in the above sentence is from 15 Ksps (symbols per second) up to 960 Ksps per channel in the further asynchronous mobile communication system (W-CDMA, i.e., the 3$^{rd}$ Generation Mobile Communication for an asynchronous mobile communication), and the number of multi-codes is 1 to 6.

CPCH Status Indicator Channel (CSICH)

Figure 4A:
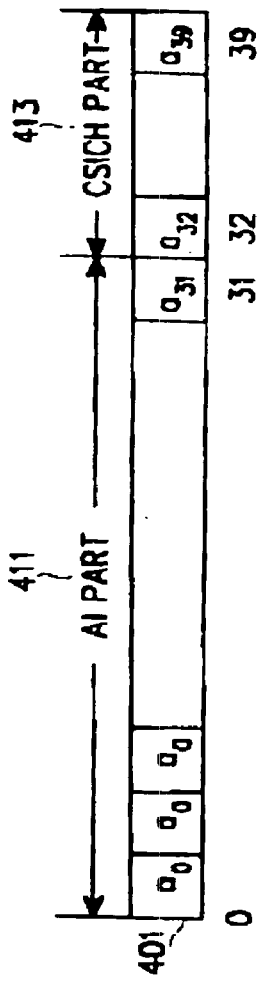
FIGS. 4A and 4B are diagrams illustrating a structure of a CSICH channel.
Figure 4B:
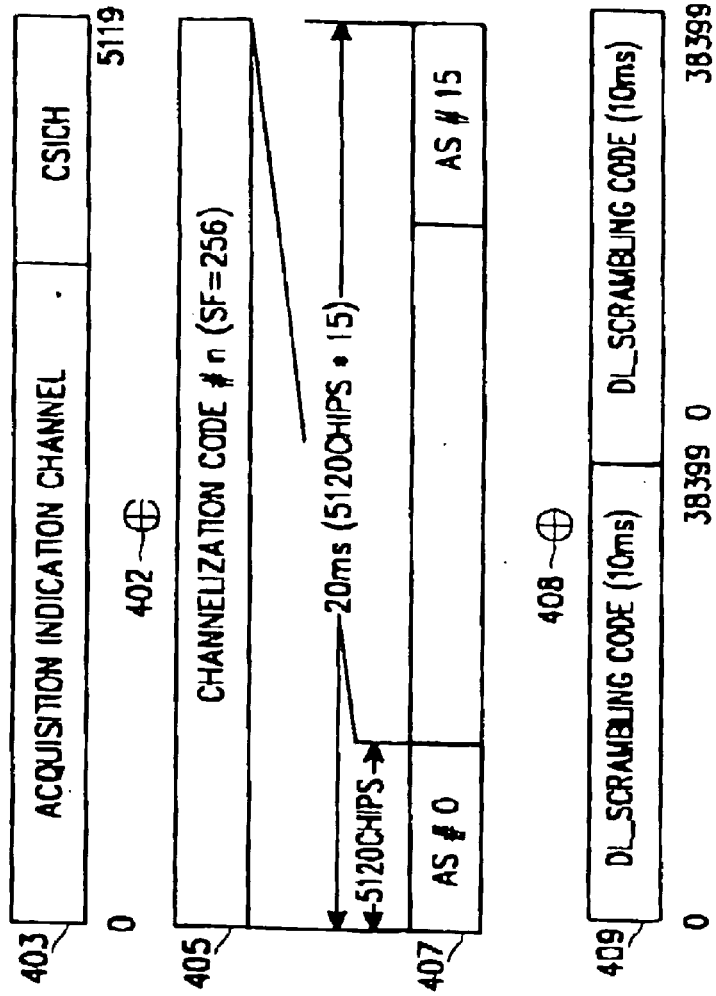

FIGS. 4A and 4B show a structure of the CSICH channel and a scheme for generating the same according to an embodiment of the present invention. The CSICH is a channel for transmitting information about a status of the CPCH within P, the UTRAN by using the last 8 unused bits out of the access preamble acquisition indicator channel (AICH) which is used to send ACK or NAK for channel acquisition of an uplink common channel in the W-CDMA system.

FIG. 4A shows a channel structure of the CSICH which uses an unused part of the AICH. The length of AICH is 40 bits in the WCDMA system. The AP_AICH uses 32 bits of AICH and the CSICH uses the unused part of the AICH. They will be transmitted in one access slot which is a reference for transmitting AP and receiving AP_AICH. The length of access slot is 5120 chips and 15 access slots are in a 20 ms frame.

FIG. 4B shows a scheme for generating the CSICH. In FIG. 4B, reference numeral 403 indicates a structure where the AP_AICH and the CSICH are transmitted in one access slot. When the AP_AICH part has no data to transmit, the AP_AICH part is not transmitted. The AP_AICH and the CSICH are spread with a channelization code 405 by a multiplier 402. The channelization code 405 is a channelization code designated by the UTRAN, and the AP_AICH and the CSICH use the same channelization code. The channelization code is allocated by the UTRAN and in this embodiment of the present invention, the spreading factor (SF) of the channelization code is assumed to be 256. The spreading factor means that the OVSF code having a length of spreading factor per symbol is multiplied by the AP_AICH and the CSICH. One symbol of the AP_AICH and CSICH is comprised of 2 bits in the W-CDMA system. Reference numeral 407 indicates the frame structure of the AP_AICH and the CSICH. The reference numeral 407 indicates a 20 ms frame which has a length of 76,800 chips and is comprised of 15 access slots. The frame 407 can transmit different information with the AP_AICH and the CSICH at every access slot, and 120 bits of information (8 bits*15 slots/frame 120 bits/frame) of the CSICH is transmitted for every 20 ms frame. In the above description, the last 8 unused bits of the AP_AICH are used when transmitting the CPCH channel state information over the CSICH. However, since the CD_ICH is identical to the AP_AICH in structure, it is also possible to transmit the CPCH channel status information to be transmitted over the CSICH through the CD_ICH.

In this embodiment of the present invention, the information transmitted to the CSICH includes the information about 7 maximum available data rates (SF4–SF256) of the CPCH and the number of multi-codes used when multi-code transmission is used in one CPCH. Table 1 below shows an application of such a method.

In Table 1, the multi-code has a spreading factor of 4, and it is specified in the W-CDMA system that only the spreading factor of 4 can be used for the channelization code of the UE, when the UE performs the multi-code transmission. As show in Table 1, in this embodiment of the present invention, the information transmitted over the CSICH can be expressed with 4 bits, and a method for transmitting the information to the UE which wants to know the current status of CPCH can be realized by repeatedly transmitting twice in one access slot or using a (8,4) coding method.

TABLE 1

| Information | Bit Expression |
| --- | --- |
| Data Rate 15 Ksps | 0000(000) |
| Data Rate 30 Ksps | 0001(001) |
| Data Rate 60 Ksps | 0010(010) |
| Data Rate 120 Ksps | 0011(011) |
| Data Rate 240 Ksps | 0100(100) |
| Data Rate 480 Ksps | 0101(101) |
| Data Rate 960 Ksps | 0110(110) |
| Number of Multi-codes = 2 | 0111 |
| Number of Multi-codes = 3 | 1000 |
| Number of Multi-codes = 4 | 1001 |
| Number of Multi-codes = 5 | 1010 |
| Number of Multi-codes = 6 | 1011 |

In the above description, 4 bits are used for informing the UE of the maximum available data rate of CPCH and the number of multi-code are used However, when the multi-code is not used, it is also possible to transmit 8 symbols at one slot by (8,3) coding or to repeat the 3 bits twice and repeats once 1 symbol out of the 3 bits.

The transmission method using the above stated coding encodes an SI (State Indicator) information bits with an error correction code in order to increase reliability of the SI information transmitted over the CPICH, applies 8 coded symbols to an access slot of an access frame, and transmits 120 coded symbols per access frame. Here, the number of the SI information bits, the meaning of the status information and the method for transmitting the same can be previously appointed between the UTRAN and the UE, and can also be transmitted as a system parameter over the broadcasting channel (BCH). In this case, the UE also previously knows the number of the SI information bits and the transmission method, and decodes the CSICH signal transmitted from the UTRAN.

Figure 5:
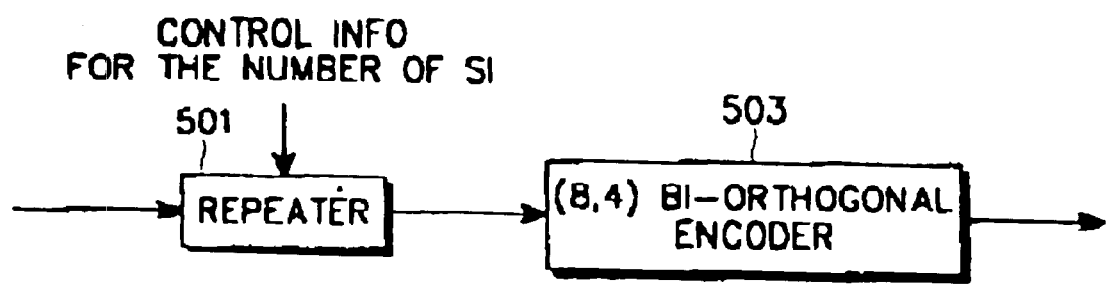
FIG. 5 is a block diagram illustrating a CSICH encoder for transmitting an SI bit according to an embodiment of the present invention.

FIG. 5 shows a structure of a CSICH encoder for transmitting the SI information bits.

Referring to FIG. 5, after the UTRAN checks the present status of the uplink CPCH, i.e., the data rate and channel condition of the present uplink channels, the UTRAN determines the maximum data rate of the CSICH channel. Then the UTRAN transmits the maximum data rate of CPCH corresponding information bits shown in Table 1 over CSICH. The information bits are the input bits: shown in Table 2 below. A method for coding the input bits may vary according to a transmission method. That is, the coding method may vary according to whether to provide the channel status information in a frame unit or a slot unit.

First, a description will be made of a case where the channel status information is transmitted in a frame unit. The input information (SI bits) and the control information for the number of the SI bits are simultaneously applied to a repeater 501. Here, the control information for the number of the SI bits is not necessary, when the number of the input information bits is previously known to both the UTRAN and the UE. The repeater 501 then repeats the SI bits according to the control information for the number of the SI bits. Operation of the CSICH encoder of FIG. 5 will be described. Upon receipt of 3 SI bits of S0, S1, and S2, the repeater 501 repeats the received SI bits according to the control information indicating that the number of the SI bits is 3, and outputs a repeated 60-bit stream of S0, S1, S2, S0, S1, S2, . . . , S0, S1, S2. When repeated 60-bit stream is applied to an encoder 503 in a 4-bit unit, the encoder 503 encodes the bits in the bit stream with an (8,4) bi-orthogonal code in a 4-bit unit, and outputs encoded symbols by 8 symbols. In this manner, when the input 60-bit stream is encoded, 120 symbols are output. By transmitting 8 symbols per one CSICH slot, it is possible to transmit 120 symbols with one CSICH frame. For example, when the input information is comprised of 4 bits, the 4 bit input is repeated 15 times by the repeater 501 and output as 60 bits. The 60 output bits are encoded into a bi-orthogonal code in the 4-bit unit by the (8,4) bi-orthogonal encoder 503 and the output is 8 symbols. Accordingly, if we consider of the number of input SI bits and output SI symbols, it is also possible to transmit the input information to each slot in one frame. Such a method is equivalent to outputting the input 4 bits into an 8-symbol bi-orthogonal code to transmit the same bi-orthogonal code to every slot (or 15 slots), by removing the repeater.

Even when the input is 3 bits and an (8,3) encoder is used, the repeater 501 is meaningless. Thus, from the viewpoint of implementation, the repeater 501 can be removed and it is possible to transmit the same encoded symbols in every slot (of 15 slots) by outputting 8 symbols for the 3 input bits. As described above, if it is possible to transmit the same symbols at every slot, the UTRAN can transmit the CPCH channel status information to the UE in a slot unit. That is, the UTRAN can determine the maximum data rate at which the UTRAN transmits data to the UE in the slot unit. The UTRAN can determine the input bits corresponding to the determined maximum data rate in slot unit and transmit the information in the slot unit. In this case, the UTRAN should examine the data rate and the status of the uplink channel in the slot unit. This can increase the UTRAN complexity. So, it is also possible to transmit the maximum data rate in a unit of several slots in order to reduce the UTRAN complexity.

The (8,4) bi-orthogonal error code used for encoding has a relationship between 4 input bits and 8 output symbols as shown in Table 2 below.

TABLE 2

| Input Bits | Coded Symbols |
| --- | --- |
| 0000 | 0000 0000 |
| 0001 | 0101 0101 |
| 0010 | 0011 0011 |
| 0011 | 0110 0110 |
| 0100 | 0000 1111 |
| 0101 | 0101 1010 |
| 0110 | 0011 1100 |
| 0111 | 0110 1001 |
| 1000 | 1111 1111 |
| 1001 | 1010 1010 |
| 1010 | 1100 1100 |
| 1011 | 1001 1001 |
| 1100 | 1111 0000 |
| 1101 | 1010 0101 |
| 1110 | 1100 0011 |
| 1111 | 1001 0110 |

Figure 6:
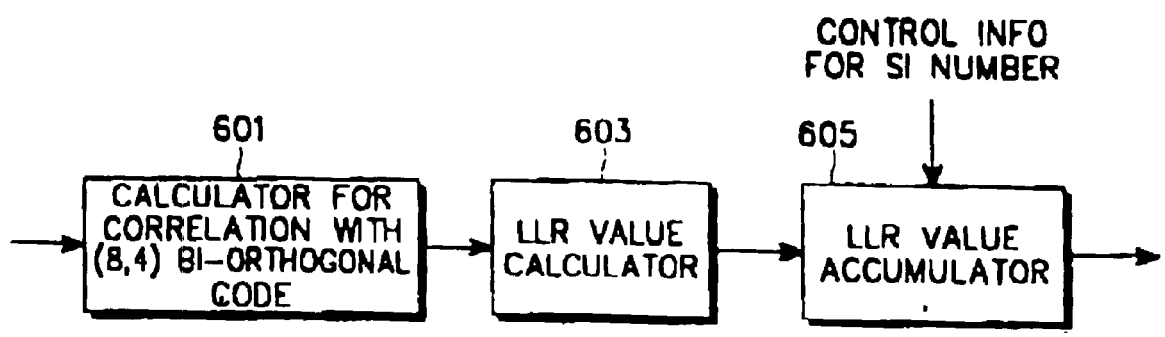
FIG. 6 is a block diagram illustrating a CSICH decoder corresponding to the CSICH encoder of FIG. 5.

FIG. 6 shows a structure of a CSICH decoder corresponding to the CSICH encoder of FIG. 5. A description of the decoder will be made in the order of describing the encoder of FIG. 5.

For the first example, a description will be made of a decoder corresponding to the encoder for which the (8,4) bi-orthogonal encoder which has the repeater that repeats 3 input bits 20 times to create 60 bits. The decoder receives the repeated 60 bits in 4 bit units. After receiving 8 symbols of a received signal, a correlation calculator 601 calculates a correlation between the received signal and the (8,4) bi-orthogonal code, and outputs 16 correlation values between the received signal and 16 values shown in Table 2.

The output correlation values are applied to a likelihood a ratio (LLR) value calculator 603. The LLR value calculator outputs a 4-bit LLR value by using of calculation a ratio of probability P0 to probability P1, where the probability P0 indicates a probability that a decoded bit of the 4 information bits transmitted from the UTRAN will be determined 0 according to the control information of the number of the SI bits. A probability P1 indicates a probability that the decoded bit will be determined 1. The LLR value is applied to an LLR value accumulator 605. When 8 symbols are received in the next slot, the decoder repeats the above process by repeating the operation of adding the 4 bits output from the LLR calculator 603 to the existing value. After the LLR values of 15 slots are received and all calculated, the decoder determines the status information by choosing the biggest correlation value among 16 correlation values stored in the LLR value accumulator 605.

For the second example, a description will be made of a case where the input is 4 or 3 bits and the (8,4) or (8,3) encoder is used and the repeater is not used. When a received signal is applied to the correlation calculator 601 in a unit of 8 symbols, the correlation calculator 601 calculates a correlation between the received signal and the (8,4) or (8,3) bi-orthogonal code. If the status information is always received from the UTRAN in the slot unit, the decoder determines the status information transmitted from the UTRAN by the highest correlation value according to the correlation results.

For the third example, a description will be made of a case where the UTRAN repeats the same status information and transmits it in the unit of 15 slots (one frame). When the received signal is applied to the correlation calculator 601 by 8 symbols, the correlation calculator 601 calculates a correlation between the 41 received signal and the (8,4) or (8,3) bi-orthogonal code and outputs the calculated correlation value to the LLR value calculator 603. The LLR value calculator 603 then calculates a ratio of a probability P0 to a probability P1, and outputs a 4-bit LLR value, where the probability P0 indicates a probability that a decoded bit of the information bits transmitted from the UTRAN will be determined 0 according to the control information of the number of the SI bits and a probability P1 indicates a probability that the decoded bit will be determined 1. The LLR value is accumulated in an LLR value accumulator 605. For the 8 symbols received in the next slot, the decoder repeats the above process in order to accumulate the calculated value to the existing LLR value. In this manner, the decoder determines the status information transmitted from the UTRAN using the value accumulated in the LLR value accumulator 605.

A description will be made of another application which provides a higher performance as compared with the conventional method for the encoding of the information bits to be transmitted over the CSICH. To bring a better understanding of the present invention, it will be assumed that there are 4 information bits to be transmitted to the CSICH. The information bits will be called S0, S1, S2 and S3 in sequence. In the prior art, the information bits are simply repeated and transmitted. That is, if 120 bits are transmitted in one frame, S0 is repeated 30 times, S1 is repeated 30 times, S2 is repeated 30 times and S3 is repeated 30 times. The prior art is disadvantageous in that the UE only receives the necessary CPCH information after completely receiving one frame. Therefore, in another embodiment for transmitting the CSICH information bits, the sequence of transmitting the information bits is changed to obtain a time diversity so that the UE can know the CPCH status even though the CPCH of one frame is not completely received. When the sequence of transmitting the information bits is S0, S1, S2, S3, S0, S1, S2, S3, S0, S1, S2, S3, . . . , S0, S1, S2 and S3, the same coding gain is given in an AWGN (Additive White Gaussian Noise) environment. However, since a gain of the time diversity is given in a fading environment which occurs inevitably in the mobile communication system, the invention has a higher coding gain as compared with the prior art. In addition, the UE can know the status of the CPCH in the UTRAN, even though only one slot of the CPICH (when the number of the information bits is 4 and below) is received. Even when there are many information bits to be transmitted to the CPICH, it is possible to know the information about the CPCH in the UTRAN more rapidly as compared with the prior art.

In the prior art, since the information about the status of each CPCH used in the UTRAN is transmitted over the CSICH, the UTRAN needs the SI bits corresponding to the number of CPCHs, and the UTRAN cannot transmit the information in one CSICH slot, but should divide the information into the total slots of one frame before transmission. Therefore, in order to know the CPCH status in the UTRAN, the UE which desires to use the CPCH should receive the CSICH for a time much longer than in this embodiment. In addition, the information about the slot where the CSICH information starts and the information about the slot where the CSICH information ends should be necessary for the UE to know the CSICH information. However, in this embodiment of the present invention, the maximum available data rate for CPCH and whether the multi-code transmission is used are the CSICH information. The prior information can be simply expressed with 4 bits regardless of the number of CPCHs in the UTRAN. In FIGS. 5 and 6, when the maximum available data rate is used for the CSICH information, the CSICH information can be expressed in 3 bits because the kinds of the CPCH data rate are 7. When the multi-code transmission is used and the number of multi-codes are added to the CSICH information, the prior information can be expressed in 4 bits because the kinds of the CSICH information are 12.

Accordingly, it is also possible that the unused SI information bits which are 13, 14, 15, and 16 in decimal are allocated for another information (e.g. NFM (Number of Frame Max) which can indicate the number of the maximum available frame used for the transmission of CPCH message part.). The UTRAN can set one NFM explained in the above sentence per CPCH. Alternatively, the NFM can correspond to the CA or correspond to the downlink DPCCH. In order to select the NFM, the UE may correspond to the AP or to the AP sub-channel. In another method, a supervision can be used without the NFM. That is, when there is no data to transmit, the UE stops transmission, and upon detecting this, the UTRAN releases the channel. In further another method, the NFM can be transmitted to the UE using the downlink DPDCH.

AP/AP_AICH

Upon receiving the information about the CPCH in the UTRAN through the CSICH of FIG. 4, the UE prepares to transmit the AP 333 of FIG. 3 in order to obtain the information about the right of using the CPCH channel and the use of the CPCH channel.

To transmit the AP 333, the UE should select a signature for the AP. In the preferred embodiments of the present invention, it is possible to select a proper access service class (ASC) based on the information about the CPCH in the UTRAN, acquired through the CSICH before selecting the signature, and the property of the data that the UE will transmit over the CPCH. For example, the ASC can be distinguished according to a class of the UE, the data rate reques by the by UE, or the service type selected by the UE. The information about the ASC is transmitted to the UE by the UTRAN over the broadcasting channel, and the UE selects a proper ASC according to the CSICH and the property of the data to be transmitted over the CPCH. Upon selecting the ASC, the UE randomly selects one of AP sub-channel groups defined in the ASC. Further, the UE derives an available access slot from Table 3 below and the system frame number (SFN) which indicates that the current downlink frame is the $n^{th}$ frame transmitted from the UTRAN and randomly selects one of the derived access slots. If the SFN for the frame transmitted from the UTRAN is defined as K, the UE derives the slots which are available at (K+1) and $(K+2)^{th}$ frames. Thereafter, the UE transmits the AP 333 at the selected slots. The "AP sub-channel group" refers to the 12 sub-channel groups shown in Table 3.

TABLE 3

| SFN mod 8 | Sub-channel Number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | | | | | | | | | 8 | 9 | 10 | 11 |
| 2 | 12 | 13 | 14 | | | | | | | | | |
| 3 | | | | 0 | 1 | 2 | 3 | 4 | 5 | 6 | 7 | |
| 4 | 9 | 10 | 11 | 12 | 13 | 14 | | | | | | 8 |
| 5 | 6 | 7 | | | | | 0 | 1 | 2 | 3 | 4 | 5 |
| 6 | 3 | 4 | 5 | 6 | 7 | | | | | | | |
| 7 | | | | | | | | | 8 | 9 | 10 | 11 | 12 | 13 | 14 |

A structure of an access slot used to transmit the AP 331 of FIG. 3 is shown in FIG. 7. Reference numeral 701 indicates an access slot, which has a length of 5120 chips. The access slot is transmitted 15 times during a 20 ms frame—two radio frames. A radio frame has a length of 10 ms, is a basic transmission unit, and consists of 15 slot lengths of 2560 chips in the WCDMA system. The access slot number is repeated from 0 to 14. Reference numeral 703 indicates two radio frames over which the $0^{th}$ to $14^{th}$ access slot are transmitted.

Referring to FIG. 7, since SFN has a unit of 10 ms, a beginning of the oth access slot is identical to a beginning of a frame whose SFN is an even number, and at end of the $14^{th}$ access slot is identical to an end of a frame whose SFN is an odd number.

The UE randomly selects one of the valid signatures or a signature defined in the sub-channel groups for CPCH. The sub-channel groups are defined the ASC allocated by the UTRAN. The UE assembles the AP 331 using the selected signature and transmits the assembled AP to the UTRAN in sync with the timing of the UTRAN. The method for the selection of signature and the generation of AP is described in the above paragraph.

The AP 331 is distinguished according to the AP signature used for the AP. Each signature can be mapped to only the maximum data rate, or the maximum data rate and the NFM. Therefore, the information indicated by the AP means the maximum data rate of a CPCH to be used by the UE or the number of frames to be used for the transmission of the CPCH message part or a combination !of the two kinds of the above information. For example, after transmitting the AP 331, the UE awaits receipt of the AP__AICH signal from the UTRAN for a predetermined time 332 (i.e., 3 or 4-slot time), and upon receipt of the AP__AICH signal, determines whether the AP__AICH signal includes a response to the AP signature transmitted by the UE. If the AP__AICH signal is not received within the time 332 or the AP__AICH signal is a NAK signal, the UE increases transmission power of the AP 335, and transmits AP 335 to the UTRAN at the increased transmission power. If the UTRAN receives AP 335 and it is possible to allocate the CPCH having a data rate requested by the UE, the UTRAN transmits the AP__AICH 303 after a lapse of a previously appointed time 302, as a response to the received AP 335. In this case, if the total uplink capacity of the UTRAN exceeds a predetermined value or there is no more demodulator for the CPCH, the UTRAN transmits a NAK signal to temporarily discontinue UE's transmitting the uplink common channel. In addition, when the UTRAN fails to detect the AP, the UTRAN cannot send the ACK or NAK signal on the AICH such as the AP__AICH 303. Therefore, in the embodiment, it will be assumed that nothing is transmitted.

CD

Upon receipt of the ACK signal over the AP__AICH 303, the UE transmits the CD__P 337. The CD__P has the same structure as that of the AP, and the signature used to construct the CD__P can be selected from the same signature group as the signature group used for the AP. When a signature for the CD__P is used out of the group of the signatures identical to the AP, different scrambling codes are used for the AP and the CD__P in order to distinguish between the AP and the CDP. The scrambling code for AP and CD__P can have the same initial value but may have different start points in order to distinguish AP form CD__P. Alternatively, the scrambling codes for the AP and the CD__P may have different initial values. The reason for transmitting the CD__P by using of a randomly selected signature is to decrease the probability that the same CD__P may be selected when there are two or more UEs which transmitted the same AP at the same time and received the ACK over AP__AICH. In the prior art, one CD__P transmitted at a given transmission time is used to decrease the probability of an uplink collision between the different UEs. However, in such a method, if another user requests the UTRAN for the right for using the CPCH with the same CD__P as one user transmitted previously and the UTRAN has no time to transmit a response to the CD__P transmitted previously, the UTRAN cannot respond to the UE which transmitted the CD__P later. Even if the UTRAN responds to the other UE which transmitted the CD__P later, it is possible that a probability of an uplink collision between the UE which first transmitted the CD__P and the other UE which later transmitted CD__P is increased.

In FIG. 3, the UTRAN transmits CD/CA__ICH 305 as a response to the CD__P 337 transmitted from the UE. The CD__ICH out of the CD/CA__ICH will be first described. The CD__ICH is a downlink channel for transmitting the ACK signal to the UE by using of the signature used for the generation of CDP. The CD__ICH can be spread using a different orthogonal channelization code from that of the AP__AICH. Therefore, the CD__ICH and the AP__AICH can be transmitted over different physical channels, or can be transmitted over the same physical channel by time dividing one orthogonal channel. In the preferred embodiments of the present invention, it is assumed that the CD__ICH is transmitted over a different physical channel from that of the AP__AICH. That is, the CD__ICH and the AP__AICH are spread with an different orthogonal spreading code of length 256 respectively and transmitted over independent physical channels.

CA

In FIG. 3, the CA_ICH includes a channel information of the CPCH to be allocated to the UE by the UTRAN and an information about downlink channel assignment for the power control of the CPCH. There are several available methods for the assignment of the downlink channel to control the uplink transmission power.

In the first method for the control of CPCH transmission power, a downlink shared power control channel is used. A method for controlling transmission power of a channel using the shared power control channel is disclosed in detail in Korean Patent Application No. 1998-10394, the contents of which are hereby incorporated by reference. Further, it is possible to transmit a power control command for the CPCH by using the shared power control channel. The assignment method of the downlink shared power control channel may include information about the channel number and the time slot for the downlink shared power control used for power control.

In the second method for the control of CPCH transmission power, a downlink control channel which is time-divided into a message and a power control command can be used. In the W-CDMA system, this channel is defined to control the downlink shared channel. Even when the data and the power control command is time divided for transmission, the channel information includes the information about the channel number and the time slot of the downlink control channel.

In the third method for the control of CPCH transmission power, one downlink channel can be allocated to control the CPCH. The power control command and the other control command for the CPCH can be transmitted together over this channel. In this case, the channel information becomes a channel number of the downlink channel.

In the preferred embodiments of the present invention, it is assumed that the CD/CA_ICH are transmitted at the same time. However, the CA_ICH may be transmitted after transmission of the CD_ICH. Even though the CD_ICH/CA_ICH are simultaneously transmitted, they may be transmitted with either the different channelization codes or the same channelization code. Further, it will be assumed that in order to decrease the delay in processing a message from a upper layer, a channel assignment command transmitted over the CA_ICH is transmitted in the same format as the CD_ICH. In this case, if there exist 16 signatures and 16 CPCHs, each CPCH will correspond to a unique one of the signatures. For example, when the UTRAN desires to allocate a 5th CPCH for transmitting a message to the UE, the UTRAN transmits a 5th signature corresponding to the 5th CPCH in the channel assignment command.

If it is assumed that the CA_ICH frame over which the channel assignment command is transmitted has a length of 20 ms and includes 15 slots, this structure will be identical to the structure of the AP_AICH and the CD_ICH. The frame for transmitting AP_AICH and the CD_ICH is comprised of 15 slots and each slot can be comprised of 20 symbols. It will be assumed that one symbol period (or duration) has a length of 256 chips and a part where responses to the AP, CD and CA are transmitted, is transmitted in only a 16-symbol period.

Therefore, the channel assignment command transmitted as shown in FIG. 3 can be comprised of 16 symbols, and each symbol has a length of 256 chips. Further, each symbol is multiplied by the 1-bit signature and the spreading code and then transmitted over the downlink, and an orthogonal property is guaranteed between the signatures.

In the preferred embodiments of the present invention, it is possible that 1 signature is transmitted for one CA message over CA-ICH for one CA message and 2 or 4 signatures for the one CA message are transmitted over the CA-ICH for one CA message. That is, multiple signature for the channel assignment command can be transmitted over the CA_ICH.

In FIG. 3, upon receipt of the CD/CA_ICH 305 transmitted from the UTRAN, the UE examines whether the CD_ICH includes an ACK signal, and analyzes information about the right of using the CPCH channel transmitted over the CA_ICH. Analysis of the two kinds of the above information can be made either sequentially or simultaneously. Receiving the ACK signal through the CD_ICH out of the received CD/CA_ICH 305 and the channel assignment information through the CA_ICH, the UE assembles the data part 343 and the control part 341 of the CPCH according to the channel information of the CPCH allocated by the UTRAN, as shown in FIG. 3. Further, before transmitting the data part 343 and the control part 341 of the CPCH, the UE transmits the power control preamble (PC_P) 339 to the UTRAN after a lapse of a predetermined time from a time when the CD/CA_ICH are received. PS PC_P Although the power control preamble PC_P has a length of 0 or 8 slots in the WCDMA system, it will be assumed in the preferred embodiments of the present invention that the power control preamble PC_P 339 transmits 8 slots. The primary purpose of the power control preamble PC_P is to enable the UTRAN to set an initial transmission power of the CPCH of the UE using a pilot field of the PC_P. However, in this embodiment of the present invention, as another use, the power control preamble can be used to reconfirm the channel assignment message received at the UE. A reason for reconfirming the channel assignment message is to prevent a collision with a CPCH used by another UE, which may be caused by the UE's improperly setting the CPCH because the CA_ICH received at the UE has an error. If the power control preamble is used for the purpose of reconfirming the channel assignment message, the power control preamble should be a length of 8 slots.

The reconfirming method can be divided into several methods. (1) The signature of the CA_ICH received at the UE is transmitted in association with the pilot bit of the power control preamble on a one-to-one basis. (2) The received CA signature is transmitted by multiplying the power control preamble by the chip level. (3) The CA signature is associated with the channelization code used for the PC_P on a one-to-one basis, and the power control preamble is channel spread with the channelization code corresponding to the received CA signature before transmission. (4) The CA signature is associated with an uplink scrambling code used for the PC_P on a one-to-one basis, and the power control preamble is spread with the uplink scrambling code corresponding to the received CA signature before transmission. Although the method for reconfirming the CA message is used for the power control preamble, the UTRAN will have no difficulty in measuring the power and confirming the CA message because it already knows the pilot bit pattern used for the power control preamble.

At a time close to the time when the power control preamble 339 is transmitted, the UTRAN starts transmitting the downlink dedicated channel for uplink power control of the CPCH for the corresponding UE. A channelization code for the downlink dedicated channel is transmitted to the UE through the CA message, and the downlink dedicated channel is comprised of a pilot field, a power control command field and a message field. The message field is transmitted only when the UTRAN has data to transmit to the UE.

Reference numeral 307 of FIG. 3 indicates an uplink power control command field, and reference numeral 309 indicates a pilot field.

For the case where the power control preamble 339 of FIG. 3 is used not only for power control but also for reconfirming the CA (Channel Assignment) C) message, if the CA reconfirmation message received over the PC_P by the UTRAN is different from the CA message transmitted over the CD/CA-ICH 305 by the UTRAN, the UTRAN continuously sends a transmission power-decreasing command to the UE by the power control field of the established; downlink dedicated channel, and also sends a CPCH transmission stop message transmitted over the Forward Access Channel (FACH) or the established downlink channel to the UE.

After transmitting the power control preamble 339 of FIG. 3, the UE immediately transmits the CPCH message part 343. Upon receipt of the CPCH transmission stop command from the UTRAN during transmission of the CPCH message part, the UE immediately stops transmission of the CPCH. If the CPCH transmission stop command is not received during the transmission of the CPCH, the UE receives an ACK or NAK for the CPCH from the UTRAN after completing transmission of the CPCH.

Structure of the Scrambling Code

Figures 8A, 8B:
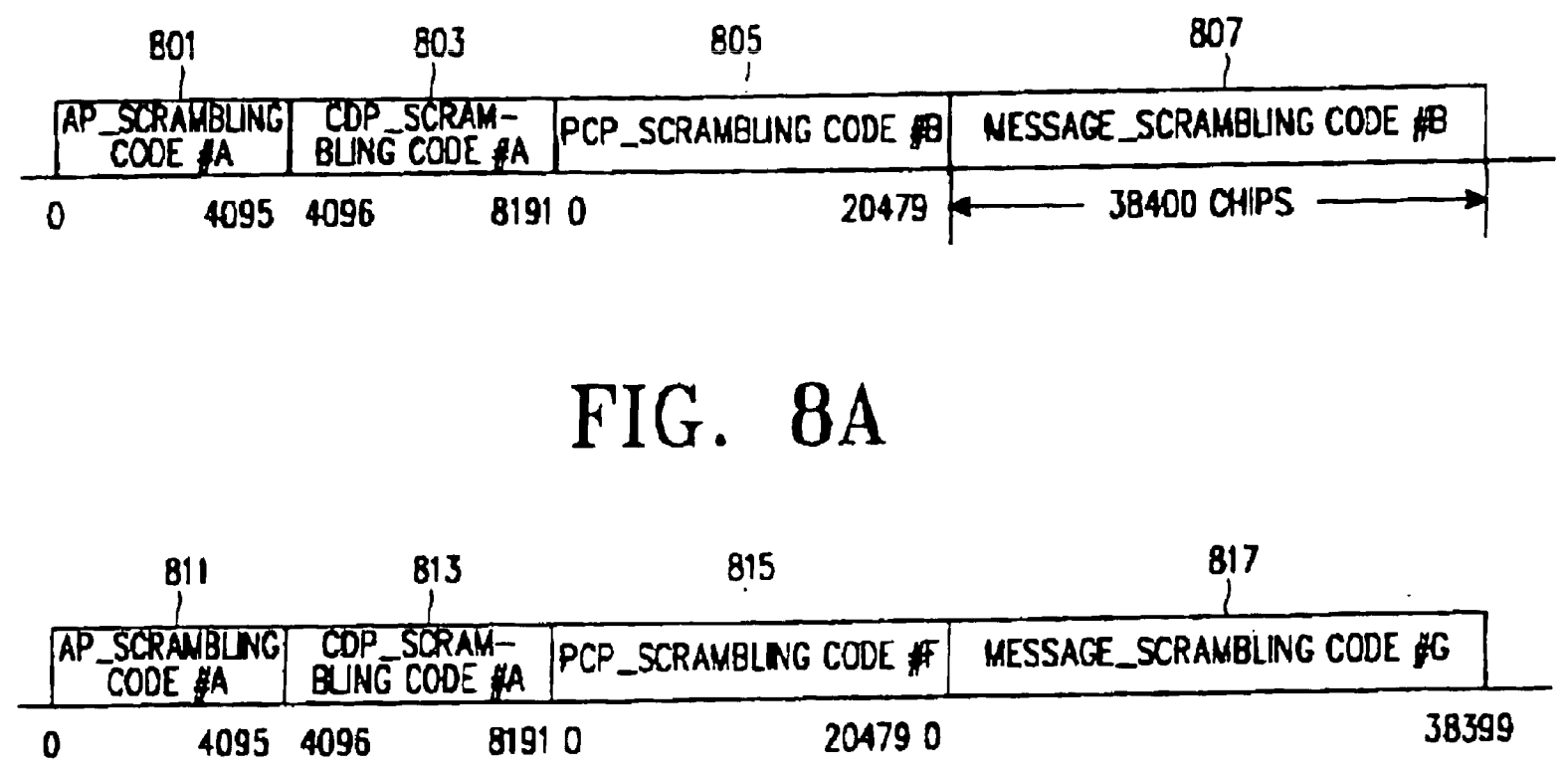

FIG. 8A shows a structure of an uplink scrambling code used in the prior art, and FIG. 8B shows a structure of an uplink scrambling code used in an embodiment of the present invention.

More specifically, FIG. 8A shows a structure of an uplink scrambling code used in the process of initially establishing and transmitting the CPCH in the prior art. Reference numeral 801 indicates an uplink scrambling code used for the AP, and reference numeral 803 indicates an uplink scrambling code used for the CD_P. The uplink scrambling code used for the AP and the uplink scrambling code used for the CD_P can be the uplink scrambling codes generated from the same initial value (the same seed value). For example, $0^{th}$ to $4095^{th}$ values can be used in the AP part, and $4096^{th}$ to $8191^{st}$ values can be used in the CD_P part. The UE can use the uplink scrambling codes used for the AP and the CD_P broadcasted by the UTRAN or the uplink scrambling codes predetermined by the UTRAN. In addition, the uplink scrambling code can use a short sequence of length 256 and can also use a long code which is not repeated during the AP or CD_P period. In the AP and the CD_P of FIG. 8A, the same uplink scrambling code can be used. That is, the AP and the CD_P can be used equally by using a specific part of the uplink scrambling code generated from the same initial value. In this case, the signature used for the AP and the signature used for the CD_P are selected from the different signature groups. In such an example, 8 of 16 signatures used for a given access channel are allocated for the AP and the remaining 8 signatures are allocated for the CD_P.

Reference numerals 805 and 807 of FIG. 8A indicate uplink scrambling codes used for the power control preamble PC_P and the CPCH message part, respectively. The parts used in the uplink scrambling codes having the same initial value are made different to be used for the PC_P and the CPCH message part. The uplink scrambling code used for the PC_P part and the CPCH message part can be the same scrambling code as the uplink scrambling code used for the AP and the CD_P, or can be the uplink scrambling code corresponding on a one-to-one basis to the signature for the AP transmitted by the UE. A PC_P scrambling code 805 of FIG. 8A uses $0^{th}$ to $20,479^{th}$ values of the uplink scrambling code #b, and a message scrambling code 807 uses a scrambling code of length 38,400 which starts at the end al point of a scrambling code for the PC_P of the uplink scrambling code. Also, for the scrambling codes used for the PC_P and the CPCH message part, a short scrambling code having a length of 256 can be used.

FIG. 8B shows a structure of an uplink scrambling code used in an embodiment of the present invention. Reference numerals 811 and 813 indicate uplink scrambling codes used for the AP and the CD_P, respectively. The uplink scrambling codes 811 and 813 are used in the same manner as in the prior art. The uplink scrambling codes are transmitted to the UE by the UTRAN or are predetermined in the system.

Reference numeral 815 of FIG. 8B indicates an uplink scrambling code used for the PC_P part. The uplink scrambling code used for the PC_P part may be the same scrambling code as the uplink scrambling code used for the AP and the CD_P, or can be the scrambling code which corresponds to the signature used for the AP on a one-to-one basis. Reference numeral 815 of FIG. 8B indicates a scrambling code used for the PC_P part, having $0^{th}$ to $20,479^{th}$ values. Reference numeral 817 of FIG. 8B indicates an uplink scrambling code used for the CPCH message part. For this scrambling code, there can be used the same code as the scrambling code used for the PC_P, or a scrambling code which corresponds to the scrambling code used for the PC_P or the signature used for the AP on a one-to-one basis. The CPCH message part uses scrambling codes of length 38,400.

For the summary of the explanation of FIGS. 8A and 8B, in the prior art, the one scrambling code can be used for the AP, CD_P, PC_P, and the message part of the CPCH or two scrambling codes can be used for the AP, CD_P, PC_P, and the message part of the CPCH. In other words, one is used for the AP and CD_P, and the other is used for the PC_P and message part of the CPCH. In the preferred embodiments of the present invention, a scrambling code for the AP and CD_P, a scrambling code for the PC_P and a scrambling code for the message part of the CPCH can be different and used with flexibility. For example, a scrambling code for the AP and the CD_P can be predetermined by the UTRAN for the purpose of reducing the UE complexity, a scrambling code for the PC_P can be mapped to a signature used for the generation of AP and a scrambling code for the message part of the CPCH can be mapped to a scrambling code for PC_P or a signature used for the AP. Naturally a scrambling code for the PC_P and a scrambling code for the message part of the CPCH can be mapped to the CA message.

For all the scrambling codes used in describing the structure of the scrambling code according to an embodiment of the present invention, the long scrambling code is used which is not repeated for the AP, CD_P, PC_P and the CPCH message part. However, it is also possible to use a short scrambling code having a length of 256.

Detailed Description of the AP

Figure 9A:
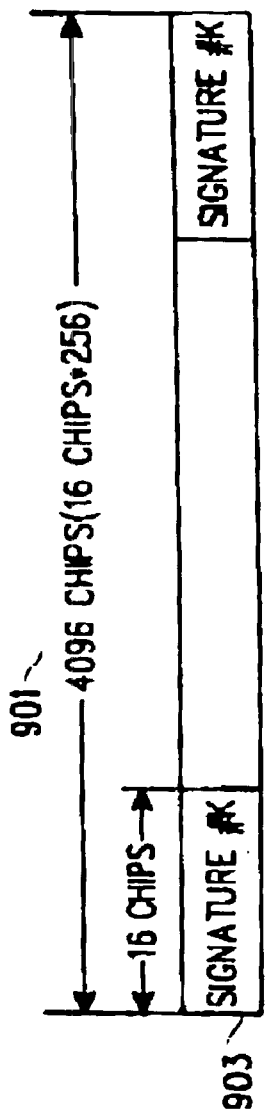
FIGS. 9A and 9B are diagrams illustrating a structure of an access preamble for a common packet channel according to an embodiment of the present invention, and a scheme for generating the same.
Figure 9B:
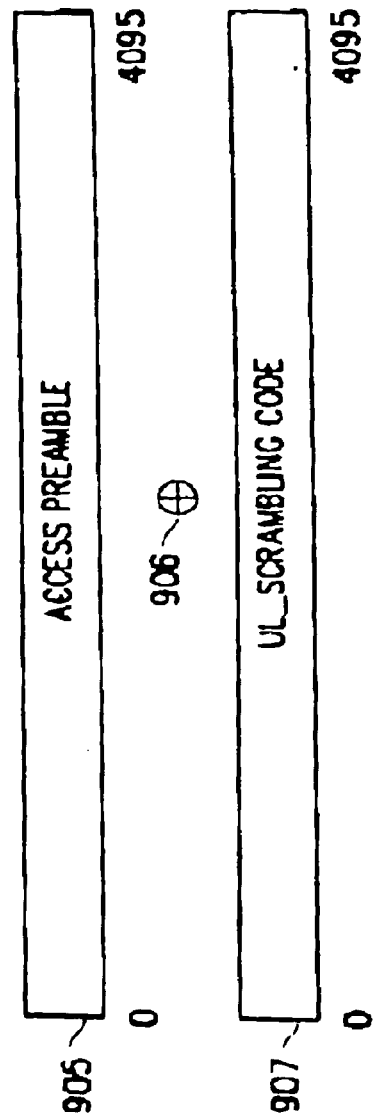

FIGS. 9A and 9B show a channel structure of the CPCH access preamble according to an embodiment of the present invention and a scheme for generating the same, respectively. More specifically, FIG. 9A shows the channel structure of the AP, and FIG. 9B shows a scheme for generating one AP slot.

Reference numeral 901 of FIG. 9A indicates a length of the access preamble AP, the size of which is identical to 256 times the length of a signature 903 for the AP. The signature 903 for the AP is an orthogonal code of length 16. A variable 'k' indicated in the signature 903 of FIG. 9A can be 0 to 15. That is, in this embodiment of the present invention, there are provided 16 kinds of the signatures. Table 4 below shows the signatures for the AP, by way of example. A method for selecting the signature 903 in the UE is as follows. The UE first determines the maximum data rate which can supported by the CPCH in the UTRAN through the CSICH transmitted by the UTRAN and the number of the multi-codes which can; be used in one CPCH, and selects a proper ASC in consideration of the properties, data rate and transmission length of the data to be transmitted through the CPCH. Thereafter, the UE selects a signature proper for the UE data traffic out of the signatures defined in the selected ASC.

transmitted to the UTRAN, and the UTRAN then determines, through the CA, the other information for using the CPCH of the uplink scrambling code and the channelization code for the downlink dedicated channel. Therefore, in the embodiment of the present invention, it is possible to endow the UE with the right of using the CPCH, thereby making it possible to efficiently and flexibly allocate the CPCH in the UTRAN.

Detailed Description of the CD_P

FIGS. 10A and 10B show the channel structure of the collision detection preamble CD_P and a scheme for generating the same, respectively, according to an embodiment of the present invention. The structure of the CD_P and its

TABLE 4

| Signature | N |  |  |  |  |  |  |  |  |  |  |  |  |  |  |  |
|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 |
| $P_0(n)$ | A | A | A | A | A | A | A | A | A | A | A | A | A | A | A | A |
| $P_1(n)$ | A | -A | A | -A | A | -A | A | -A | A | -A | A | -A | A | -A | A | -A |
| $P_2(n)$ | A | A | -A | -A | A | A | -A | -A | A | A | -A | -A | A | A | -A | -A |
| $P_3(n)$ | A | -A | -A | A | A | -A | -A | A | A | -A | -A | A | A | -A | -A | A |
| $P_4(n)$ | A | A | A | A | -A | -A | -A | -A | A | A | A | A | -A | -A | -A | -A |
| $P_5(n)$ | A | -A | A | -A | -A | A | -A | A | A | -A | A | -A | -A | A | -A | A |
| $P_6(n)$ | A | A | -A | -A | -A | -A | A | A | A | A | -A | -A | -A | -A | A | A |
| $P_7(n)$ | A | -A | -A | A | -A | A | A | -A | A | -A | -A | A | -A | A | A | -A |
| $P_8(n)$ | A | A | A | A | A | A | A | A | -A | -A | -A | -A | -A | -A | -A | -A |
| $P_9(n)$ | A | -A | A | -A | A | -A | A | -A | -A | A | -A | A | -A | A | -A | A |
| $P_{10}(n)$ | A | A | -A | -A | A | A | -A | -A | -A | -A | A | A | -A | -A | A | A |
| $P_{11}(n)$ | A | -A | -A | A | A | -A | -A | A | -A | A | A | -A | -A | A | A | -A |
| $P_{12}(n)$ | A | A | A | A | -A | -A | -A | -A | -A | -A | -A | -A | A | A | A | A |
| $P_{13}(n)$ | A | -A | A | -A | -A | A | -A | A | -A | A | -A | A | A | -A | A | -A |
| $P_{14}(n)$ | A | A | -A | -A | -A | -A | A | A | -A | -A | A | A | A | A | -A | -A |
| $P_{15}(n)$ | A | -A | -A | A | -A | A | A | -A | -A | A | A | -A | A | -A | -A | A |

An access preamble 905 of FIG. 9B has the same size as indicated by 901. The access preamble 905 is spread with a downlink scrambling code 907 by a multiplier 906 and transmitted to the UTRAN. The time point where: the AP is transmitted has been described with reference to FIG. 7 and Table 3, and the scrambling code 907 has been described with reference to FIG. 8B.

The information transmitted from the UE to the UTRAN through the AP of FIG. 9B includes the data rate of the CPCH, requested by the UE, or the number of frames to be transmitted by the UE, or includes information generated by associating a combination of the two kinds of the above information with the signature on a one-to-one basis. In the prior art, the information transmitted from the UE to the UTRAN through the AP is the uplink scrambling code and data rate necessary for the CPCH, the channelization code and data rate for the downlink dedicated channel for CPCH power control, and the number of data frames to be transmitted. The UE selects the corresponding signature in consideration of the above information and sends it to the UTRAN through the AP. When the information transmitted through the AP is determined in the above manner, the UTRAN has only the function of allowing or not allowing the UE to use the channel requested by the UE. Therefore, even though there exists an available CPCH in the UTRAN, the prior art cannot allocate the CPCH to the UE. When there are many UEs which requests the CPCH having the same condition, a collision occurs between the different UEs trying to acquire the CPCH, thus increasing the time required when the UE acquires the channel. In this embodiment of the present invention, however, the UE transmits only the possible maximum data rate of the CPCH, or the maximum data rate and the number of the data frames to be generating scheme are the same as those of the AP shown in FIGS. 9A and 9B. The uplink scrambling code shown in FIG. 10B can be different from the AP scrambling code shown in FIG. 8B.

Reference numeral 1001 of FIG. 10A indicates a length of the CD_P, which is 256 times a signature 1003 for the AP, shown in Table 4. A variable: 'j' of the signature 1003 can be 0 to 15. That is, there are provided 16 signatures for the CD_P. The signature 1003 of FIG. 10A is randomly selected from the 16 signatures. One reason for randomly selecting the signature is to prevent a collision between the UEs which have received the ACK signal after transmitting the same AP to the UTRAN, thereby having to perform the confirmation process again. In; using the signature 1003 of FIG. 10A, the prior art uses a method which is used when specifying only one signature for the CD_P or transmitting the AP in a given access channel. The conventional method for transmitting the CD_P using only one signature has an object of preventing a collision between the UEs by randomizing the transmission time point of the CD_P instead of using the same signature.

However, the conventional method is disadvantageous in that if another UE transmits the CD_P to the UTRAN at a time point where the UTRAN has not transmitted an ACK for the previous CD_P received from one UE, the UTRAN cannot deal with a proper operation to the CD_P transmitted from another UE before processing the ACK for the first received CD_P. That is, the UTRAN cannot process the CD_P from the other UEs while processing the CD_P from one UE. Another conventional method for transmitting the CD_P to the UTRAN uses the same scheme of AP transmission in the random access channel. As mentioned before, if the UE sends the AP to the UTRAN in the RACH transmission, the UE should wait for the proper position at which the AP is transmitted. Accordingly, these methods is disadvantageous in that it takes a long time until the UE detects an access slot for transmitting the CD_P, causing an increased time delay in transmitting the CD_P.

In an embodiment of the present invention, upon receipt of the AP_AICH, the UE selects a given signature after a lapse of a predetermined time and transmits the selected signature to the UTRAN.

The CD_P 1005 of FIG. 10B has the same size as indicated by 1001 of FIG. 10A. The CD_P 1005 is spread with the downlink scrambling code 1007 by a multiplier 1006 and then transmitted to the UTRAN after a lapse of a predetermined time from the time point where the AP_AICH is received. The scrambling code 1007 has been described with reference to FIG. 8B.

CD/CA_ICH

Figure 11A:
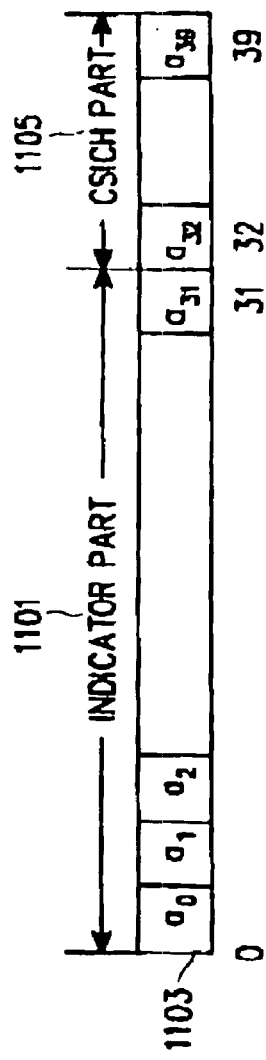
FIGS. 11A and 11B are diagrams illustrating structure of a channel assignment indication channel according to an embodiment of the present invention, and a scheme for generating the same.
Figure 11B:
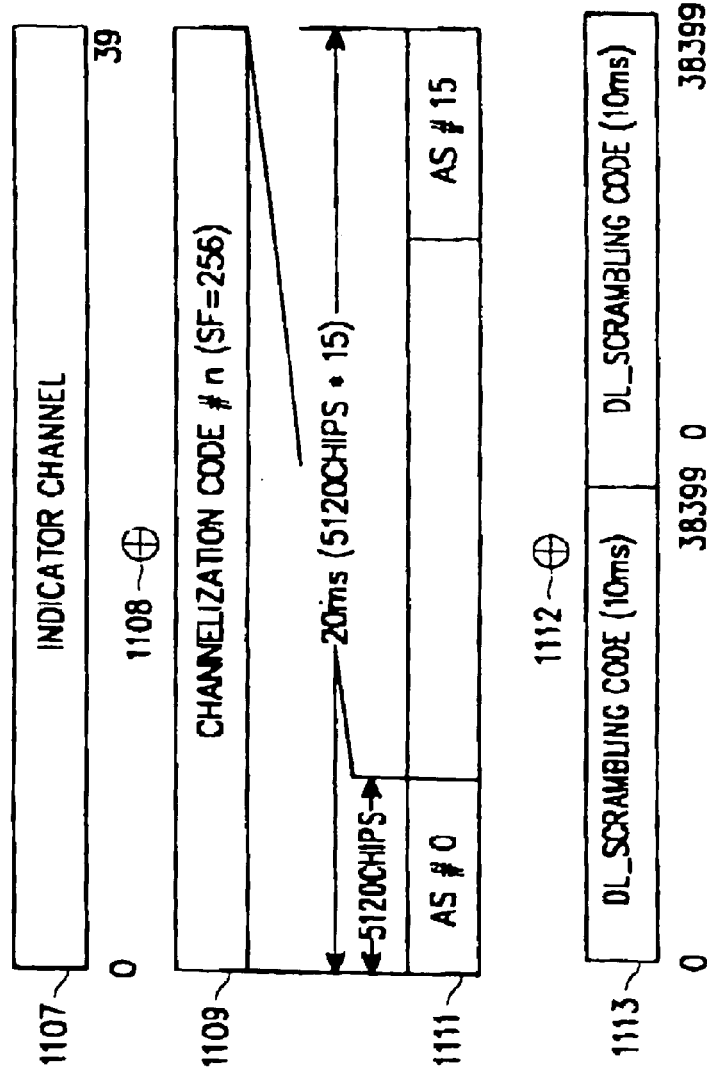

FIG. 11A shows a channel structure of an Indicator channel. There are three kinds of indicator channel. There is an access preamble acquisition indicator channel (AP_AICH) over which the UTRAN can transmit ACK or NAK in response to the received AP, a collision detection indicator channel (CD_ICH) over which the UTRAN can transmit ACK or NAK in response to the received CD_P, or a channel assignment indicator channel (CA_ICH) over which the UTRAN transmits a CPCH channel assignment command to the UE. FIG. 11B shows a scheme for generation of the same.

Reference numeral 1101 of FIG. 11A indicates an indicator part with which the UTRAN transmits ACK and NAK for the acquired AP and CD_P and an CA-related command. Reference numeral 1003 indicates a CPCH status indicator channel (CSICH) part. The channel structure of the CSICH and its generating scheme have been described with reference to FIGS. 4A and 4B. Reference numeral 1111 of FIG. 11B indicates a frame structure of an indicator channel (ICH). As illustrated, one ICH frame has a length of 20 ms, and is comprised of 16 slots, each of which can transmit 0 or more than 1 of the 16 signatures shown in Table 4. A CPCH status indicator channel (CSICH) 1007 of FIG. 11B has the same size as represented by 1103 of FIG. 11A. Reference numeral 1109 of FIG. 11B indicates a channelization code, for which the AP_AICH, CD_ICH, and CA_ICH, respectively may use different channelization codes and the CD_ICH and CA_ICH may use the same channelization code. A signal on the CPCH status indicator channel 1107 is spread with the channelization code 1109 by a multiplier 1108. The 16 spread slots constituting one ICH frame are spread with a downlink scrambling code 1113 by a multiplier 1112 before transmission.

Figure 12:
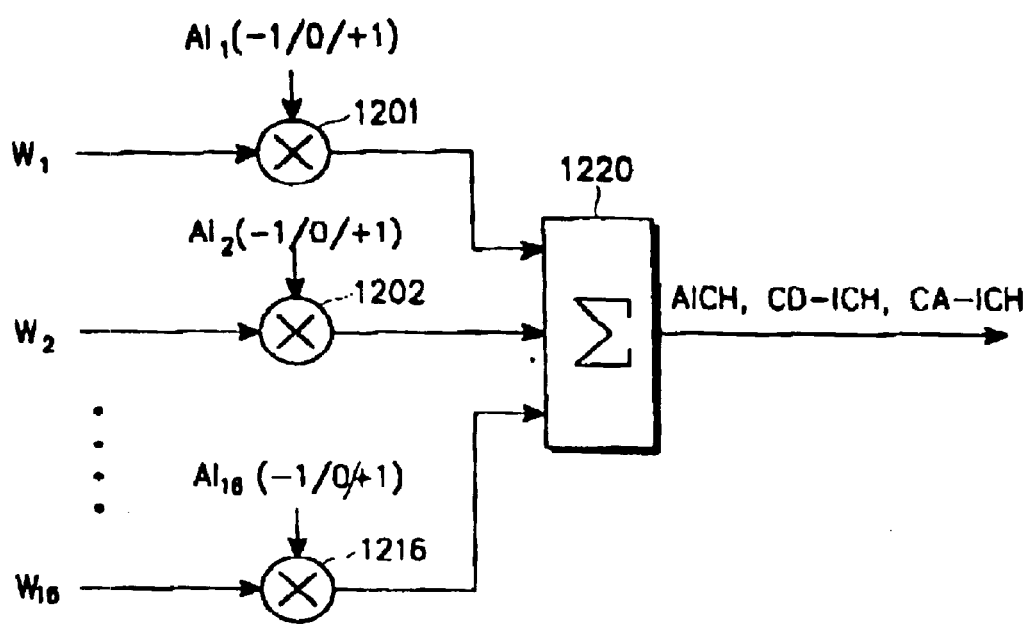
FIG. 12 is a diagram illustrating an AICH generator according to an embodiment of the present invention.

FIG. 12 shows an AICH generator for generating CD_ICH and CA_ICH commands. As described above, to each slot of the AICH frame is allocated a corresponding one of the 16 signatures.

Referring to FIG. 12, multipliers 1201–1216 receive corresponding orthogonal codes $W_1$–$W_{16}$ as a first input and receive acquisition indicators $AI_1$–$AI_{16}$ as a second input, respectively. Each AI has a value of 1, 0 or −1: AI=1 indicates ACK, AI=−1 indicates NAK, and AI=0 indicates a failure to acquire the corresponding signature transmitted from the UE. Therefore, the multipliers 1201–1216 multiply the corresponding orthogonal code by the corresponding acquisition indicator AI, respectively, and a summer 1220 sums up the outputs of the multipliers 1201–1216 and outputs the resulting value as an AICH signal.

The UTRAN can transmit the channel assignment command: using the AICH generator of FIG. 12 in several methods which are given below by way of example.

1. First Channel Assignment Method

In this method, one downlink channel is allocated to transmit the channel assignment command over the allocated channel. FIGS. 13A and 13B: show the structures of the CD_ICH and the CA_ICH implemented according to the first method. More specifically, FIG. 13A shows the slot structure of the CD_ICH and the CA_ICH, and FIG. 13B shows an exemplary method for transmitting the CA_ICH and the CD_ICH. Reference numeral 1301 of FIG. 13A indicates a transmission slot structure of the CD_ICH for transmitting a response signal to the CD_P. Reference numeral 1311 indicates a transmission slot structure of the CA_ICH for transmitting a channel assignment command. Reference numeral 1331 indicates a transmission frame structure of the CD_ICH for transmitting a response signal to the CD_P. Reference numeral 1341 indicates a frame structure for transmitting the channel assignment command over the CA_ICH with a tune delay τ after transmission of the CD_ICH frame. Reference numerals 1303 and 1313 indicate the CSICH part.

The method for allocating the channels as shown in FIGS. 13A and 13B has the following advantages. In this channel assignment method, the CD_ICH and the CA_ICH are physically separated, because they have different downlink channels. Therefore, if the AICH has 16 signatures, the first channel assignment method can use 16 signatures for the CD_ICH and also use 16 signatures for the CA_ICH. In this case, the kinds of information which can be transmitted using the sign of the signatures can be doubled. Therefore, by using the sign of +1'or l' 1' of the CA_ICH, it is possible to use 32 signatures for the CA_ICH. In this case, it is possible to allocate the different channels to several users, who have simultaneously requested the same kind of channel, in the following sequence. First, it is assumed that UE#1, UE#2 and UE#3 in a UTRAN simultaneously transmit AP#3 to the UTRAN to request a channel corresponding to the AP#3, and UE#4 transmits AP#5 to the UTRAN to request a channel corresponding to the AP#5. This assumption corresponds to the first column of Table 5 below. In this case, the UTRAN recognizes the AP#3 and the AP#5. At this point, the UTRAN generates AP_AICH as a response to the received APs according to a defined previously criterion. As an example of the previously defined criterion, the UTRAN can respond to the received APs according to a receiving power ratio of the APs. Here, it is assumed that the UTRAN selects the AP#3. The UTRAN then transmits ACK to the AP#3 and NAK to the AP#S. This corresponds to the second column of Table 5.

Then, the UE#1, UE#2 and UE#3 receive ACK transmitted from the UTRAN, and randomly generate CD Ps, respectively. When three UEs generate the CD_Ps (i.e., at least in case that two UEs generate the CD_Ps for one AP_AICH), the respective UEs generate the CD_Ps using given signatures and the CD_Ps transmitted to the UTRAN have the different signatures. Herein, it is assumed that the UE#1 generated CD_P#6, the UE#2 generated CD_P#2 and the UE#3 generated CD_P#9, respectively. Upon receipt of the CD_Ps transmitted from the UEs, the UTRAN recognizes receipt of the 3 CD_Ps and examines whether the CPCHs requested by the UEs are available. When there exist more than 3 CPCHs corresponding to the request of the UE in the UTRAN, the UTRAN transmits ACKs to CD_ICH#2, CD_ICH#6 and CD_ICH#9, and transmits three channel assignment messages through the CA_ICH.

In this case, if the UTRAN transmits the messages for allocating the channel numbers of #4, #6 and #10 through the CA_ICH, the UEs will know the CPCH number allocated to themselves in the following process. The UE#1 knows the signature for the CD_P transmitted to the UTRAN and also knows that the signature number is 6. In this manner, even when the UTRAN transmits several ACKs to the CD_ICH, it is possible to know how many ACKs have been transmitted.

A detailed description of this embodiment of the present invention has been made on the assumption of the case shown in Table 5. First, the UTRAN has transmitted three ACKs to the UEs through CD_ICH, and also transmitted three channel assignment messages to the CA_ICH. The transmitted channel assignment messages correspond to the channel numbers of #2, #6 and #9. Upon receipt of the CD_ICH and the CA_ICH, the UE#1 may know that three UEs in the UTRAN have simultaneously requested the CPCH channels and the UE#1 itself can use the CPCH according to the contents of the second message out of the channel assignment messages transmitted through the CA_ICH, in the sequence of the ACKs of the CD_ICH.

TABLE 5

| UE No | AP No | AP_IACH | CD No | CA_ICH |
|---|---|---|---|---|
| 1 | 3 | ACK#3 | 6 (Second) | #6 (Second) |
| 2 | 3 | ACK#3 | 2 (First) | #4 (First) |
| 3 | 3 | ACK#3 | 9 (Third) | #10 (Third) |
| 4 | 5 | NAK#5 | | |

In this above process, since the UE#2 has transmitted the CD_P#2, the UE#2 will use the CA message #4 out of the channel assignment messages transmitted by the CA_ICH. In the same manner, the UE#3 is allocated the channel corresponding to CA message #10. In this manner, it is possible to simultaneously allocate several channel to several users.

2. Second Channel Assignment Method

The second channel assignment method is a modified form of the first channel assignment method, implemented by setting a transmission time difference τ between the CD_ICH frame and the CA_ICH frame to '0' to simultaneously transmit the CD_ICH and the CA_ICH. The W-CDMA system spreads one symbol of the AP_AICH with a spreading factor 256 and transmits 16 symbols at one slot of the AICH. The method for simultaneously transmitting the CD_ICH and the CA_ICH can be implemented by using symbols of different lengths. That is, the method can be implemented by allocating orthogonal codes having different spreading factors to the CD_ICH and the CA_ICH. As an example of the second method, when the possible number of the signatures used for the CD_P is 16 and a maximum of 16 CPCHs can be allocated, it is possible to allocate the channels of a length of 512 chips to the CA_ICH and the CD_ICH, and the CA_ICH and the CD_ICH each can transmit 8 symbols with a length of 512 chips. Here, by allocating 8 signatures, being orthogonal to one another, to the CD_ICH and the CA_ICH and multiplying the allocated 8 signatures by a sign of +1/−1, the CA_ICH and the CD_ICH can be transmitted using 16 signatures. This method is advantageous in E) that it is not necessary to allocate separate orthogonal codes to the CA_ICH, in addition to the orthogonal codes used for the CD_ICH.

As described above, the orthogonal codes having a length of 512 chips can be allocated to the CA_ICH and the CD_ICH in the following method. One orthogonal code $W_i$ of length 256 is allocated to both the CA_ICH and the CD_ICH. For the orthogonal code of length 512 allocated to the CD_ICH, the orthogonal code $W_i$ is repeated twice to create an orthogonal code $[W_i\ W_i]$ of length 512. Further, for the orthogonal code of length 512 allocated to the CA_ICH, an inverse orthogonal code —$W_i$ is connected to the orthogonal code $W_i$ to create an orthogonal code $[W_i\text{—}W_i]$. It is possible to simultaneously transmit the CD_ICH and the CA_ICH without allocating separate orthogonal codes, by using the created orthogonal codes $[W_i\ W_i]$ and $[W_i\text{—}W_i]$.

Figure 14:
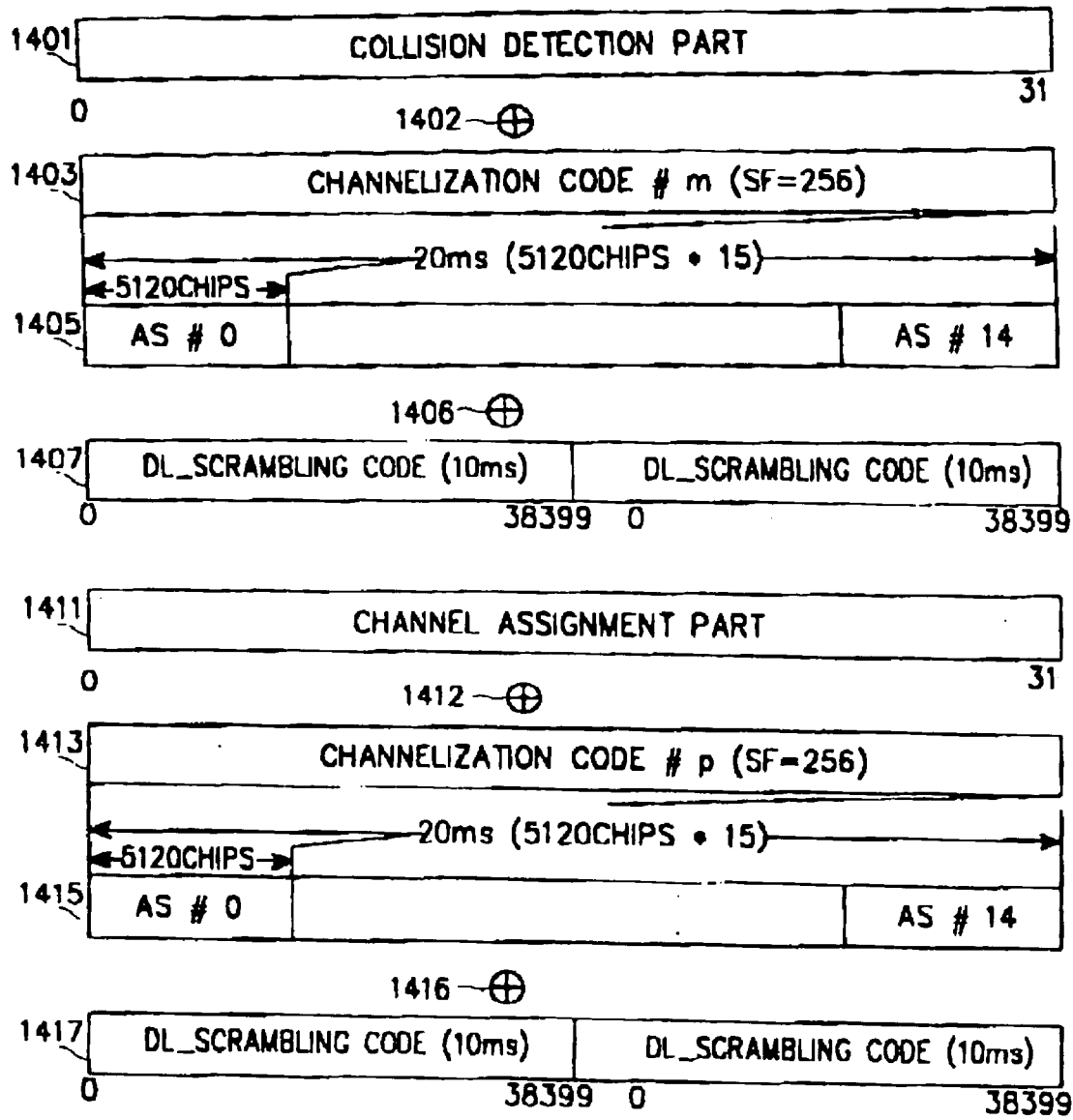
FIG. 14 is a diagram illustrating a method for simultaneously transmitting a CD_ICH and a CA_ICH by allocating different channelization codes having the same spreading factor to them according to an embodiment of the present invention.

FIG. 14 shows another example of the second method, wherein the CD_ICH and the CA_ICH are simultaneously transmitted by allocating different channelization codes having the same spreading factor to them. Reference numerals 1401 and 1411 of FIG. 14 indicate the CD_ICH part and the CA_ICH part, respectively. Reference numerals 1403 and 1413 indicate different orthogonal channelization codes having the same spreading factor of 256. Reference numerals 1405 and 1415 indicate a CD_ICH frame and a CA_ICH frame each comprised of access slots having a length of 5120 chips.

Referring to FIG. 14, the CD_ICH part 1401 is created by multiplying the signatures obtained by repeating a signature of length 16 twice in a symbol unit by sign values of '1', '−1' or '0' (indicating ACK, NAK, or acquisition failure, respectively) on a symbol unit basis. The CD_ICH part 1401 can simultaneously c:1 transmit ACK and NAK for several signatures. The CD_ICH part 1401 is spread with the channelization code 1403 by a multiplier 1402, and constitutes one access slot of the CD_ICH frame 1405. The CD_ICH frame 1405 is spread with a downlink scrambling code 1407 by a multiplier 1406 and then transmitted.

The CA_ICH part 1411 is created by multiplying the signatures obtained by repeating a signature of length 16 twice in a symbol unit by the sign values of '1', '−1' or '0' (indicating ACK, NAK, or acquisition failure, respectively) on a symbol unit basis. The CA_ICH part 1411 can simultaneously transmit ACK and NAK for several signatures. The CA_ICH part 1411 is spread with the channelization code 1413 by a multiplier 1412, and constitutes one access slot of the CA_ICH frame 1415. The CA_ICH frame 1415 is spread with a downlink scrambling code 1417 by a multiplier 1416 before transmission.

Figure 15:
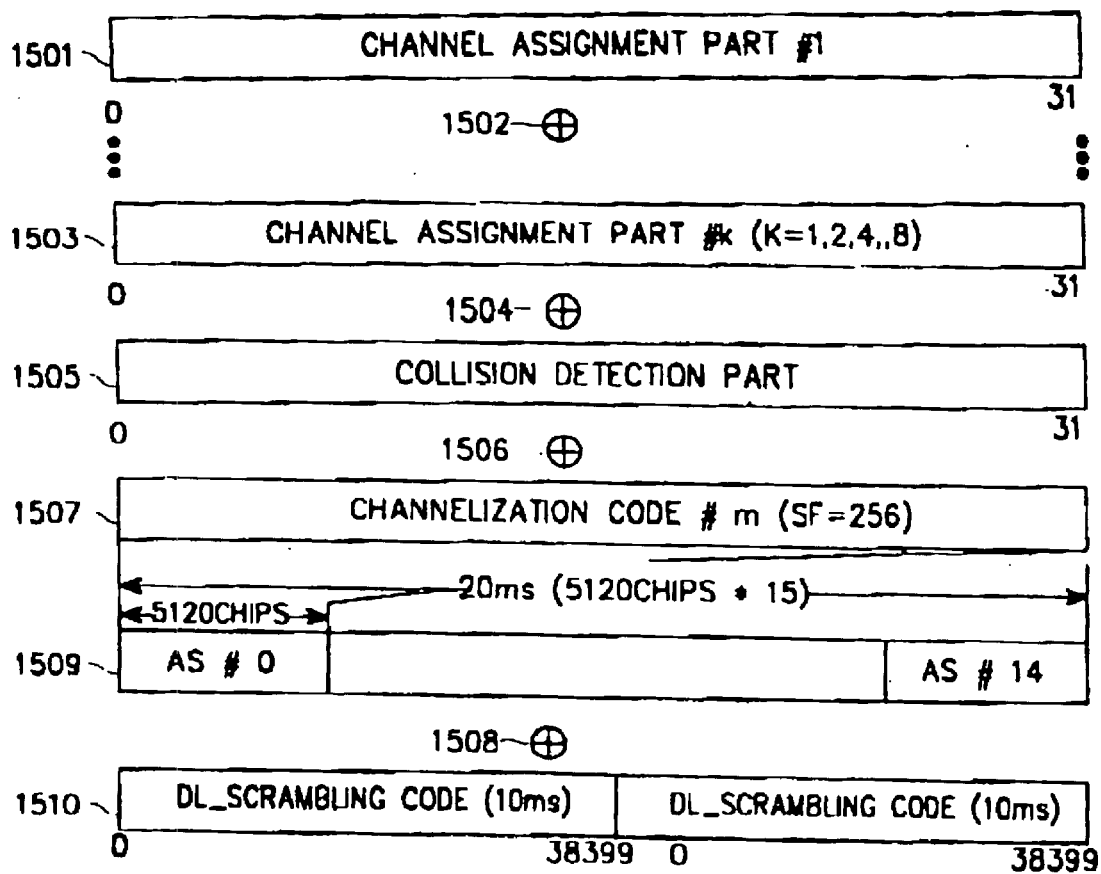
FIG. 15 is a diagram illustrating a method for spreading the CD_ICH and the CA_ICH with the same channelization code and simultaneously transmitting the spread channels using the different signature groups according to another embodiment of the present invention.

FIG. 15 shows further another example of the second method, wherein the CD_ICH and the CA_ICH are spread with the same channelization code generated the different signature sets respectively, and simultaneously transmitted using different signature groups.

Referring to FIG. 15, a CA_ICH part 1501 is created by multiplying the signatures obtained by repeating a signature of length 16 twice in a symbol unit by the sign values of '1', '−1' or '0' (indicating ACK, NAK, or acquisition failure, respectively) on a symbol unit basis. The CA_ICH part 1501 can simultaneously transmit ACK and NAK for several signatures. A $k^{th}$ CA_ICH part 1503 is used when one CPCH channel is associated with several CA signatures. A reason for associating one CPCH channel with several CA signatures is to decrease the probability that the UE will use a CPCH which is not allocated by the UTRAN due to an error occurred while the CA_ICH is transmitted from the UTRAN to the UE.

Reference numeral 1505 of FIG. 15 indicates a CD_ICH part. The CD_ICH part 1505 is identical to the CA_ICH part 1501 in physical structure. However, the CD_ICH part 1505 is orthogonal with the CA_ICH part 1501, since the CD_ICH part 1505 uses a signature selected from a signature set different from the signature set used for the CA_ICH part. Therefore, even though the UTRAN simultaneously transmits the CD_ICH and the CA_ICH, the UE cannot confuse the CD_ICH with the CA_ICH. The CA_ICH part#1 1501 is added to the CA_ICH part#k 1503 by an adder 1502. The CD_ICH part 1505 is added to the added CA_ICH part by an adder 1504, and then spread with the orthogonal channelization code 1507 by a multiplier 1506. The resulting spread value constitutes one slot of the CD/CA_ICH, and the CD/CA_ICH is spread with a downlink scrambling code 1510 by a multiplier 1508 before transmission.

In the method for simultaneously transmitting the CD_ICH and the CA_ICH by setting the transmission time difference τ between the CD_ICH frame and the CA_ICH frame to '0', the signatures for the AICH, shown in Table 4, defined in the W-CDMA standard can be used. With regard to the CA_ICH, since the UTRAN designates one of several CPCH channels to the UE, the receiver in the UE should attempt detecting several signatures. In the conventional AP_AICH and the CD_ICH, the UE would perform detection on only one signature. However, when the CA_ICH according to this embodiment of the present invention is used, the receiver in the UE should attempt detecting all the possible signatures. Therefore, there is required a method for designing or rearranging the structure of signatures for the AICH so as to decrease complexity of the receiver in the UE.

As described above, it will be assumed that the 16 signatures created by multiplying 8 signatures out of 16 possible signatures by the signs (+1/−1) are allocated to the CD_ICH, and the 16 signatures created by multiplying the remaining 8 signatures out of the 16 possible signatures by the signs (+1/−1) are allocated to the CA_ICH for CPCH assignment.

In the W-CDMA standard, the signatures for the AICH use the Hadamard function, which is made in the following format.

$$H_n = \begin{pmatrix} H_{n-1} & H_{n-1} \\ H_{n-1} & -H_{n-1} \end{pmatrix}$$

$$H_1 = \begin{pmatrix} 1 & 1 \\ 1 & -1 \end{pmatrix}$$

From this, the Hadamard function of length 16 required in the embodiment of the present invention is as follows. The signatures created by the Hadamard function shown in Table 4 show the format given after multiplying the signatures by a channel gain A of the AICH, and the following signatures show the format given before multiplying the signatures by the channel gain A of the AICH.

```
 1  1  1  1  1  1  1  1  1  1  1  1  1  1  1  1 => S0
 1 -1  1 -1  1 -1  1 -1  1 -1  1 -1  1 -1  1 -1 => S1
 1  1 -1 -1  1  1 -1 -1  1  1 -1 -1  1  1 -1 -1 => S2
 1 -1 -1  1  1 -1 -1  1  1 -1 -1  1  1 -1 -1  1 => S3
 1  1  1  1 -1 -1 -1 -1  1  1  1  1 -1 -1 -1 -1 => S4
 1 -1  1 -1 -1  1 -1  1  1 -1  1 -1 -1  1 -1  1 => S5
 1  1 -1 -1 -1 -1  1  1  1  1 -1 -1 -1 -1  1  1 => S6
 1 -1 -1  1 -1  1  1 -1  1 -1 -1  1 -1  1  1 -1 => S7
 1  1  1  1  1  1  1  1 -1 -1 -1 -1 -1 -1 -1 -1 => S8
 1 -1  1 -1  1 -1  1 -1 -1  1 -1  1 -1  1 -1  1 => S9
 1  1 -1 -1  1  1 -1 -1 -1 -1  1  1 -1 -1  1  1 => S10
 1 -1 -1  1  1 -1 -1  1 -1  1  1 -1 -1  1  1 -1 => S11
 1  1  1  1 -1 -1 -1 -1 -1 -1 -1 -1  1  1  1  1 => S12
 1 -1  1 -1 -1  1 -1  1 -1  1 -1  1  1 -1  1 -1 => S13
 1  1 -1 -1 -1 -1  1  1 -1 -1  1  1  1  1 -1 -1 => S14
 1 -1 -1  1 -1  1  1 -1 -1  1  1 -1  1 -1 -1  1 => S15
```

Eight of the above Hadamard functions are allocated to the CD_ICH and the remaining eight Hadamard functions are allocated to the CA_ICH. In order to simply perform the fast Hadamard transform (FHT), the signatures for the CA_ICH are allocated in the following sequence.

{S1, S9, S5, S13, S3, S7, S11, S15}

Further, the signatures for the CD_ICH are allocated in the following sequence.

{S2, S10, S6, S14, S4, S8, S12, S16}

Here, the signatures for the CA_ICH are allocated from left to right in order to enable the UE to perform FHT, thereby minimizing the complexity. When 2, 4 and 8 signatures are selected from the signatures for the CA_ICH from left to right, the number of A's is equal to the number of −A's in each column except the last column. By allocating the signatures for the CD_ICH and the CA_ICH in the above manner, it is possible to simplify the structure of the receiver in the UE for the number of the used signatures.

In addition, it is possible to associate the signatures to the CPCH or the downlink channel for controlling the CPCH in another format. For example, the signatures for the CA_ICH can be allocated as follows.

| | |
|---|---|
| [1, 9] | => a maximum of 2 signatures are used |
| [1, 5, 9, 13] | => a maximum of 4 signatures are used |
| [1, 3, 5, 7, 9, 11, 13, 15] | => a maximum of 8 signatures are used |

If NUM_CPCH (where I<NUM_CPCH <=16) CPCHs are used, the signs (+1/−1) multiplied by the signatures associated with a $k^{th}$ a $k^{th}$ (k=0, ..., NUM_CPCH-1) CPCH (or a downlink channel for controlling the CPCH) are given as follows.

CA sign sig[k]=(−1)[k mod 2]

where CA sign sig[k] indicates the sign of +1/−1 multiplied by the $k^{th}$ signature, and [k mod 2] indicates a remainder determined by dividing 'k' by 2. 'x' is defined as a number indicating a dimension of the signatures, which can be expressed as follows.

$$x = 2 \text{ if } 0 < NUM\_CPCH \leq 4$$
$$4 \text{ if } 4 < NUM\_CPCH \leq 8$$
$$8 \text{ if } 8 < NUM\_CPCH \leq 16$$

Further, the used signatures are as follows.

CA_sig [k]=(16/x)*⌊k/2⌋+1 where ⌊Y⌋ indicates that the maximum integer which does not exceed 'y'. For example, when 4 signatures are used, they can be allocated as follows.

```
S1 → 1  1  1  1   1  1  1  1   1  1  1  1   1  1  1  1
S5 → 1  1  1  1  -1 -1 -1 -1   1  1  1  1  -1 -1 -1 -1
S9 → 1  1  1  1   1  1  1  1  -1 -1 -1 -1  -1 -1 -1 -1
S13→ 1  1  1  1  -1 -1 -1 -1  -1 -1 -1 -1   1  1  1  1
```

As can be appreciated, if the signatures are allocated according to an embodiment of the present invention, the signatures have a format in which the Hadamard codes of length 4 are repeated four times. The receiver in the UE adds the repeated 4 symbols and then takes FHT of length 4, when receiving the CA_ICH, thereby making it possible to greatly decrease the complexity of the UE.

Furthermore, it is also possible to associate the CA_ICH signature mapping with the format in which the signature numbers for the respective CPCH: are added by one. In this case, the consecutive $2i^{th}$ and $(2i+1)^{th}$ symbols have opposite signs, and the receiver in the UE subtracts the rear symbol from the front symbol out of the despread symbols, so that it can be regarded as the same implementation.

On the contrary, the signatures for the CD_ICH can be allocated in the following sequence. The easiest way of creating the signatures for the $k^{th}$ CD_ICH is to increase the signature number by one in the above method for allocating the signatures for the CA_ICH. Another method can be expressed as follow.

CD sign sig[k]=(−1)[k mod 2]

CD sig [k]=2*+2

That is, as described above, the CA_ICH is allocated in the sequence of [2, 4, 6, 8, 10, 12, 14, 16].

Figure 16:
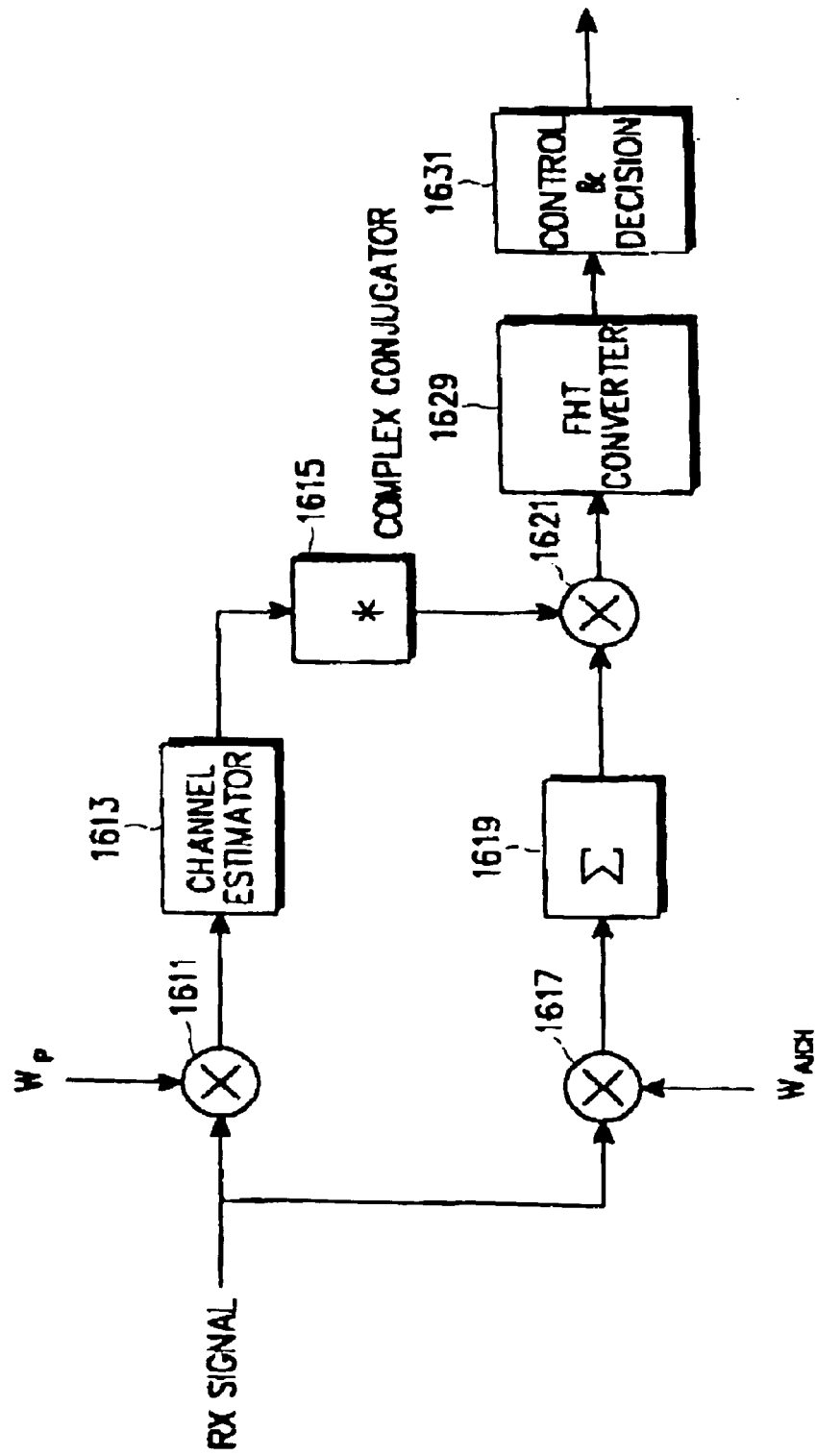
FIG. 16 is a diagram illustrating a CA_ICH receiver of a user equipment for a signature structure according to an embodiment of the present invention.

FIG. 16 shows an example of CA_ICH receiver structure of the UE for the above signature structure.

Referring to FIG. 16, a multiplier 1611 multiplies a received signal by a spreading code $W_p$ allocated for the pilot channel in order to despread the received signal, and provides the despread signal to a channel estimator 1613. The channel estimator 1613 estimates the size and phase of the downlink channel from the despread pilot channel signal. A complex conjugator 1615 complex conjugates the output of the channel estimator 1613. A multiplier 1617 multiplies the received signal by a Walsh spreading code allocated for the AICH channel, and an accumulator 1619 accumulates the outputs of the multiplier 16117 for a predetermined symbol period (e.g. 256-chip period) and outputs despread symbols. A multiplier 1621 multiplies the output of the accumulator 1619 by the output of the complex conjugator 1615 to modulate the input values, and provides the resulting output value to an FHT converter 1629. Receiving the demodulated symbols, the FHT converter 1629 outputs signal strength for each signature. A control and decision block 1631 receives the output of the FHT converter 1629 and decides a signature having the highest possibility for the CA_ICH.

In this embodiment of the present invention, the signature specified in the W-CDMA standard is used for the signature structure for the CA_ICH to simplify the structure of the receiver for the UE. Another assignment method will be described below, which is more efficient than the method for using a part of the signatures for the CD_ICH.

In this new assignment method, $2^K$ signatures of length $2^K$ are generated. (If the $2^K$ signatures are multiplied by the signs of +1/−1, the possible number of the signatures can be $2^{K+1}$). However, if only some of the signatures are used, rather than all, it is necessary to more efficiently allocate the signatures in order to decrease complexity of the receiver for the UE. It will be assumed that M signatures out of the total signatures are used. Herein, $2<M<=2^L$ and $1<=L<=K$. The M signatures of length $2^K$ are converted to the form in which each bit of the, Hadamard function of length $2^L$ is repeated $2^{K-L}$ times before transmission.

In addition, further another method for transmitting the AICH is to use signatures other than the signatures used for the AP. These signatures are shown in Table 6 below.

A second embodiment of the present invention uses the signatures shown in Table 6 for the AICH signatures and allocates the CA_ICH so that the UE receiver may have low complexity. An orthogonal property is maintained between the AICH signatures. Therefore, if the signatures allocated to the AICH are efficiently arranged, the UE can easily demodulate the CD_ICH by fast Hadamard transform (FHT).

TABLE 6

| | Preamble Symbol | | | | | | | | | | | | | | | |
|---|---|---|---|---|---|---|---|---|---|---|---|---|---|---|---|---|
| Signature | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
| 1 | A | A | A | −A | −A | −A | A | −A | −A | A | A | −A | A | −A | A | A |
| 2 | −A | A | −A | −A | A | A | A | −A | A | A | A | −A | −A | A | −A | A |
| 3 | A | −A | A | A | A | −A | A | A | −A | A | A | A | −A | A | −A | A |

TABLE 6-continued

| | Preamble Symbol | | | | | | | | | | | | | | | |
|---|---|---|---|---|---|---|---|---|---|---|---|---|---|---|---|---|
| Signature | $P_0$ | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | $P_{13}$ | $P_{14}$ | $P_{15}$ |
| 4 | -A | A | -A | A | -A | -A | -A | -A | -A | A | -A | A | -A | A | A | A |
| 5 | A | -A | -A | -A | -A | A | A | -A | -A | -A | -A | A | -A | -A | -A | A |
| 6 | -A | -A | A | -A | A | -A | A | -A | A | -A | -A | A | A | A | A | A |
| 7 | -A | A | A | A | -A | A | A | A | -A | -A | -A | -A | -A | -A | -A | A |
| 8 | A | A | -A | -A | -A | -A | -A | A | A | -A | A | A | A | A | -A | A |
| 9 | A | -A | A | -A | -A | A | -A | A | A | A | -A | -A | -A | A | A | A |
| 10 | -A | A | A | -A | A | A | -A | A | -A | -A | A | A | -A | -A | A | A |
| 11 | A | A | A | A | A | A | -A | -A | A | A | -A | A | A | -A | -A | A |
| 12 | A | A | -A | A | A | A | A | A | -A | -A | -A | -A | A | A | A | A |
| 13 | A | -A | -A | A | A | -A | -A | -A | A | -A | A | -A | A | -A | A | A |
| 14 | -A | -A | -A | A | -A | A | A | A | A | A | A | A | A | -A | A | A |
| 15 | -A | -A | -A | -A | A | -A | -A | A | -A | A | -A | -A | A | -A | -A | A |
| 16 | -A | -A | A | A | -A | A | -A | -A | -A | -A | A | -A | A | A | -A | A |

In Table 6, let's say that $n^{th}$ signature is represented by Sn and a value determined by multiplying $n^{th}$ signature by a sign '-1' is represented by -Sn. The AICH signatures according to a second embodiment of the present invention are allocated as follows.

{S1, -S1, S2, -S2, S3, -S3, S14, -S14, S4, -S4, S9, -S9, S11, -S11, S15, -S15}

If the number of the CPCHs is smaller than 16, the signatures are allocated to the CPCHs from left to right so as to enable the UE to perform FHT, thereby reducing the complexity. If 2, 4 and 8 signatures are selected from {1, 2, 3, 14, 15, 9, 4, 11} from left to right, the number of A's is equal to the number of -A's in each column excepting the last column. Then, by rearranging (or permuting) the sequence of the symbols and multiplying the rearranged symbols by a given mask, the signatures are converted to an orthogonal code capable of performing FHT.

Figure 17:
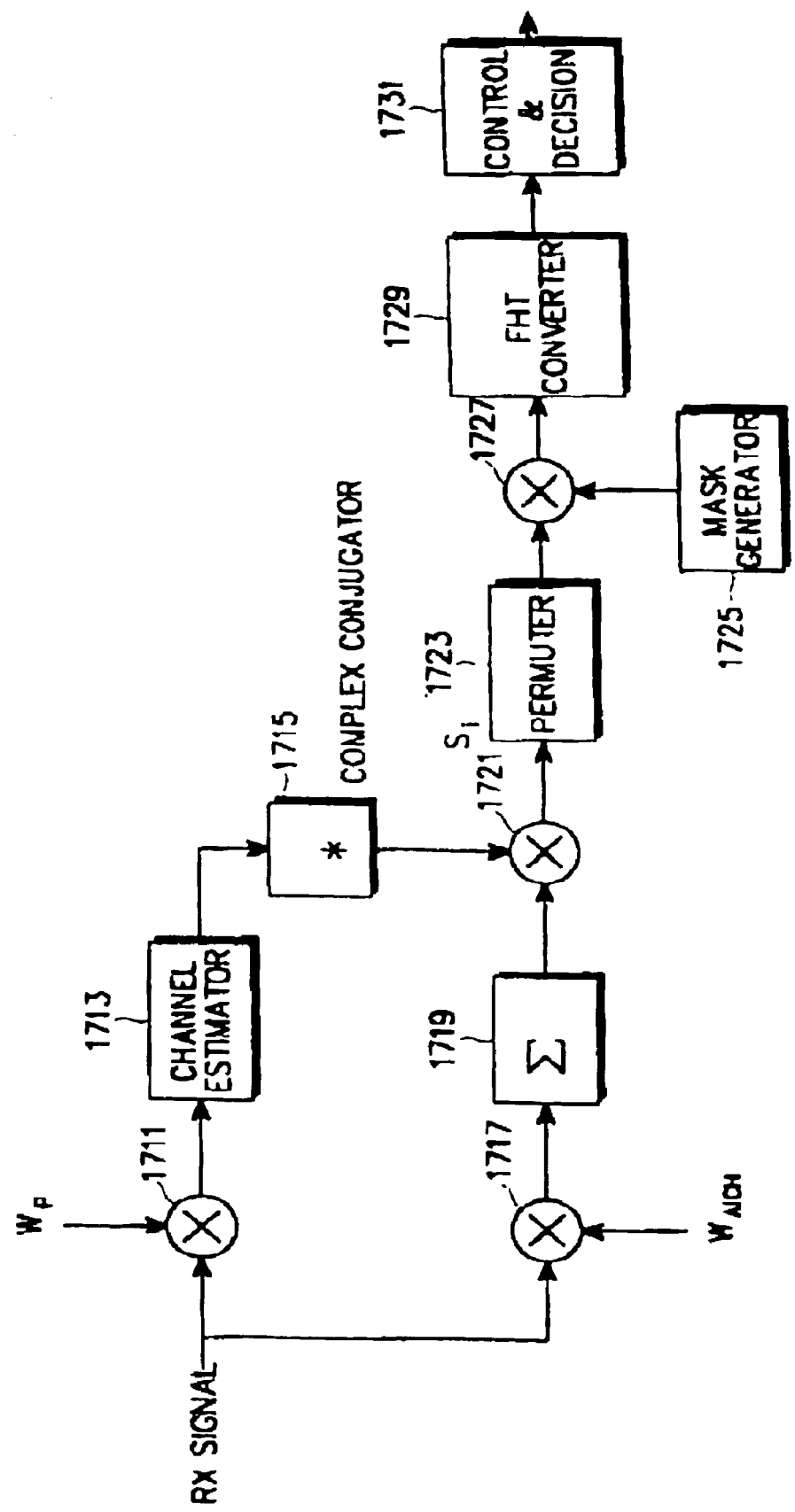
FIG. 17 is a diagram illustrating a receiver structure according to another embodiment of the present invention.

FIG. 17 shows a structure of a receiver for the UE using the signatures according to a second embodiment of the present invention.

Referring to FIG. 17, the UE despreads an input signal for a 256 chip period to generate channel-compensated symbol $X_i$. If it is assumed that $X_i$ indicates an if symbol input to the UE receiver, a position shifter 1723 rearranges $X_i$ as follows.

Y={$X_{15}$, $X_9$, $X_{10}$, $X_6$, $X_{11}$, $X_3$, $X_7$, $X_1$ $x_{13}$, $X_{12}$, $X_{14}$, $X_4$, $X_8$, $X_5$, $X_2$, $X_0$}

A multiplier 1727 multiplies the rearranged value Y by the following mask M generated by a mask generator 1725.

M={-1, -1, -1, 1, 1, 1, -1, -1, -1, -1, 1, 1, 1, -1, -1}

Then, the signatures of S1, S2, S3, S14, S15, S9, S4 and S11 are converted into S'1, S'1, S'1, S'14, S'15, S'9, S'4 and S'11, as follows.

by a given mask, the signatures are converted to an orthogonal code capable of performing FHT. Further, it is not necessary to perform FHT on the length 16, and it is possible to further decrease the complexity of the receiver by adding the repeated symbols and performing FHT on the added symbols. That is, when 5 to 8 signatures are used (i.e., 9 to 16 CPCHs are used), two symbols are repeated. Thus, if the repeated symbols are added, FHT is performed on the length 8. In addition, when 3 to 4 signatures are used (i.e., 5 to 8 CPCHs are used), 4 symbols are repeated, so that FHT can be performed after adding the repeated symbols. By efficiently rearranging the signatures in this manner, it is possible to drastically decrease the complexity of the receiver.

The UE receiver of FIG. 17 is constructed to rearrange the despread symbols and then multiplies the rearranged symbols by a specific mask M. However, it is possible to obtain the same result even if the despread symbols are first multiplied by a specific mask M and then rearranged. In this case, it should be noted that the mask M should be different from the other one.

Describing operation of the receiver shown in FIG. 17, a multiplier 1711 receives an output signal of an A/D converter (not shown) and multiples the received signal by a channelization code $W_p$ allocated for the pilot channel in order to despread the received signal. A channel estimator 1713 estimates the size and phase of the downlink channel from the despread pilot signal. A multiplier 1717 multiplies the received signal by a Walsh spreading code $W_{AICH}$ for the AICH channel, and an accumulator 1719 accumulates the outputs of the multiplier 1717 for a predetermined symbol period (e.g., 256-chip period) and outputs despread symbols. For demodulation, the despread AICH symbols are multi-

```
S'1  = 1  1  1  1  1  1  1  1  1  1  1  1  1  1  1  1
S'2  = 1  1  1  1  1  1  1 -1 -1 -1 -1 -1 -1 -1 -1 -1
S'3  = 1  1  1  1 -1 -1 -1 -1 -1 -1 -1 -1  1  1  1  1
S'14 = 1  1  1  1 -1 -1 -1 -1  1  1  1  1 -1 -1 -1 -1
S'15 = 1  1 -1 -1  1  1 -1 -1  1  1 -1 -1  1  1 -1 -1
S'9  = 1  1 -1 -1  1  1 -1 -1 -1 -1  1  1 -1 -1  1  1
S'4  = 1  1 -1 -1 -1 -1  1  1 -1 -1  1  1  1  1 -1 -1
S'11 = 1  1 -1 -1 -1 -1  1  1  1  1 -1 -1 -1 -1  1  1
```

It can be understood that by rearranging the sequence of the input symbols and multiplying the rearranged symbols plied by the output of a complex conjugator 1715, which complex conjugates the output of the channel estimator 1713. The demodulated symbols are provided to a position shifter (or permuter) 1723, which rearranges the input symbols such that the repeated symbols should neighbor to each other. The output of the position shifter 1723 is multiplied by a mask output from a mask generator 1725 by a multiplier 1727 and provided to an FHT converter 1729. Receiving the output of the multiplier 1727, the FHT converter 1729 outputs a signal strength of each signature. A control and decision block 1731 receives the output of the FHT converter 1729 and decides the signature having the highest possibility for CA_ICH.

In FIG. 17, it is possible to obtain the same results, although the locations of the position shifter 1723, the mask generator 1725 and the multiplier 1727 are interchanged. Further, even if the UE receiver does not rearrange the position of the input symbols using the position shifter 1723, it is also possible to previously appoint the positions to which the symbols are to be transmitted and use the positional information when performing FHT.

Summarizing this embodiment of the CA_ICH signature structure according to the present invention, $2^K$ signatures of length $2^K$ are generated. (If the $2^K$ signatures are multiplied by the signs of +1/−1, the possible number of the signatures can be $2^{K+1}$). However, if only some of the signatures are used, rather than all, it is necessary to more efficiently allocate the signatures in order to decrease the complexity of the UE receiver. It will be assumed that M signatures out of the total signatures are used. Herein, $2^L-1<M<=2^L$ and $1<=L<=K$. The M signatures of length $2^K$ are converted to the form in which each bit of the Hadamard function of length $2^L$ is repeated $2^{K-L}$ times before transmission, when a specific mask or the processing of the exclusive-OR is applied to the respective bits after permuting the symbols. Therefore, this embodiment aims to simply perform FHT by multiplying the received symbols by a specific mask and permuting the symbols at the UE receiver.

It is important not only to select the proper signatures used for allocating the CPCH channel, but also to allocate the data channel and control channel for the uplink CPCH and a downlink control channel for controlling the uplink CPCH.

First, the easiest method for allocating the uplink common channel is to allocate a downlink control channel over which the UTRAN transmits power control information and an uplink common control channel over which the UE transmits a control message, by associating the downlink control channel with the uplink common control channel on a one-to-one basis. When the downlink control channel and the uplink common control channel are allocated on a one-to-one basis, it is possible to allocate the downlink control channel and the uplink common control channel by transmitting a command only once without a separate additional message. That is, this channel assignment method is applied when the CA_ICH designates both the downlink channel and the uplink channel.

A second method maps the uplink channel by using the function of the signatures for the AP transmitted by the UE, the slot number of the access channel at which the AP is transmitted, and the signatures for the CD_P transmitted by the UE. For example, the uplink common channel can be associated with an uplink channel corresponding to a slot number at a time point when the CD_P is transmitted and the signature for the CD_P. That is, in the above channel assignment method, the CD_ICH has a function to allocate the channel used for the uplink and the CA_ICH has a function to allocate the channel used for the downlink. If the UTRAN allocates the downlink channel in this method, it is possible to maximally utilize the resources of the UTRAN, thereby increasing the efficiency of the utilization of channels.

Since the UTRAN and the UE each can know the signature used for the AP transmitted from the UE and the CA_ICH, i.e, the channel assignment message, received at the UE, another method which allocates the CPCH by using these two variables. The UTRAN can allocated the CPCH the UE with flexibility. The principle of those methods is as follows. The signature used for AP is mapped to the data rate which the UE requires and the CA_ICH is mapped to one of the CPCH channels which can support the data rate required by the UE. Here, if the number of the signatures for the AP is M and the number of the CA_ICHs is N, the number of selectable cases is M×N.

It will be assumed herein that the number of the signatures for the AP is M=3 and the number of the CA_ICHs is N=4, as shown in Table 7 below.

TABLE 7

|  |  | CA No received over CA_ICH | | | |
| --- | --- | --- | --- | --- | --- |
|  | Channel No | CA(1) | CA(2) | CA(3) | CA(4) |
| AP No | AP(1) | 1 | 2 | 3 | 4 |
|  | AP(2) | 5 | 6 | 7 | 8 |
|  | AP(3) | 9 | 10 | 11 | 12 |

In Table 7, the signatures for the AP are AP(1), AP(2) and AP(3), and the channel numbers allocated by the CA_ICH are CA(1), CA(2), CA(3) and CA(4). For channel assignment, if the channels are selected by the CA_ICH only, the available number of channels is 4. That is, when the UTRAN transmits CA(3) to the UE and the UE then receives CA(3), the UE is allocated the $3^{rd}$ channel. However, since the UE and the UTRAN know the signature number for the AP and the CA number (or the CA signature number for the CA_ICH), it is possible to combine these. For example, in the case where the channels are allocated using the AP number and the CA number shown in Table 7, if the UE has transmitted AP(2) and the UTRAN has transmitted CA(3), the UE selects the channel number 7 (2,3) rather than selecting the channel number 3. That is, from Table 7, it is possible to know the channel corresponding to AP=2 and CA=3, and the information of Table 7 is commonly stored in the UE and the UTRAN. Therefore, the UE and the UTRAN may know that the allocated CPCH's channel number is 7, by selecting the second row and the third column of Table 7. As a result, the channel number of the CPCH corresponding to (2,3) is 7.

Therefore, the method for selecting the channel using the two variables increases the number of selectable channels. The UE and the UTRAN have the information of Table 7 by signal exchange in the upper layer, or can calculate the information according to a formula. That is, it is possible to determine an intersection and a number using the AP number in row and the CA number in column. At present, since there are 16 kinds of APs and there are 16 numbers which can be allocated by the CA_ICH, the number of the possible channels is 16×16=256.

Such an operation will be described with reference to FIGS. 18 and 19. A controller 1820 of the UE and a controller 1920 of the UTRAN can be equipped with the channel assignment information such as Table 7, or the calculating method stated above. It will be assumed in FIGS.

18 and 19 that the controllers 1820 and 1920 include the information of Table 7.

The controller 1820 of the UE determines, when communication over the F, CPCH is required, an AP signature corresponding to a desired data rate, and transmits the determined AP signature through a preamble generator 1831 which multiplies the determined AP signature by the scrambling code in a unit of a chip. Upon receipt of the AP preamble, the UTRAN examines the signature used for the AP preamble. If the received signature is not used by another UE, the UTRAN creates the AP_AICH using the received signature. Otherwise, if the received signature is used by another UE, the UTRAN creates the AP_AICH using a signature value obtained by inverting the phase of the received signature. Upon receipt of an AP preamble for which a different signature is used by another UE, the UTRAN examines whether to use the received signature and creates the, AP_AICH using the inversed or in-phase signature of the received signature. Thereafter, the UTRAN creates the AP_AICH by adding the generated AP_AICH signals and thus, can transmit the status of the signatures.

Upon receipt of an AP_AICH using the same signature as the transmitted signature, the UE creates the CD_P using any one of the signatures for detecting collision and transmits the created CD_P. Upon receipt of the signature included in the CD_P from the UE, the UTRAN transmits the CD_ICH using the same, signature as the signature used for the CD_P. At this time, if the UTRAN receives' the CD_P through a preamble demodulator 1911, the controller 1920 of the UTRAN$_1$ knows the CPCH assignment request and creates a CA_ICH and transmits the CA_ICH to the UE. As stated above, the CD_ICH and the CA_ICH can be transmitted either simultaneously or separately. Describing the operation of generating the CA_ICH, the UTRAN determines an unused scrambling code out of the scrambling codes corresponding to the data rate requested by the UE and determines a signature according to the signatures used for the AP transmitted by the UE, i.e., the designated CA_ICH signature of Table 7. The combination of the determined CA_ICH signature and the signature used for the AP is the channel assignment information of the CPCH. The controller 1920 of the UTRAN assigns the CPCH by combining the determined CA_ICH signature with the received AP signature, then the UTRAN receives the determined CA_ICH signature information through an AICH generator 1931 to generate the CA_ICH. The CA_ICH is transmitted to the UE through a frame formatter 1933. Upon receipt of the CA_ICH signature information, the UE knows the CPCH to be used by the UE in the above manner by using the signature used for the AP and the received CA_ICH signature.

Figure 18:
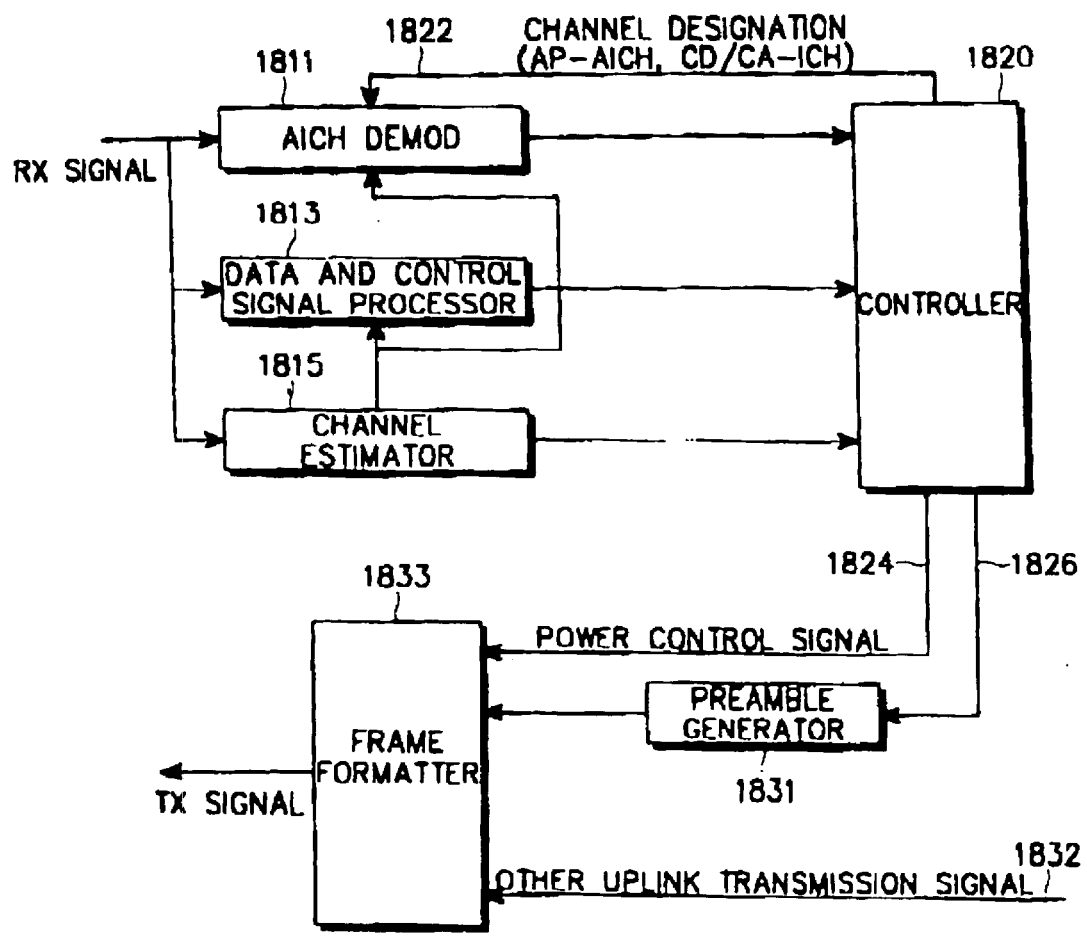
FIG. 18 is a diagram illustrating a transceiver of a user equipment according to an embodiment of the present invention.

FIG. 18 shows a transceiver structure of the UE for communicating with the UTRAN by using an uplink CPCH according to an embodiment of the present invention.

Referring to FIG. 18, an AMCH demodulator 1811 demodulates' an AICH signals on the downlink transmitted from the AICH generator of the UTRAN, according to a control message 1822 provided from the controller 1820. The control message 1822 indicates that the downlink signal being received is one of the AP_AICH, the CD_ICH or the CA_ICH. The AICH demodulator 1811 may include an AP_AICH demodulator, a CD_ICH demodulator and a CA_ICH demodulator. In this case, the controller 1820 designates the channels of the respective demodulators to enable them to receive an AP_AICH, a CD_ICH and a CA_ICH, transmitted from the UTRAN. The AP_AICH, CD_ICH and CA_ICH can be implemented by either one demodulator or separate demodulators. In this case, the controller, 1820 can designate the channels by allocating the slots to receive the time-divided AICHs.

A downlink channel is designated to a data and control signal: processor 1813 by the controller 1820 and the data and control signal processor 1813 CJ, processes data or a control signal (including a power control command) received over the designated channel. As a channel estimator 1815 can estimate strength of a signal received from the UTRAN over the downlink., it assists a signal processor 1813 with the demodulation of the received date by controlling a phase compensation and a gain of the received data.

The controller 1820 controls the overall operation of a downlink channel receiver and an uplink channel transmitter of the UE. In this embodiment of the present invention, the controller 1820 controls the generation of the access preamble AP and the collision detection preamble CD_P by a preamble generating control signal 1826 while accessing the UTRAN. The controller 1820 controls transmission power of the uplink using an uplink power control signal 1824 and processes the AICH signals transmitted from the UTRAN. That is, the controller 1820 controls the preamble generator 1831 to generate the access preamble AP and the collision detection preamble CD_P as shown by 301 of FIG. 3 and controls the AICH demodulator 1811 to process the AICH signals generated as shown by 301 of FIG. 3.

The preamble generator 1831, under the control of the controller 1820, generates the preambles AP and CD_P as shown by 331 of FIG. 3. A frame formatter 1833 format frame data by receiving the preambles AP and CD_P output from the preamble generator 1831, and transmits the packet data and pilot signals on the uplink. The frame formatter 1833, controls the transmission power of the uplink according to the power control signal output from the controller 1820. The frame formatter 1833 can also transmit another uplink transmission signals 1832 such as a power control preamble and a data after being allocated a CPCH from the UTRAN. In this case, it is also possible to transmit a power control command transmitted over the uplink channel in order to control transmission power of the downlink.

Figure 19:
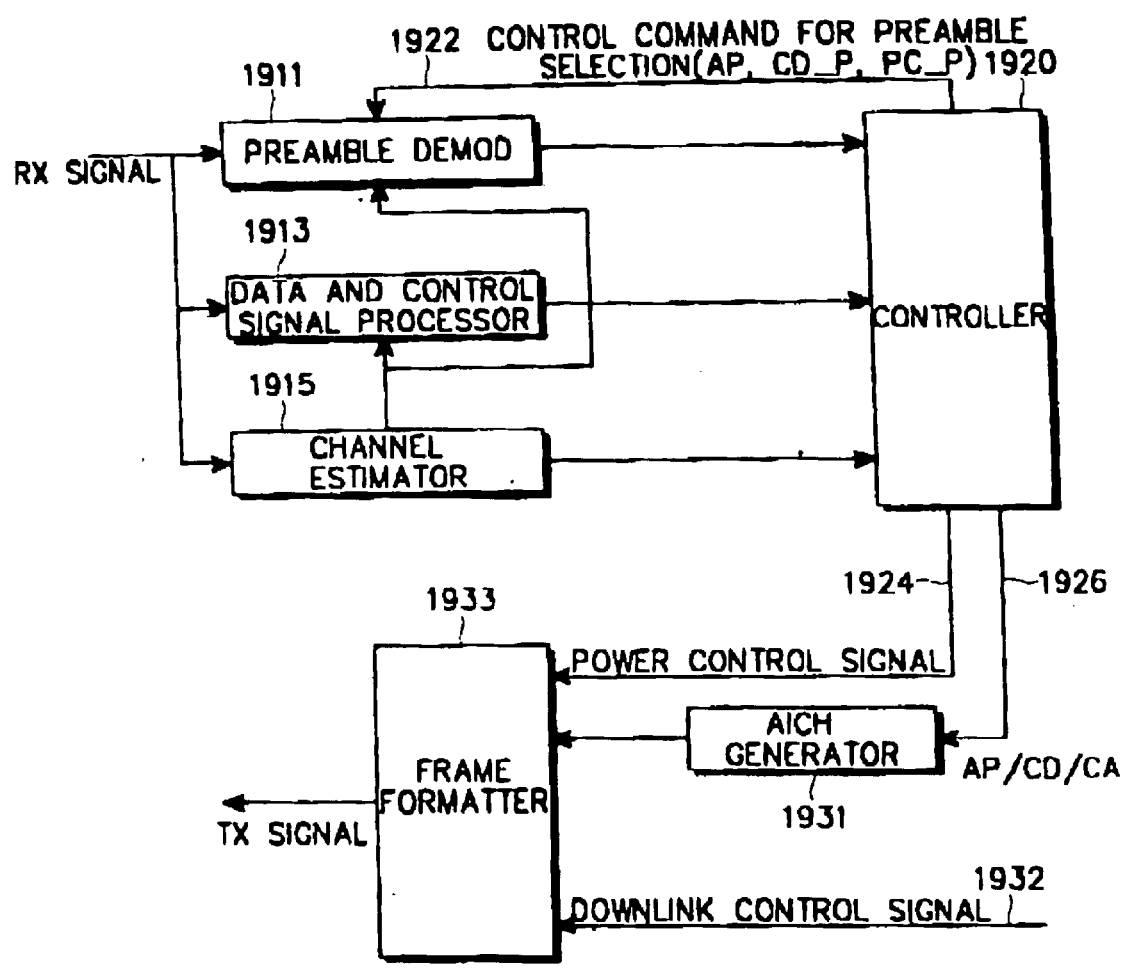
FIG. 19 is a diagram illustrating a transceiver of a UTRAN according to an embodiment of the present invention.

FIG. 19 shows a transceiver of the UTRAN for communicating with the UE by using the uplink CHCH and the downlink channel according to an embodiment of the present invention.

Referring to FIG. 19, an AICH detector 1911 detects the AP and the CD_P shown by 331 of FIG. 3 and provides the controller 1920 with the detected AP and CD_P. An uplink channel is designated to a data and control signal processor 1913 by the controller 1920 and the data and control signal processor 1913 processes data or a control signal received over the designated channel. A channel estimator 1915 estimates strength of a signal received from the UE over the downlink, and controls a gain of the data and control signal processor 1913.

The controller 1920 controls the overall operation of a downlink channel transmitter and an uplink channel receiver of the UTRAN. The controller 1920 controls detection of the access preamble AP and the collision detection preamble CD_P generated by the UE. Moreover, the controller 1920 controls the generation of the AICH signals for responding to the AP and the CD_P and the channel assignment message by using a preamble select control command 1922. That is, when the AP or the CD_P is detected by the preamble detector 1911, the controller saw 1920 controls the AICH generator 1931 using an AICH generation control command 1926, to generate the AICH signals shown in 301 of FIG. 3.

The AICH generator 1931, under the control of the controller 1920, generates the AP_AICH, the CD_ICH and the CA_ICH which are response signals to the preamble signals. The AICH generator 1931 may be equipped with an AP_AICH generator, a CD_ICH generator and a CA_ICH generator. In this case, the controller 1920 designates the generators so as to generate the AP_AICH, CD_ICH and CA_ICH shown in 301 of FIG. 3. The AP_AICH, CD_ICH and CA_ICH can be implemented by either one generator or separate generators. When the AP_AICH, the CD_ICH and the CA_ICH are generate from the same AICH generator, the controller 1920 can allocate the time-divided slots of the AICH frame to the AP_AICH, the CD_ICH and the CA_ICH so as to transmit the AP_AICH, CD_ICH and CA_ICH within one frame.

A frame formatter 1933, formats the frame data according to the AP_AICH, CD_ICH and CA_ICH output from the AICH generator 1931, and the downlink control signals. The frame formatter 1933 also controls transmission power of the uplink according to the power control signal 1924 transmitted from the controller 1920. Further, when a power control command for the downlink received from the UE, the frame formatter 1933, may control transmission power of an downlink channel which controls the transmission power of the common packet channel according to the power control command received from the UE.

Figure 20:
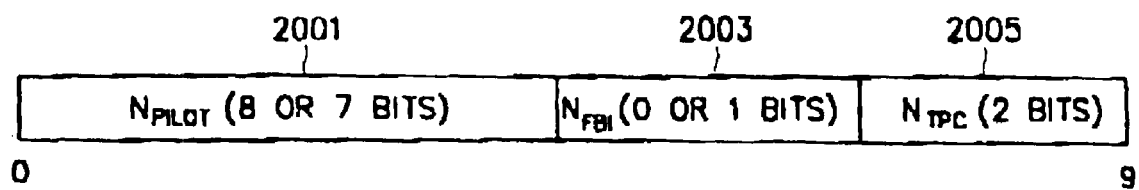
FIG. 20 is a diagram illustrating a slot structure of a power control preamble according to an embodiment of the present invention.

FIG. 20 shows a slot structure of a power control preamble PC_P transmitted from the UE to the UTRAN. The PC_P has a length of 0 or 8 slots. The length of the PC_P can be 0 slot, when the radio environment between the UTRAN and the UE is so good that it is not necessary to set the initial power of the uplink CPCH or when the system does not use the PC_P. Otherwise, the length of the PC_P can be 8 slots. The fundamental structure of the PC_P shown in FIG. 20 is defined in the W-CDMA standard specification. The PC_P has two slot types and each slot consists of 10 bits. Reference numeral 2001 of FIG. 20 indicates the pilot field, which is comprised of 8 or 7 bits according to the slot type of the PC_P., Reference numeral 2003 indicates a feedback information field used when there is feedback information to be transmitted to the UTRAN, and this field has a length of 0 or 1 bit. Reference numeral 2005 indicates a field for transmitting a power control command. This field is used when the UE controls the transmission power of the downlink, and has a length of 2 bits.

The UTRAN measures the transmission power of the UE using the pilot field 2001 of the PC_P and then transmits a power control command over the downlink dedicated channel to control the initial transmission power of the uplink CPCH. In the power control process, the UTRAN transmits a power-up command when it is determined that the transmission power of the UE is low, and transmits a power-down command when it is determined that the transmission power is high.

In this preferred embodiment of the present invention, there is proposed a method for using the PC_P for the purpose of confirming CPCH setting in addition to the purpose of power control. A reason for confirming CPCH setting is as follows. When the UTRAN has transmitted a channel assignment message to the UE, the channel assignment message may have an error due to a bad radio environment or a bad multi-path environment between the UTRAN and the UE. In this case, the UE will receive the channel assignment message with errors and wrongly use a CPCH which was not designated by the UTRAN, thus, causing a collision on the uplink with another UE using the corresponding CPCH. Such a collision may occur in the prior art even when the right of using the channel is required, if the UE misconceives NAK transmitted from the UTRAN, for ACK. Therefore, one preferred embodiment of the present invention proposes a! method in which the UE requests the UTRAN to confirm the channel message again, thereby increasing the reliability in using the uplink CPCH.

The above method in which the UE requests the UTRAN to confirm the channel assignment message or channel request message, using the PC_P, does not affect the PC_P's original purpose of measuring receiving power of the uplink for power control. The pilot field of the PC_P is an information known to the UTRAN, and a value of the channel assignment confirmation message transmitted from the UE to the UTRAN is also known to the UTRAN, so that the UTRAN has no difficulty in measuring the receiving power of the uplink. Therefore, the UTRAN can confirm whether the UE has normally received the channel assignment message, by examining the CA confirmation message transmitted over the PC_P. In this embodiment of the present invention, if the pilot bits known to the UTRAN are not demodulated in the process of measuring the receiving power of the uplink, the UTRAN determines that a channel assignment message or an ACK message used in case of the prior art transmitted to the UE has an error, and continuously transmits a power-down command for decreasing transmission power of the uplink over a downlink which corresponds to the CPCH on a one-to-one basis. Since the W-CDMA standard specifies that the power-down command should be transmitted 16 times for one 10 ms frame, the transmission power decreases by at least 15 dB within 10 ms from the time point when the error has occurred, not having so serious an influence over the other UEs.

FIG. 21 shows a generation scheme of the PC_P of FIG. 20. Referring to FIG. 21, reference numeral 2101 indicates the PC_P and has the same structure as shown in FIG. 20. Reference numeral 2103 indicates a channelization code, which is multiplied by the CP_P by a multiplier 2102 to spread the PC_P. The channelization code 2103 has a spreading factor of 256 chips, and is set according to a rule determined by a CA message transmitted from the UTRAN. Reference numeral 2105 indicates a PC_P frame, which is comprised of 8 slots, each slot having a length of 2560 chips. Reference numeral 2107 indicates an uplink scrambling code used for the PC_P. A multiplier 2106 spreads the PC_P frame 2105 with the uplink scrambling code 2107. The spread PC_P frame is transmitted to the UTRAN.

Figure 22A:
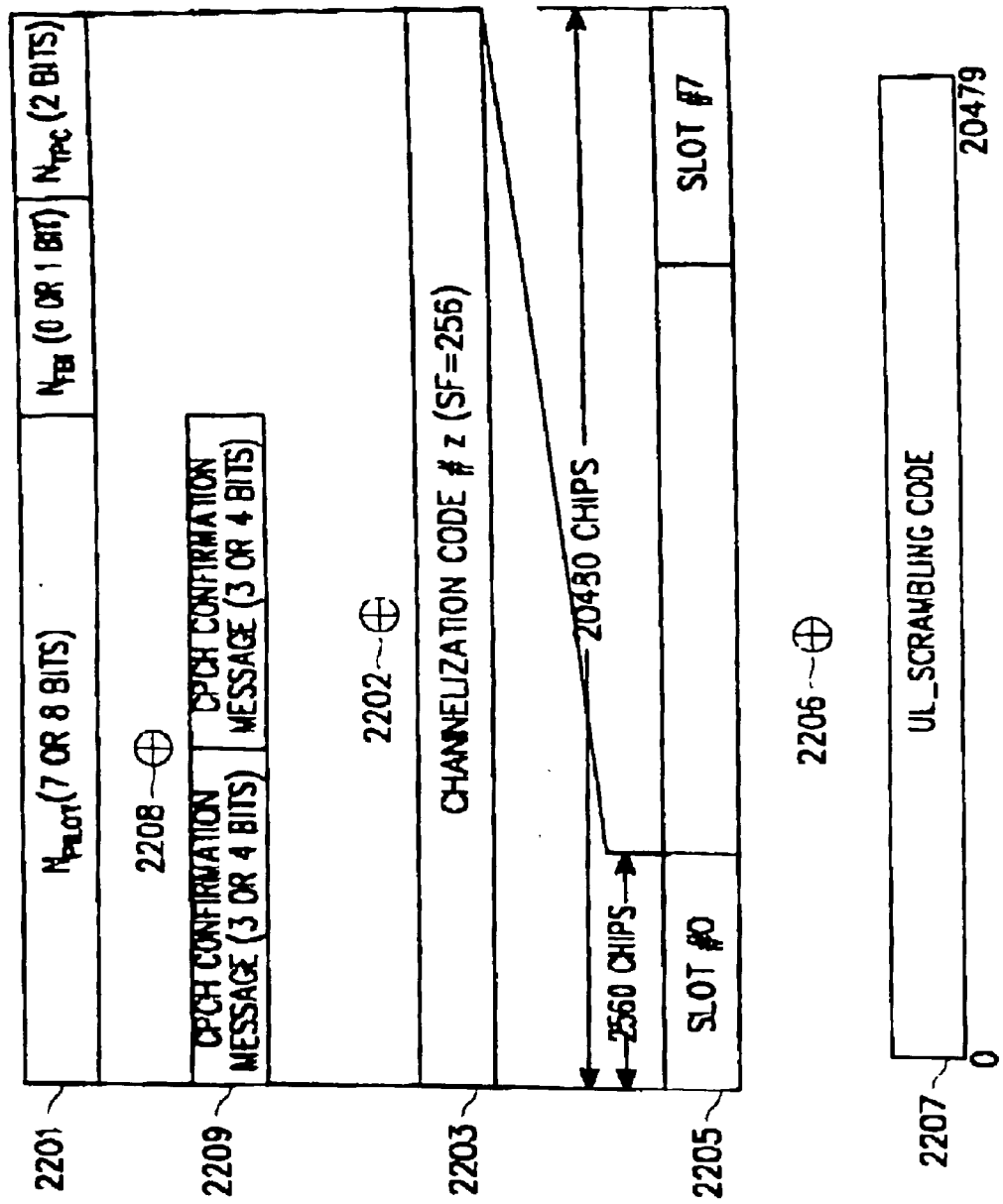
FIG. 22A is a diagram illustrating a method for transmitting a channel C) assignment confirmation message or a channel request confirmation message from the user equipment to the UTRAN using the PC_P according to an embodiment of the present invention.

FIG. 22A shows a method for transmitting a channel assignment confirmation message or a channel request confirmation message from the UE to the UTRAN by using the PC_P. In FIG. 22A, PC_P 2201, channelization code 2203, PC_P frame 2205 and uplink scrambling code 2207 have the same structure and operation as the PC_P 2101, channelization code 2103, PC_P frame 2105 and uplink scrambling code 2107 of FIG. 21. Further, multipliers 2202 and 2206 also have the same operation as the multipliers 2102 and 2106 of FIG. 21, respectively. To transmit the channel assignment confirmation message or channel request confirmation message to the UTRAN using the PC_P, a channel number or signature number of the CA_ICH received from the UTRAN is repeatedly multiplied by the pilot field of the PC_P 2201 before transmission. Reference numeral 2209 of FIG. 22A indicates a CPCH confirmation message which includes the signature number used in the CA_ICH transmitted from the UTRAN to the UE or the CPCH channel number. Here, when the signatures used for the CA_ICH correspond to the CPCHs on a one-to-one basis, the signature number is used for the CPCH confirmation message and when a plurality of signatures correspond to one CPCH, the CPCH channel number is used for the CPCH confirmation message. The CPCH confirmation message 2209 is repeatedly multiplied by the pilot field of the PC__P by a multiplier 2208 before transmission.

Figure 22B:
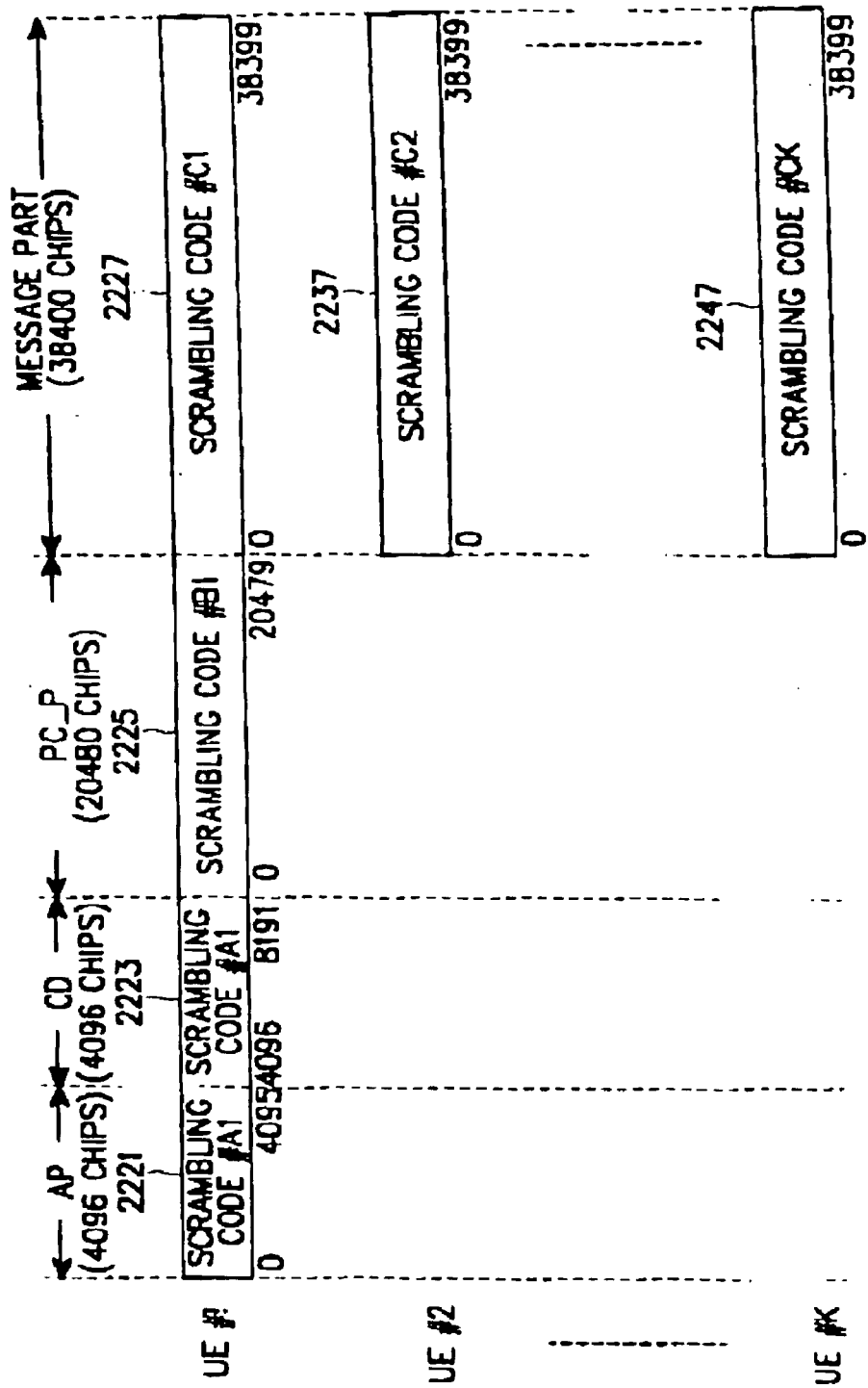
FIG. 22B is a diagram illustrating a structure of the uplink scrambling codes used in FIG. 22A.

FIG. 22B shows structures of the uplink scrambling codes used by a plurality of UEs in the UTRAN for the AP, CD__P, PC__P, and CPCH message part when the PC__P transmitted by using the method of FIG. 22A. To transmit the channel assignment confirmation message or channel request confirmation message to the UTRAN using the PC__P, a channel number or signature number of the CA__ICH received from the UTRAN is mapped to a scrambling code for the CPCH message par in one-to-one basis. Reference numeral 2221 of FIG. 22B indicates a scrambling code used for the AP, which is known to the UEs by the UTRAN over the broadcasting channel or which is equally used for the AP part in the whole system. The scrambling code 2223 used for the CD__P is a scrambling code which has the same initial value as the scrambling code 2221 for the AP but has a different start point. However, when the signature group used for the AP is different from the signature group used for the CP__P the same scrambling code as the scrambling code 2221 for the AP is used for the scrambling code 2223. Reference numeral 2225 indicates a scrambling code used for the PC__P, which is known to the UE by the UTRAN or which is equally used for the PC__P part in the whole system. The scrambling code used for the PC__P part can be either identical to or different from the scrambling code used for the AP and CP__P part. Reference numerals 2227, 2237 and 2247 indicate scrambling codes used when UE#1, UE#2 and UE#k in the UTRAN transmit the CPCH message parts using CPCHS. The scrambling codes 2227, 2237 and 2247 can be set according to the APs transmitted from the UEs or the CA__ICH messages transmitted from the UTRAN. Here, 'k' indicates the number of the UEs which can simultaneously use CPCHs, or the number of the CPCHs in the UTRAN.

In FIG. 22B, when the uplink scrambling code used by the UTRAN for the CPCH is not allocated to every CPCH or every UE, the number of the scrambling codes used for the message part may be smaller than the number of the UEs which can simultaneously use the CPCHs in the UTRAN or the number of the CPCHs in the UTRAN.

Figure 23:
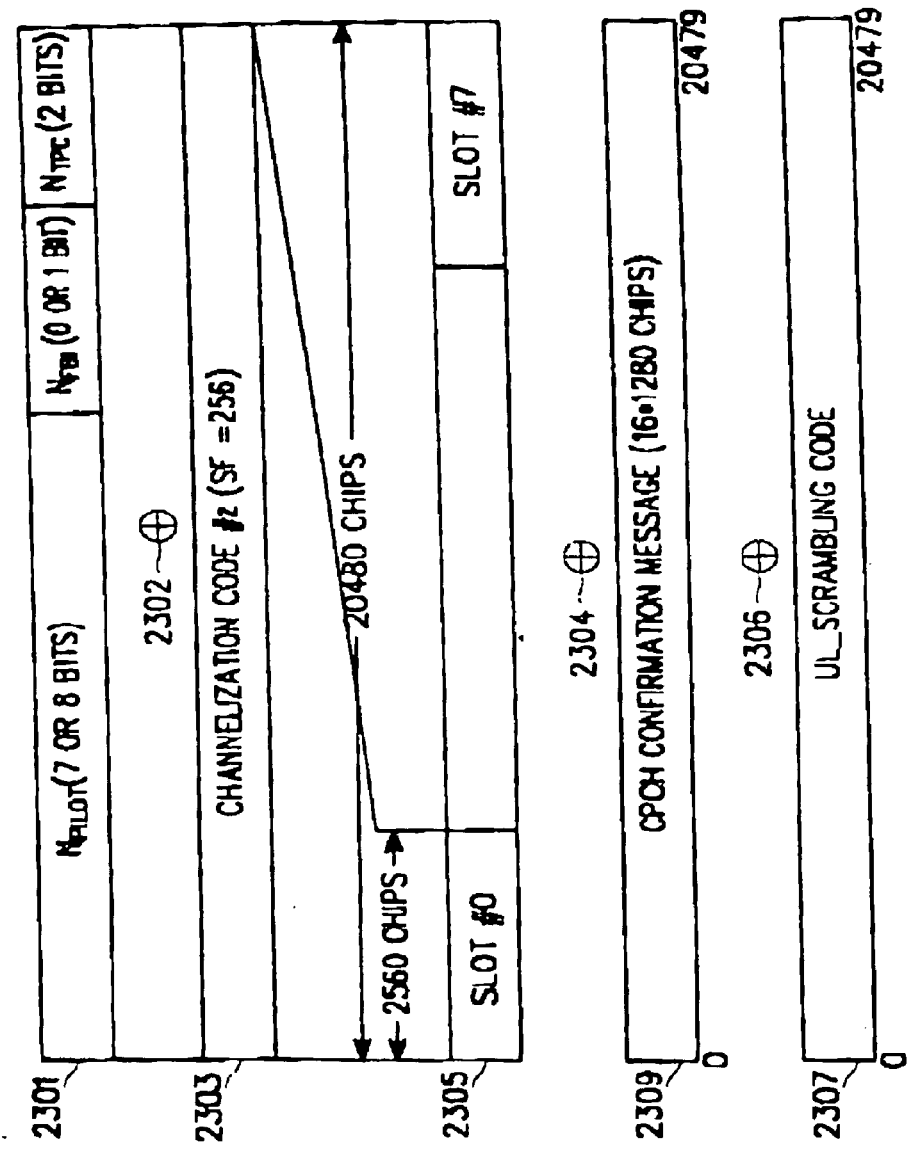
FIG. 23 is a diagram illustrating a method for transmitting a channel assignment confirmation message or a channel request confirmation message from the user equipment to the UTRAN using the PC_P according to another embodiment of the present invention.

FIG. 23 shows another method for transmitting the channel assignment confirmation message or channel request confirmation message transmitted from the UE to the UTRAN using the PC__P. In FIG. 23, PC__P 2301, channelization code 2303, PC__P frame 2305 and uplink scrambling code 2307 have the same structure and operation as the PC__P 2101, channelization code 2103, PC__P frame 2105 and uplink scrambling code 2107 of FIG. 21. Further, multipliers 2302 and 2306 also have the same operation as the multipliers 2102 and 2106 of FIG. 21, respectively. To transmit the channel assignment confirmation message or channel request confirmation message to the UTRAN using the PC__P, the PC__P frame 2305 is multiplied by the CPCH confirmation message 2309 in a chip unit and then spread with a scrambling code 2307. Here, it is possible to obtain the same result, even though the order of multiplying the CPCH confirmation message and the scrambling code by the PC__P frame is rotated. The CPCH confirmation message includes the signature number used in the CA__ICH transmitted from the UTRAN to; the UE or the CPCH channel number. Here, the signature number is used for the CPCH confirmation message, when the signatures used for the CA__ICH correspond to the CPCHs on a one-to-one basis, and the CPCH channel number is used for the CPCH confirmation message, when a plurality of signatures correspond to one CPCH. The environments in which the UEs in the UTRAN use the scrambling codes in the method of FIG. 23 are equal to the environments given in the method of FIGS. 22A and 22B.

Figure 24A:
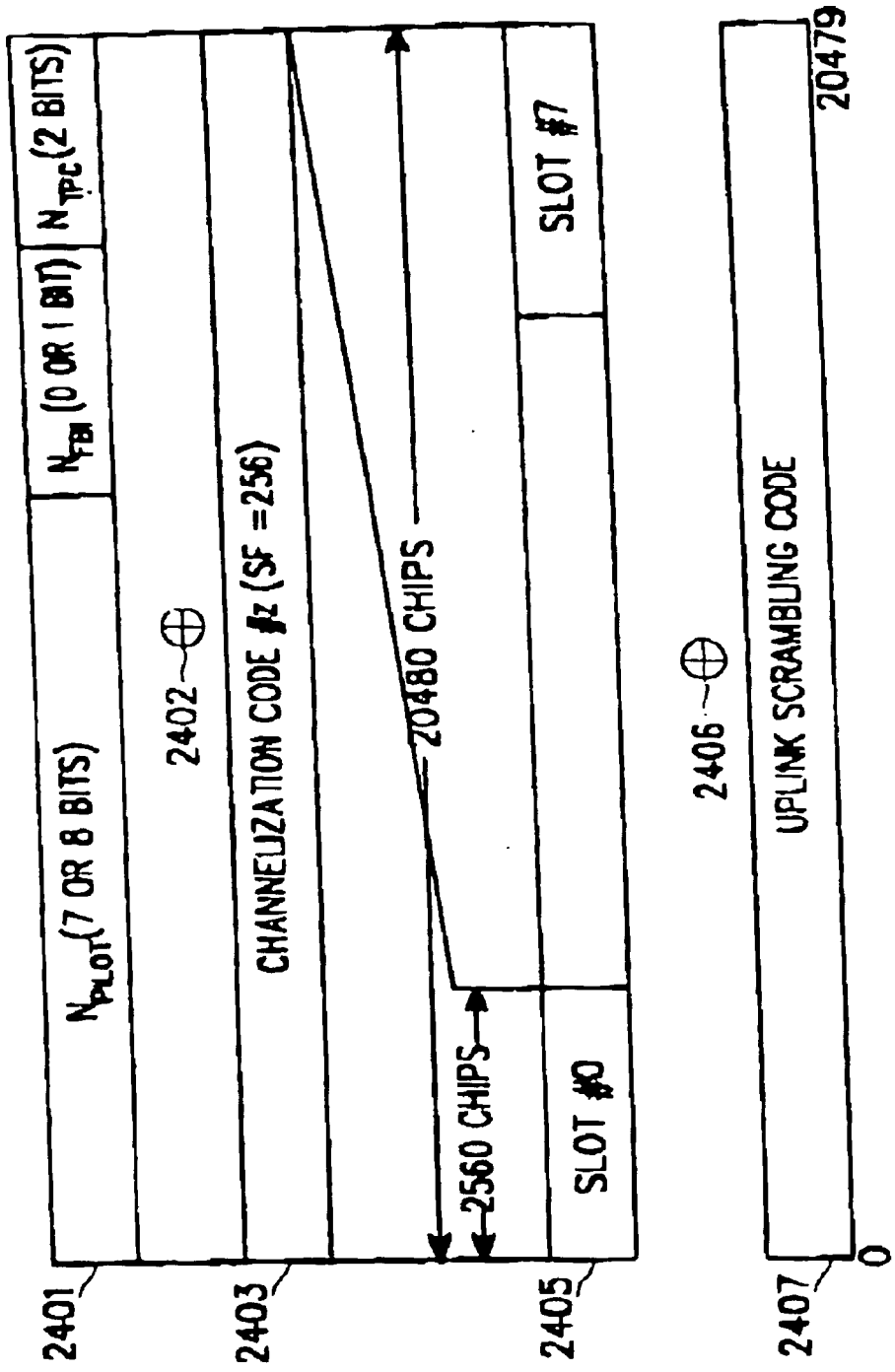
FIG. 24A is a diagram illustrating a method for transmitting a channel assignment confirmation message or a channel request confirmation message from the user equipment to the UTRAN using the PC_P according to an embodiment of the present invention.

FIG. 24A shows another method for transmitting the channel assignment confirmation message or channel request confirmation message from the UE to the UTRAN using the PC__P. In FIG. 24A, PC__P 2401, PC__P frame 2405 and uplink scrambling code 2407 have the same structure and operation as the PC__P 2101, PC__P frame 2105 and uplink scrambling code 2107 of FIG. 21. Further, multipliers 2402 and 2306 also have the same operation as the multipliers 2102 and 2106 of FIG. 21, respectively. To transmit the channel assignment confirmation message or channel request confirmation message to the UTRAN using the PC__P, a channelization code 2403 is associated with the CA__ICH signature received at the UE from the UTRAN or the CPCH channel number on a one-to-one basis to channel spread the PC__P using the channelization code and transmit the channel-spread PC__P to the UTRAN. The environments in which the UEs in the UTRAN use the scrambling codes in the method of FIG. 24A are equal to the environments given in the method of FIG. 22B.

Figure 24B:
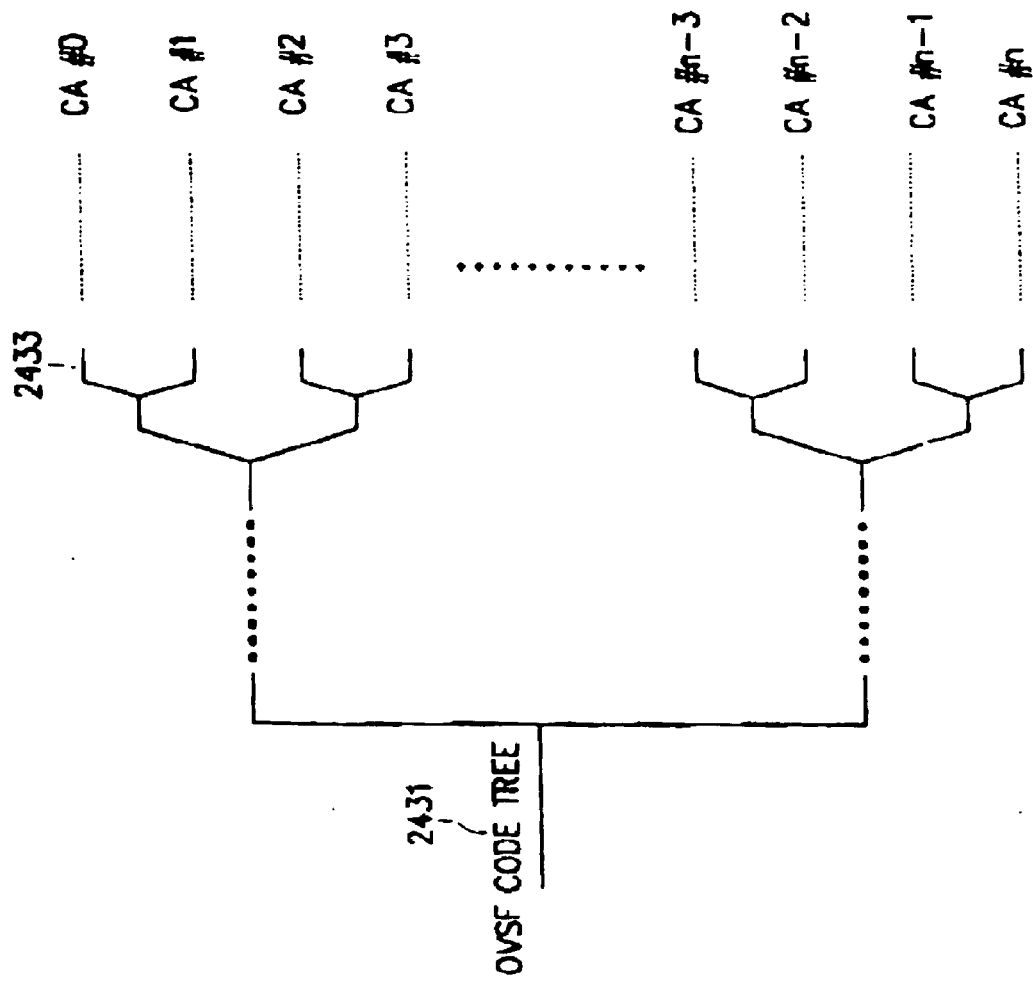
FIG. 24B is a diagram illustrating a tree of a PC_P channelization code corresponding one-to-one to the signature of the CA_ICH or the CPCH channel number according to an embodiment of the present invention.

FIG. 24B shows an example of a PC__P channel code tree which correspond to the CA__ICH signatures or the CPCH channel numbers on a one-to-one basis. This channel code tree is called an OVSF (Orthogonal Variable Spreading Factor) code tree in the W-CDMA standard, and the OVSF code tree defines orthogonal codes according to the spreading factors.

In the OVSF code tree 2431 of FIG. 24B, a channelization code 2433 used as a PC__P channelization code has a fixed spreading factor of 256, and there are several possible mapping rules for associating the PC__P channelization code with the CA__ICH signatures or the CPCH channel numbers on a one-to-one basis. As an example of the mapping rule, the lowest one of the channelization codes having the spreading factor 256 can be associated with the CA__ICH signature or CPCH channel number on a one-to-one basis; and the highest channelization code can also be associated with the CA__ICH signature or the CPCH channel number on a one-to-one basis, by changing the channelization code or skipping several channelization codes. In FIG. 24B, 'n' may be the number of the CA__ICH signatures or the number of the CPCH channels.

Figure 25A:
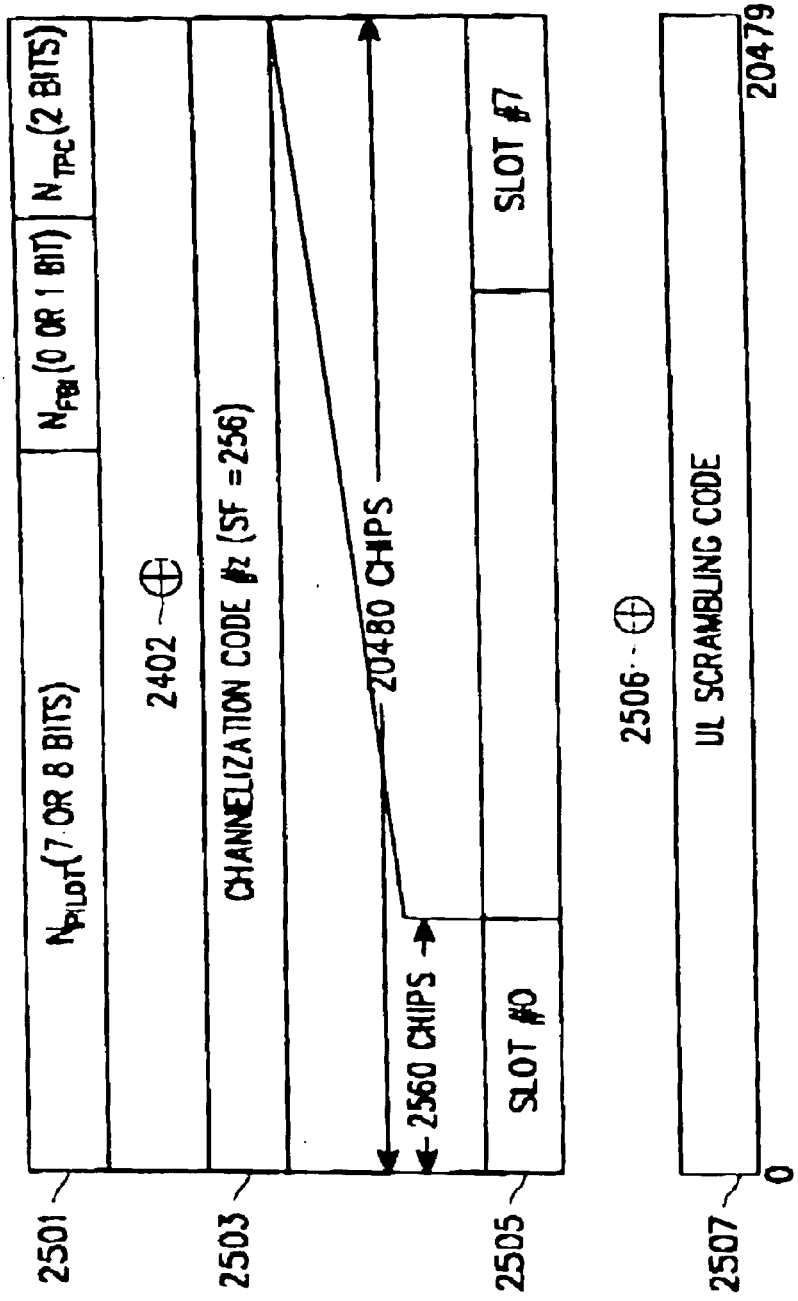
FIG. 25A is a diagram illustrating a method for transmitting a channel assignment confirmation message or a channel request confirmation message from the user equipment to the UTRAN using the PC_P according to an embodiment of the present invention.

FIG. 25A shows another method for transmitting a channel assignment confirmation message or a channel request confirmation message transmitted from the UE to the UTRAN using the PC__P. In FIG. 25A, PC__P 2501, channelization code 2503 and PC__P frame 2505 have the same structure and operation as the PC__P 2101, channelization code 2103 and PC__P frame 2105 of FIG. 21. Further, multipliers 2502 and 2506 also have the same operation as the multipliers 2102 and 2106 of FIG. 21, respectively. To transmit the channel assignment confirmation message or channel request confirmation message to the UTRAN using the PC__P, an uplink scrambling code 2507 is associated with the channel number of signature number of the CA__ICH received from the UTRAN on a one-to-one basis to channel spread the PC__P frame 2505 with the uplink scrambling code before transmission. Receiving the PC__P frame transmitted from the UE, the UTRAN determines whether the scrambling code used for the PC__P frame corresponds to the signature or CPCH channel number transmitted over the CA__ICH on a one-to-one basis. If the scrambling code does not correspond to the signature or CPCH channel number, the UTRAN immediately transmits a power-down command for decreasing transmission power of the uplink to the power control command field of the downlink dedicated channel corresponding to the uplink CPCH on a one-to-one basis.

FIG. 25B shows the structures of uplink scrambling codes used by a plurality of UEs in the UTRAN for the AP, CD_P, P_CP and CPCH message part when transmitting the PC_P using the method of FIG. 25A. Reference numeral 2521 of FIG. 25B indicates a scrambling code used for the AP, which is known to the UEs by the UTRAN over the broadcasting channel or which is equally used for the AP part in the whole system. For a scrambling code 2523 used for the CD_P, is used a scrambling code which has the same initial value as the scrambling code 2521 for the AP but has a different start point. However, when the signature group used for the AP is different from the signature group used for the CP_P, the same scrambling code as the scrambling code 2521 for the PA is used for the scrambling code 2523'. Reference numerals 2525, 2535 and 2545 indicate scrambling codes used when UE#1, UE#2 and UE#k transmit the PC_P, and these scrambling codes correspond to the signature or CPCH channel number of the CA_ICH received at the UE from the UTRAN on a one-to-one basis. With regard to the scrambling codes, the UE can store the scrambling code used for the PC_P or the scrambling code can be known to the UE by the UTRAN. The PC_P scrambling codes 2525, 2535 and 2545 may be identical to the scrambling codes 2527, 2537 and 2547 used for the CPCH message part, or may be scrambling codes corresponding to them on a one-to-one basis. In FIG. 25B, 'k' indicates the number of CPCHs in the UTRAN.

Figure 26A:
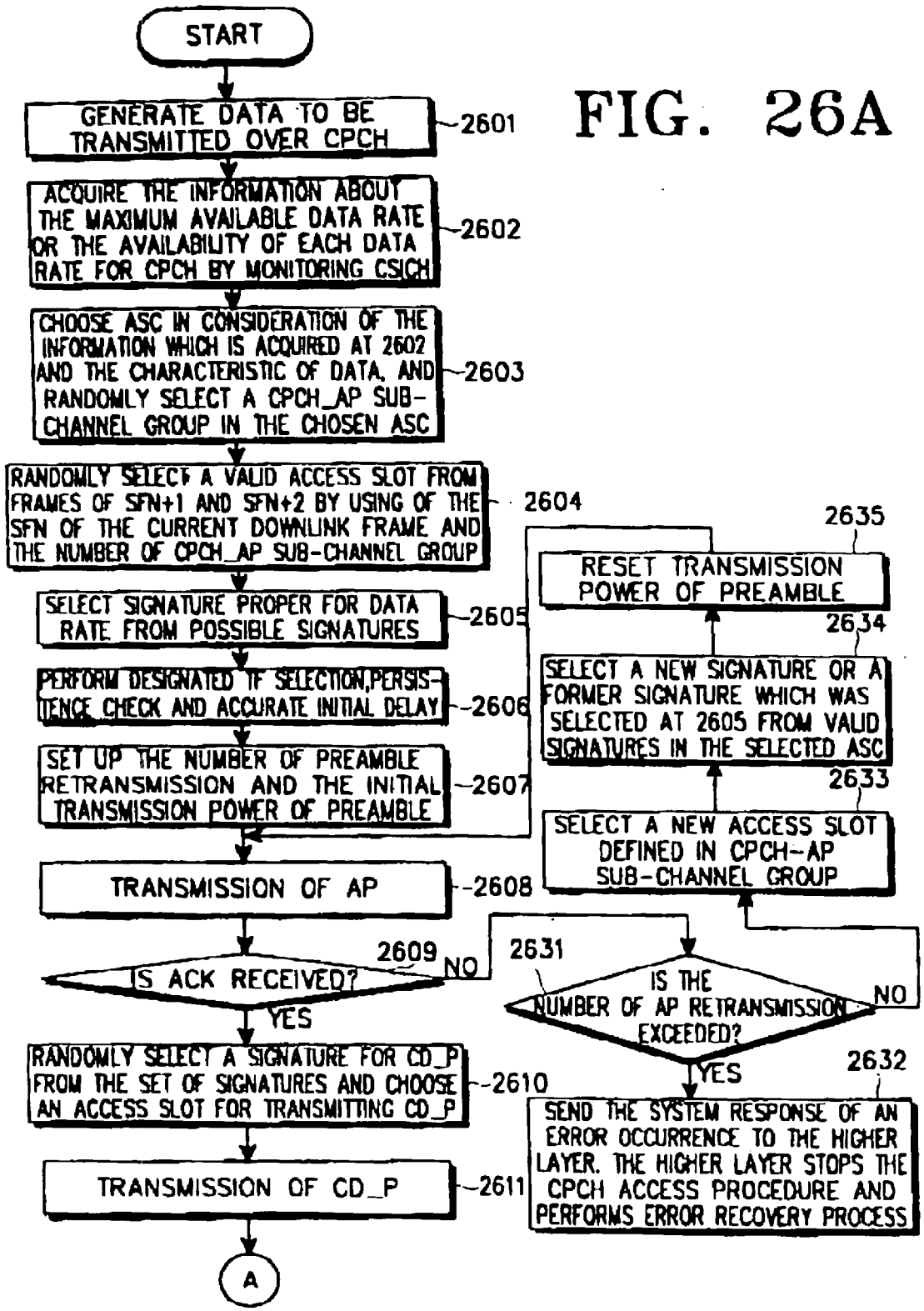
FIGS. 26A to 26C are flow charts illustrating a procedure for allocating a common packet channel in the user equipment according to an embodiment of the present invention.
Figure 26B:
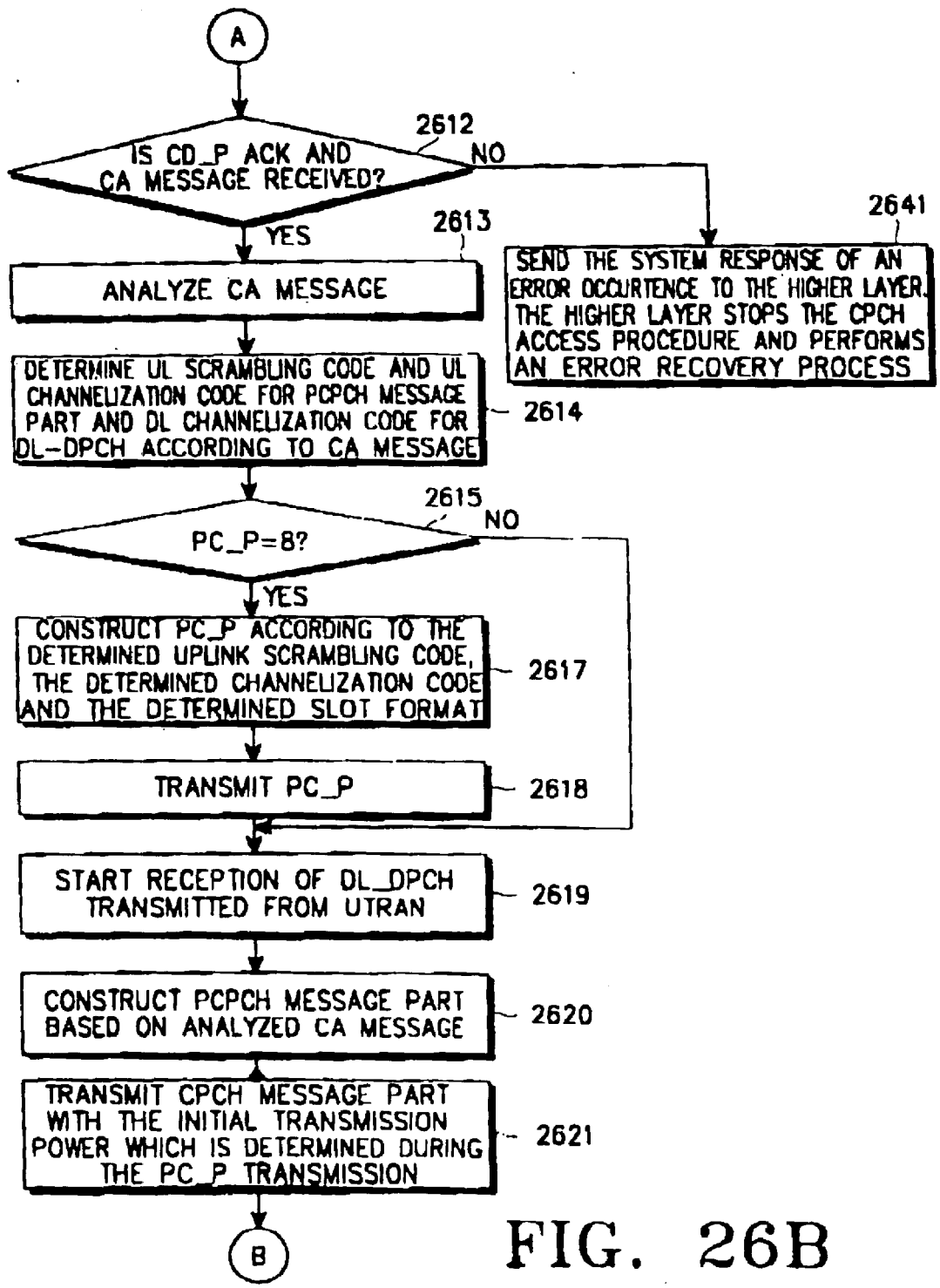
Figure 26C:
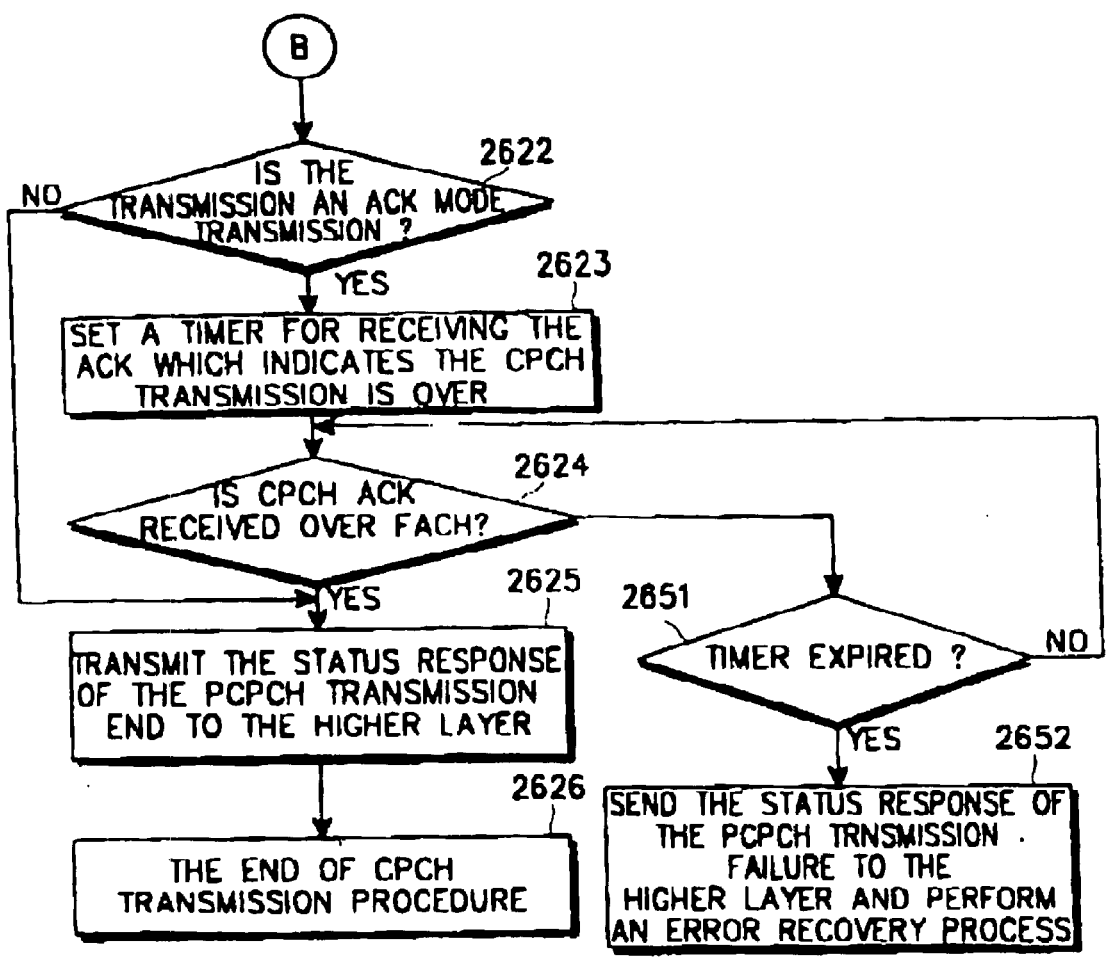
Figure 27A:
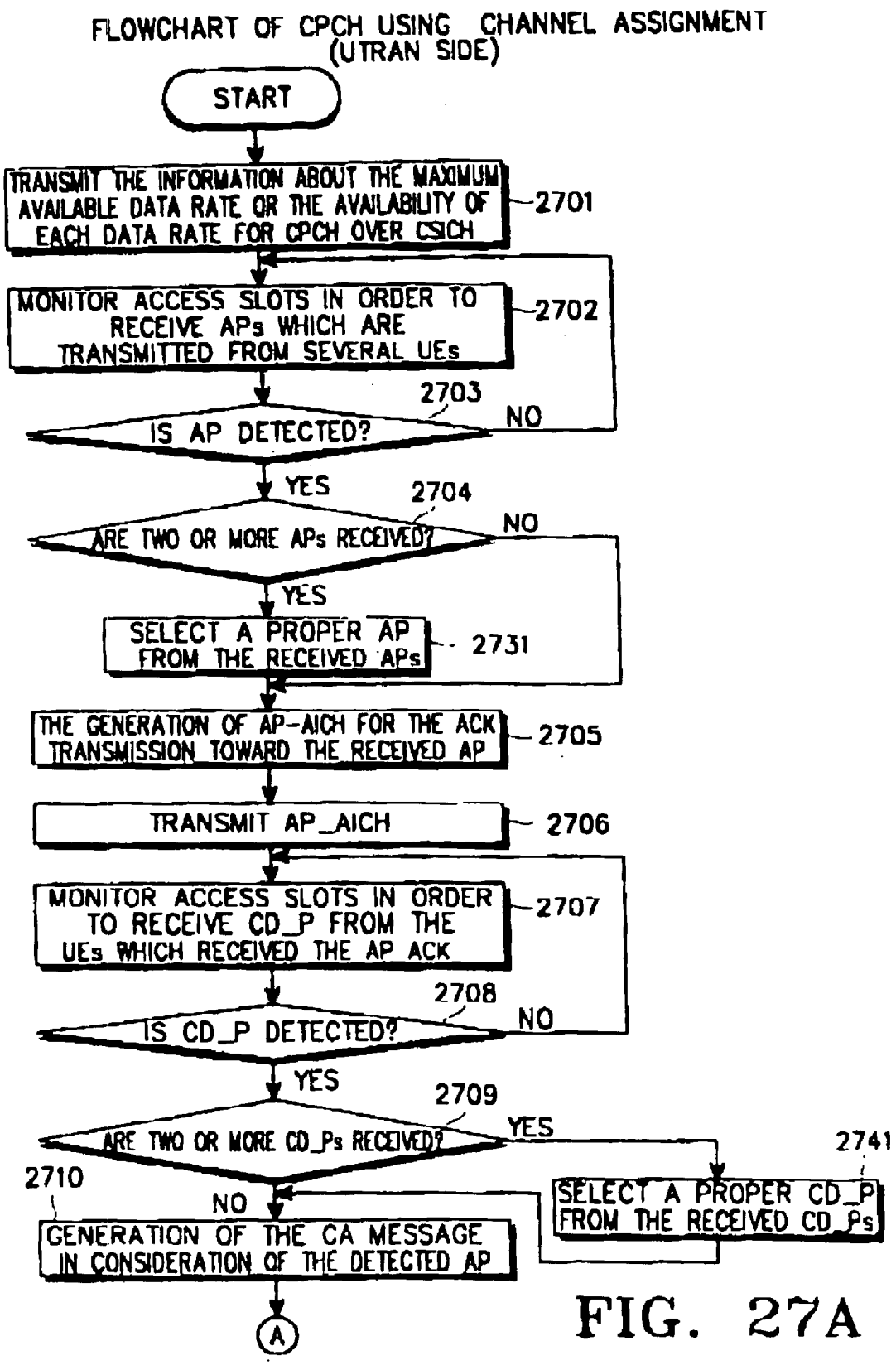
FIGS. 27A to 27C are flow charts illustrating a procedure for allocating a common packet channel in the UTRAN according to an embodiment of the present invention.
Figure 27B:
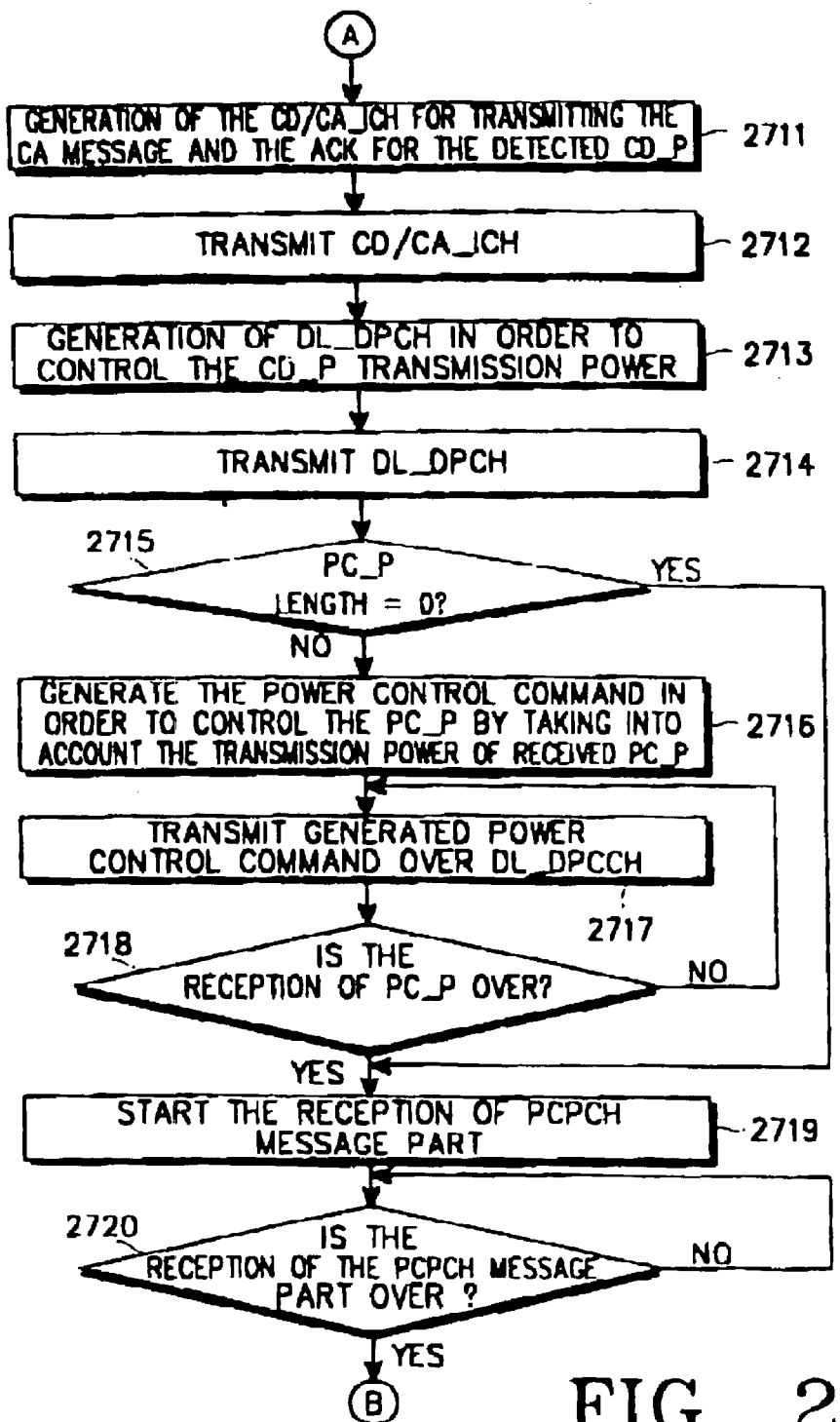
Figure 27C:
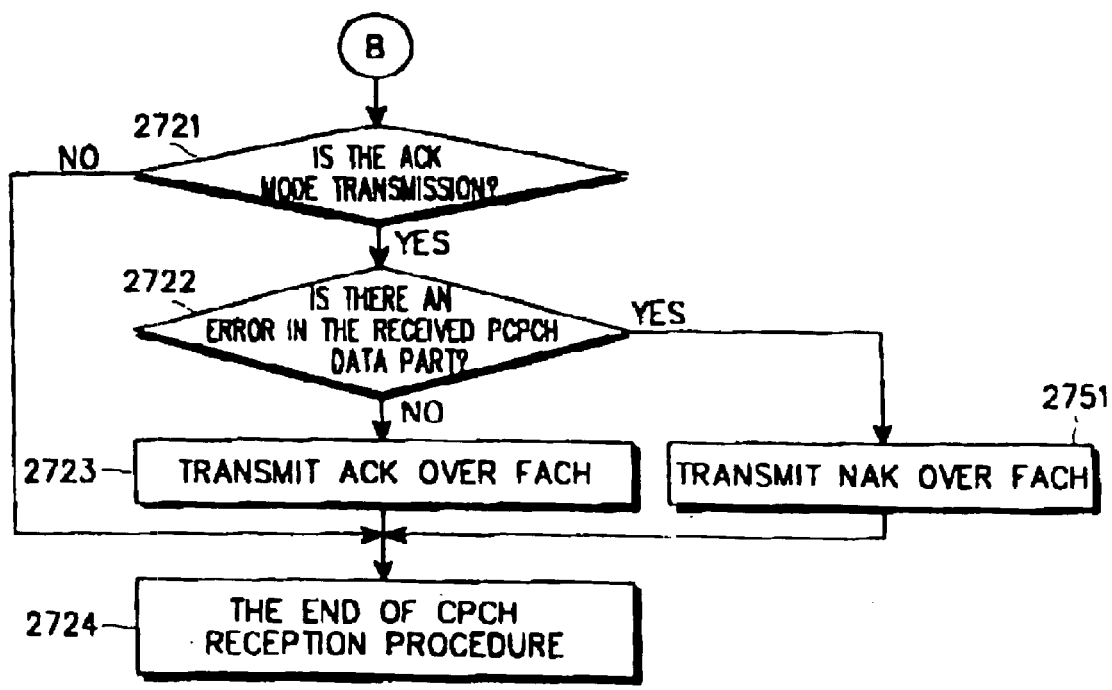

FIGS. 26A to 26C show the procedure for allocating the CPCH channel in the UE according to an embodiment of the present invention, and FIGS. 27A to 27C show the procedure for allocating the CPCH channel in the UTRAN according to an embodiment of the present invention.

Referring to FIG. 26A, when the UE has a data to be transmitted over the CPCH in step 2601, and acquires an information about a possible maximum data an rate by monitoring the CSICH in step 2602. The information which can be transmitted over the CSICH in step 2602 may include information about whether the data rates supported by the CPCH can be used. After acquiring the CPCH information of the UTRAN in step 2602, the UE selects a proper ASC based on the information acquired over the CSICH and the property of transmission data, and randomly selects a valid CPCH_AP sub-channel group in the selected ASC, in step 2603. Thereafter, in step 2604, the UE selects a valid access slot from the frames of SFN+1 and SFN+2 by using of the SFN of the downlink frame and the sub-channel group number of the CPCH. After selecting the access slot, the UE selects a signature appropriate for the data rate at which the UE will transmit the data, in step 2605. Here, the UE selects the signature by selecting one of the signatures for transmitting the information. Thereafter, the UE performs desired transport format (TF) selection, a persistence check and waits until the exact initial delay for AP transmission is over in step 2606. The UE sets a repetitive transmission number and an initial transmission power of the AP in step 2607 and transmits the AP in step 2608. After transmitting the AP, the UE awaits ACK in response to the transmitted AP in step 2609. It is possible to determine whether ACK has been received or not, by analyzing the AP_AICH transmitted from the UTRAN. Upon failure to receive ACK in step 2609, the UE determines in step 2631 whether the AP repetitive transmission number set in step 2607 has been exceeded. If the set AP repetitive transmission number has been exceeded in step 2631, the LYE transmits an error occurrence system response to the upper layer to stop the CPCH access process and to perform an error recovery process in step 2632. Whether the AP repetitive transmission number has been exceeded or not can be determined by a timer. However, if the AP repetitive transmission number has not been exceeded in step 2631, the UE selects a new access slot defined in the CPCH_AP sub-channel group in step 2633, and selects a signature to be used for the AP in step 2634. In selecting the signature in step 2634, the UE selects a new signature out of the valid signatures in the ASC selected in step 2603 or selects the signature selected in step 2605. Thereafter, the UE resets transmission power of the AP in step 2635, and repeatedly performs the step 2608.

Upon receipt of ACK in step 2609, the UE selects a signature to be used for the CD_P from the signature group for the preamble and selects an access slot for transmitting the CD_P in step 2610. The access slot for transmitting the CD_P may indicate a random time point or a fixed time point after the UE has received ACK. After selecting the signature and access slot for the CD_P, the UE transmits the CD_P which uses the selected signature at the selected access slot, in step; 2611.

After transmitting the CD_P, the UE determines in step 2612 of FIG. 26B whether the ACK for the CD_P and the channel assignment message are received. The UE performs different operation according to whether an ACK has been received or not over the CD_ICH. In step 2612, the UE can determine a received time of an ACK for the CD_P and the channel assignment message by using a timer. If an ACK is not received within a time set by the timer or a NAK for the transmitted CD_P is received in step 2612, the UE proceeds to step 2641 $_1$ to stop the CPCH access procedure. In step 2641, the UE transmits an error occurrence system response to the upper layer to stop the CPCH access procedure and perform an error recovery process.

However, if an ACK for the CD_P is received in step 2612, the UE analyzes the channel assignment message in step 2613. It is possible to simultaneously detect and analyze ACK for the CD_P and the channel assignment message by using the AICH receivers of FIGS. 16 and 17.

The UE determines, in step 2614, an uplink scrambling code and an uplink channelization code for a message part of a physical common packet channel (PCPCH) according to the channel assignment message analyzed in step. 2613, and determines a channelization code for a downlink dedicated channel established for power control of the CPCH. Thereafter, the UE determines in step 2615 whether the slot number of power control preamble PC_P is 8 or 0. If the number of the PC_P slots is 0 in step 2615, the UE performs step 2619 to start receiving the downlink dedicated channel transmitted from the UTRAN; otherwise, if the number of the PC_P slots is 8, the UE performs step 2617. In step 2617, the UE formats the power control preamble PC_P according to the uplink scrambling code, the uplink channelization code and the slot type to be used for the PC_P. The PC_P has 2 slot types. After selecting the scrambling code for the PC_P and the channelization code, the UE transmits the PC_P in step 2618, and at the same time, receives the downlink dedicated channel to control the uplink transmission power according to a uplink power control command transmitted from the UTRAN and to measure the downlink transmission power for sending a downlink power control command to the UTRAN.

Thereafter, in step 2620, the UE formats the PCPCH message part according to the channel assignment message analyzed in step 2613, and starts transmission of the CPCH message part in step 2621. Thereafter, the UE determines in step 2622 whether the CPCH transmission is the acknowledgment mode transmission. If the CPCH transmission is not the acknowledgment mode transmission in step 2622, the UE performs step 2625 after transmission of the CPCH message part, to transmit a CPCH transmission end status response to the upper layer. Thereafter the UE ends the process of transmitting the data over the CPCH in step 2626. However, if the CPCH transmission is the acknowledgment mode transmission in step 2622, the UE sets a timer for receiving an ACK for the CPCH message part in step 2623, and monitors a forward access channel (FACH) during and after transmission of the CPCH message part in step 2624, to determine whether an ACK or NAK for the CPCH message part has been received from the UTRAN. It is possible to use a downlink dedicated channel as well as the FACH in receiving an ACK or NAK from the UTRAN. Upon failure to receive an ACK for the CPCH message part transmitted over the FACH in step 2624, the UE determines in step 2651 whether the timer set in step 2623 has expired or not. If the timer has not expired, the UE returns to step 2624 to monitor for an ACK or NAK from the UTRAN. However, if the timer has expired, the UE transmits a transmission fail status response to the upper layer and performs an error recovery process in step 2652. However, if an ACK has been received in step 2624, the UE performs step 2625 after receiving the ACK of the CPCH message part, to transmit a CPCH transmission end status response to the upper layer. Thereafter the UE ends the process of transmitting the data over the CPCH in step 2626. Now, a detailed description will be made regarding how the UTRAN allocates the CPCH, with reference to FIGS. 27A to 27C.

The UTRAN transmits information about the maximum data rate supported by the CPCH or information as to whether the CPCH is available according to the data rates, using the CSICH, in step 2701 of FIG. 27A. The UTRAN monitors an access slot to receive an AP transmitted from the UEs in step 2702. While monitoring the access slot, the UTRAN determines in step 2703 whether: an AP has been detected. Upon failure to detect an AP in step 2703, the UTRAN returns to step 2702 and repeats the above process.

Otherwise, upon detection of the AP in step 2703, the UTRAN determines in step 2704 whether two or more APs have been detected (or received). If two or more APs have been detected in step 2704, the UTRAN selects a proper one of the detected APs in step 2731 and then proceeds to step 2705. Otherwise, if one only AP has been received and it is determined that receiving power of the received AP or a requirement for the CPCH included in the signature for the received AP is appropriate, the UTRAN performs step 2705. Here, the "requirement" refers to a data rate that the UE desires to use for the CPCH or the number of data frames to be transmitted by the user, or a combination of the two requirements.

If one AP has been detected in step 2704 or after selecting a proper AP in step 2731, the UTRAN proceeds to step 2705 to generate an AP_AICH for transmitting an ACK for the detected or selected AP, and then transmits the generated AP_AICH in step 2706. After transmitting the AP_AICH, the UTRAN monitors an access slot to receive the CD_P transmitted from the UE that has transmitted the AP, in step 2707. It is possible to receive the AP, even in the process of receiving the CD_P and monitoring the access slot. That is, the UTRAN can detect the AP, CD_P and PC_P from the access slots, and generate the AICHs for the detected preambles. Therefore, the UTRAN can simultaneously receive the CD_P and the AP. In this embodiment of the present invention, the description will be made focusing on the process in which the UTRAN detects the AP generated by a given UE and then allocates the CPCH as shown in FIG. 3. Therefore, the description of the operation performed by the UTRAN will be made in the sequence of a response, made by the UTRAN, to the AP transmitted from a given UE, a response to the CD_P transmitted from the UE that has transmitted the AP, and a response to the PC_P transmitted from the corresponding UE.

Upon detecting the CD_P in step 2708, the UTRAN performs step 2709; otherwise, upon failure to detect the CD_P, the UTRAN performs the step 2707 to monitor detection of the CD_P. The UTRAN has two monitoring methods: one method is to use a timer if the UE transmits the CD_P at a fixed time after the AP_AICH, another method is to use a searcher if the UE transmits the CD_P at a random time. Upon detecting the CD_P in step 2708, the UTRAN determines in step 2709 whether two or more CD_Ps have been detected. If two or more CD_Ps have been detected in step 2709, the UTRAN selects a proper one of the received CD_Ps in step 2741, and generates the CD_ICH and the channel assignment message transmitted over CA-ICH in step 2710. In step 2741, the UTRAN may select the proper CD_P depending on the receiving power of the received CD_Ps. If one CD_P has been received in step 2709, the UTRAN proceeds to step 2710 where the UTRAN generates a channel assignment message to be transmitted to the UE that has transmitted the CD_P selected in step 2741 or the CD_P received in step 2709. Thereafter, in step 2711 on FIG. 27B, the UTRAN generates the ACK for: the CDP detected in step 2708 and the CD/CA_ICH for transmitting the channel assignment message generated in step 2710. The UTRAN may generate the CD/CA_ICH in the method described with reference to FIGS. 13A and 13B. The UTRAN transmits the generated CA/CD_ICH in step 2712 in the method described with reference to FIGS. 14 and 15.

After transmitting the CD/CA_ICH, the UTRAN generates a downlink dedicated channel (DL_DPCH) for controlling transmission power of the uplink CPCH in step 2713, the generated downlink dedicated channel can correspond to the uplink CPCH transmitted from the UE on a one-to-one basis. The UTRAN transmits the command transmitted over the DL_DPCH generated in step 2714 The UTRAN examines the slot or timing information by receiving the PC_P transmitted from the UE, in step 2715. If the slot number or timing information of the PC_P transmitted from the UE is '0' in step 2715, the UTRAN starts receiving a message part of the PCPCH transmitted from the UE in step 2719. Otherwise, if the slot number or timing information of the PC_P transmitted from the UE is '8' in step 2715, the UTRAN proceeds to step 2716 where the UTRAN receives the PC_P transmitted from the UE and creates a power control command for controlling transmission power of the PC_P. One object of controlling transmission power of the PC_P is to properly control initial transmission power of the uplink PCPCH transmitted from the UE. The UTRAN transmits the power control command generated in step 2716 through a power control command field of a downlink dedicated physical control channel (DL_DPCCH) out of the downlink dedicated channels generated in step 2713. Thereafter, the UTRAN determines in step 2718 whether the PC_P has been completely received. If reception of the PC_P is not completed, the UTRAN returns to step 2717; otherwise, if reception of the PC_P is completed, the UTRAN performs step 2719. Whether reception of the PC_P is completed or not can be determined by using a timer to examine whether 8 PC_P slots have arrived.

If it is determined in step 2718 that reception of the PC_P is completed, the UTRAN starts receiving a message part of the uplink PCPCH in step 2719, and determines in step 2720 whether reception of the PCPCH message part is completed. If reception of the PCPCH message part is not completed, the UTRAN continuously receives the PCPCH, and otherwise, if reception of the PCPCH is completed, the UTRAN proceeds to step 2721 of FIG. 27C. The UTRAN determines in step 2721 whether the UE transmits the PCPCH in an acknowledgement transmission mode. If the UE transmits the PCPCH in an acknowledgement transmission mode, the UTRAN performs step 2722, and otherwise, performs step 2724 to end reception of the CPCH. If it is determined in step 2721 that the UE transmits the PCPCH in the acknowledgement transmission mode, the UTRAN determines in step 2722 whether the received PCPCH message part has an error. If the received PCPCH message part has an error, the UTRAN transmits NAK through a forward access channel (FACH) in step 2751. Otherwise, if the received PCPCH message part has no error, the UTRAN transmits ACK through the FACH in step 2723 and then ends reception of the CPCH in step 2724.

Figure 28A:
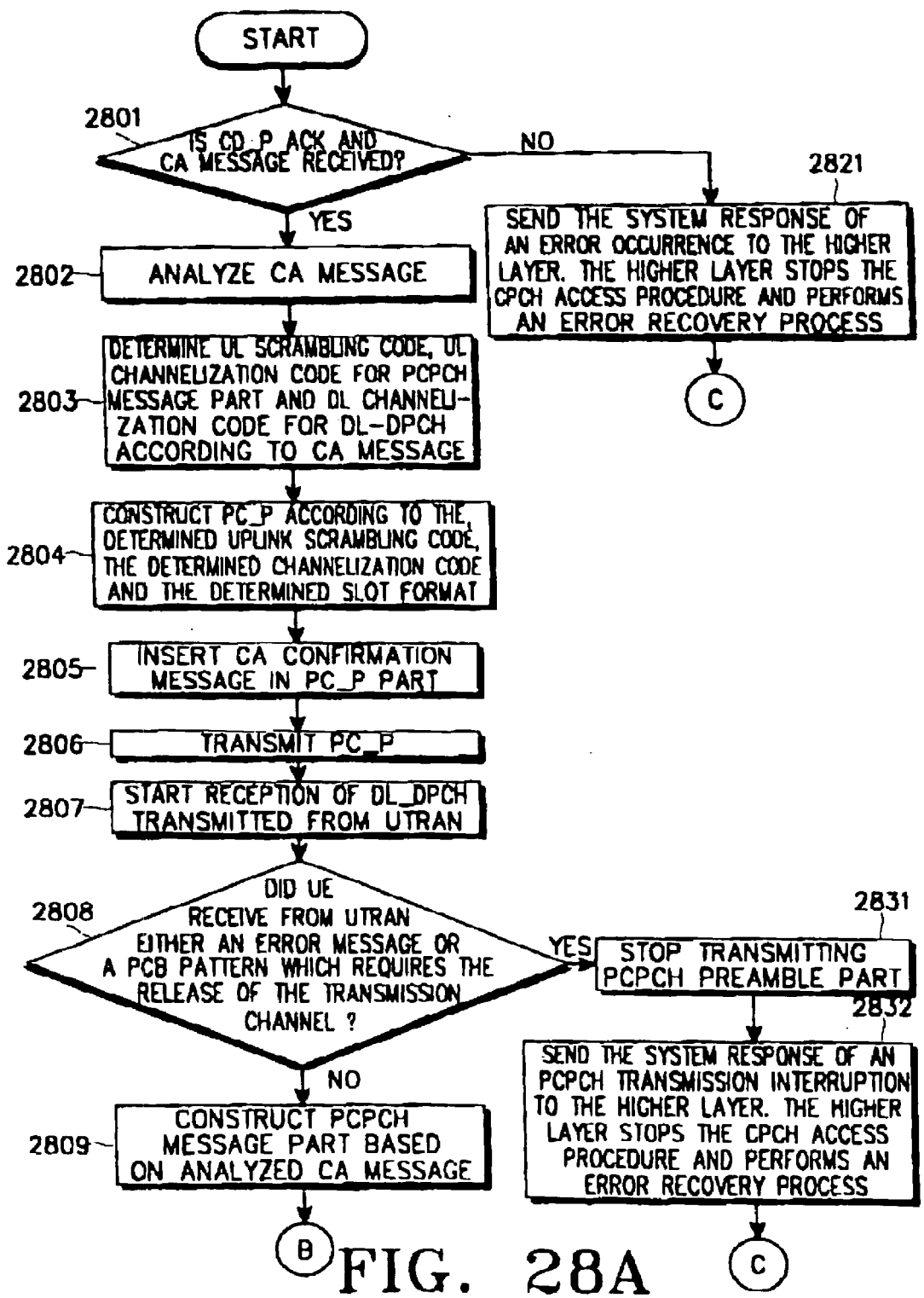
FIGS. 28A and 28B are flow charts illustrating a procedure for setting a C) stable CPCH using the PC_P, performed in the user equipment, according to an embodiment of the present invention.
Figure 28B:
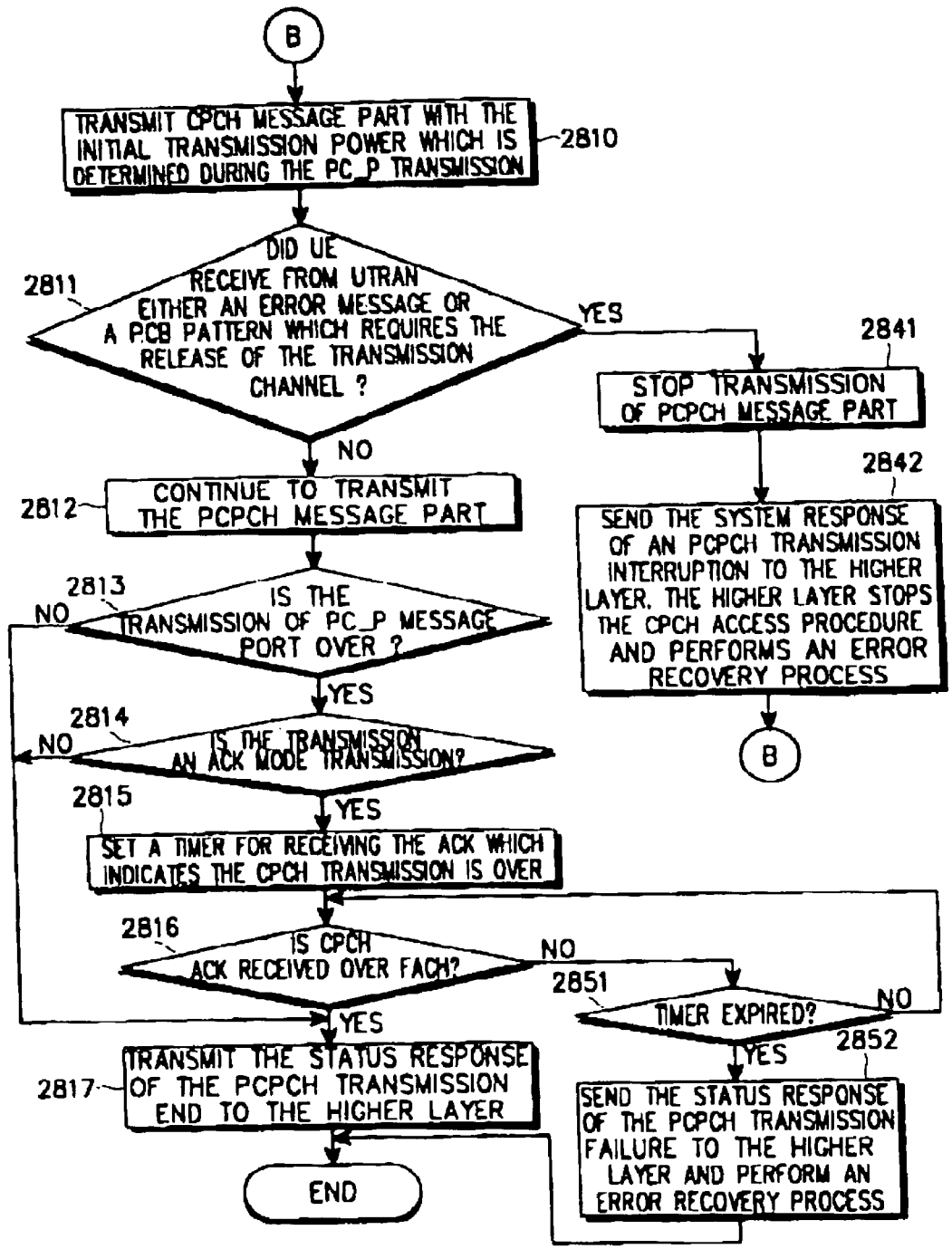
Figure 29A:
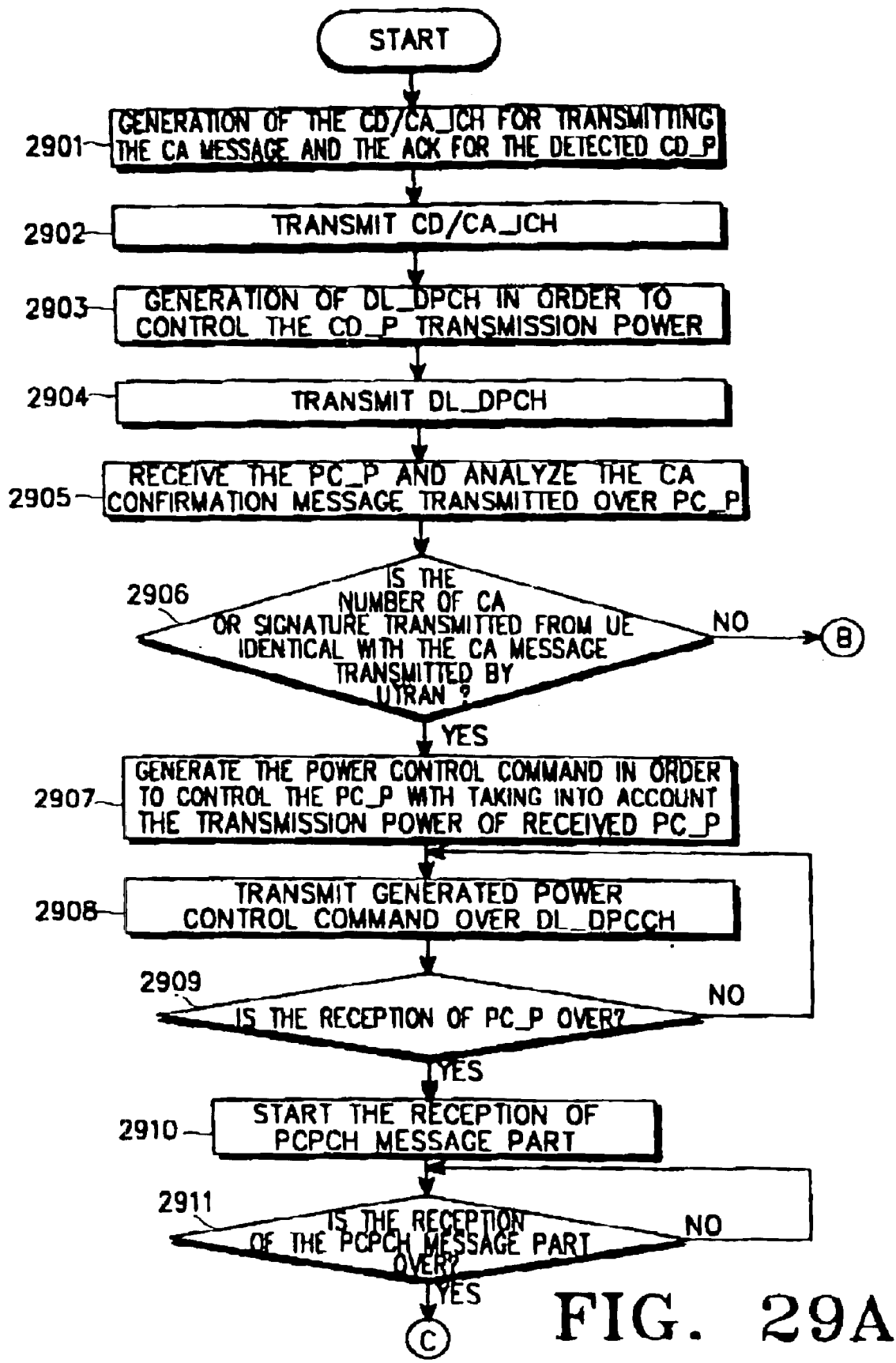
FIGS. 29A to 29C are flow charts illustrating a procedure for setting a stable CPCH using the PC_P, performed in the UTRAN, according to an embodiment of the present embodiment of the present invention.
Figure 29B:
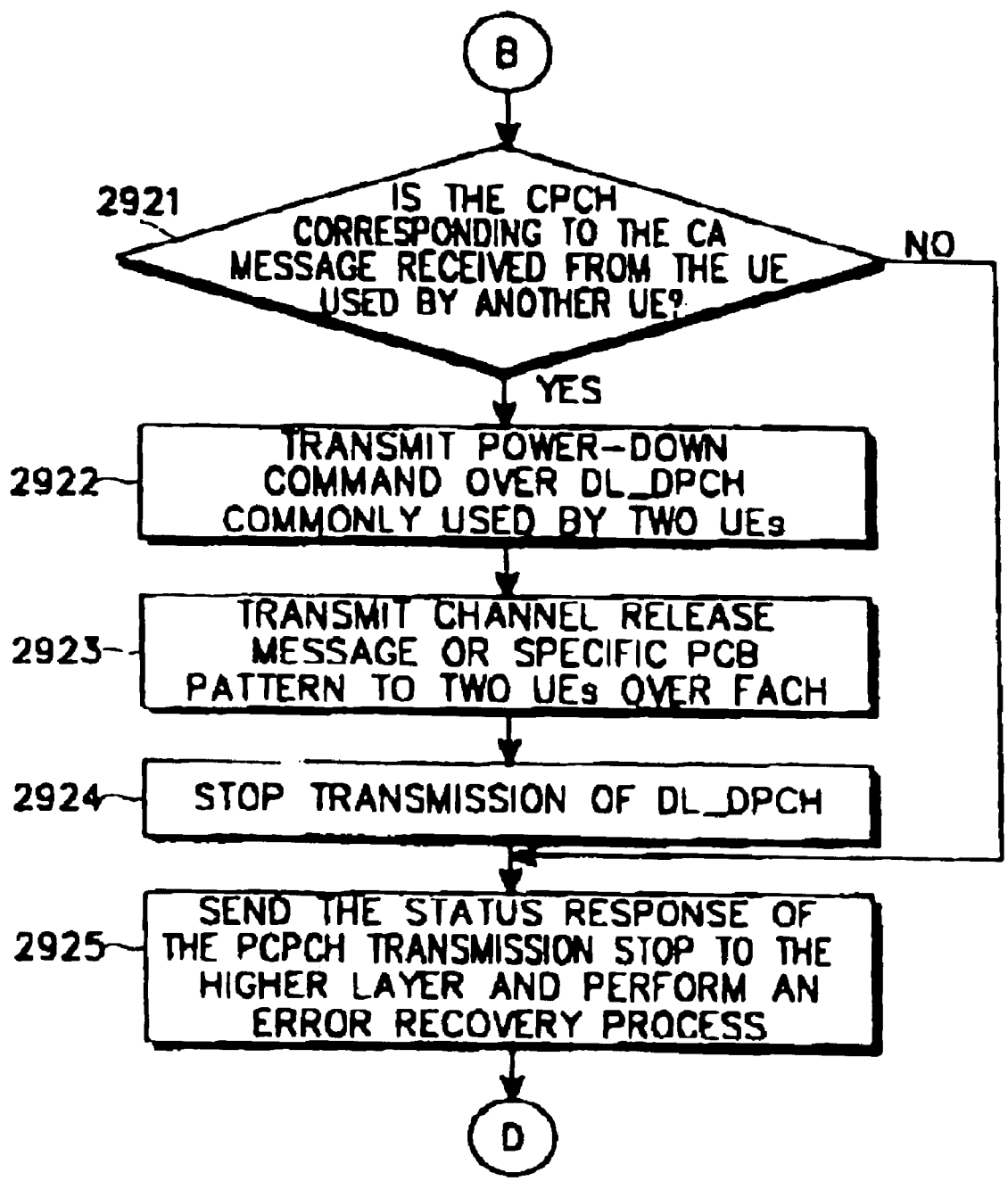
Figure 29C:
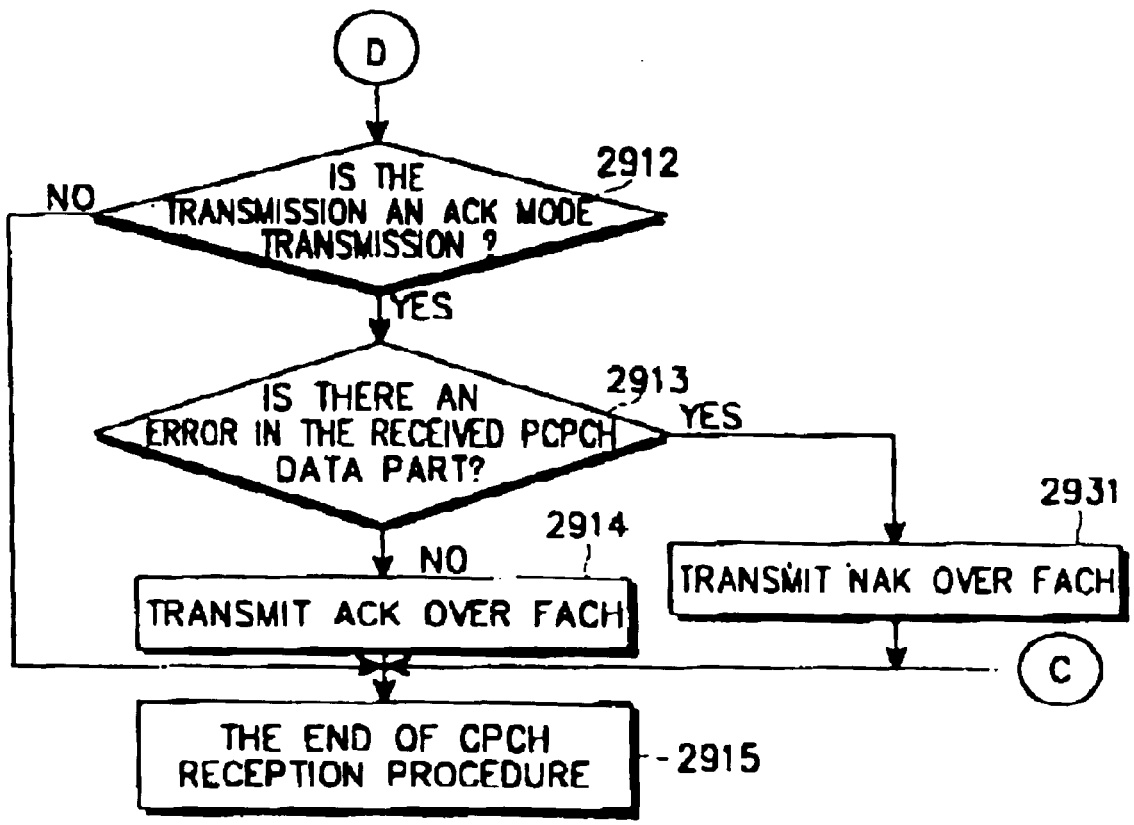

FIGS. 28A and 28B show the procedure for allocating the CPCH in the UE according to another embodiment of the present invention, wherein "START" of FIG. 28A is connected to "A" of FIG. 26A. FIGS. 29A to 29C show the: procedure for allocating the CPCH in the UTRAN according to another embodiment of the present invention, wherein "START" of FIG. 29A is connected to "A" of FIG. 27A. FIGS. 28A–28B and FIGS. 29A–29C show the methods for establishing the stable CPCH using the PC_P described with reference to FIGS. 22 to 26, performed by the UE and the UTRAN, respectively.

Referring to FIG. 28A, the UE determines in step 2801 whether CD_ICH and CA_ICH have been received from the UTRAN. Upon failure to receive the CD_ICH and CA_ICH in step 2801, the UE transmits an error occurrence system response to the upper layer to end the CPCH access procedure and the error recovery process in step 2821. "Failure to receive the CD-ICH and CA_ICH" includes one case where an ACK for the CD-ICH is not received although the CA-ICH is received, and another case where the CA-ICH is not received from the UTRAN within a predetermined time. The "predetermined time" refers to a time previously set when starting the CPCH access procedure, and a timer can be used in setting the time. Otherwise, if it is determined in step 2801 that the CD/CA_ICH have been received and ACK is detected from the CD_ICH, the UE analyzes the channel assignment message transmitted from the UTRAN in step 2802. After analyzing the at channel assignment message in step 2802, the UE proceeds to step 2803: where the UB determines an uplink scrambling code of the PCPCH message part, an uplink channelization code, and a channelization code for the downlink channel used for controlling the uplink CPCH according to the analyzed channel assignment message.

Thereafter, in step 2804, the UE constructs the PC_P according to the slot type using the uplink scrambling code and the uplink channelization code set in step 2803. This embodiment of the present invention increases stability and reliability of the CPCH using the PCP. It is assumed that the length or timing information of the PC_P slot is always set to 8 slots.

In step 2805, the UE inserts a channel assignment confirmation message in the PC_P in order to verify the channel assignment message received from the UTRAN. The UE can insert the channel assignment confirmation message in the PC_P in the methods described with reference to FIGS. 22 to 25. In the method of FIG. 22, a pilot bit of the PC_P is multiplied by the channel assignment message or the signature number received at the UE before transmission. In the method of FIG. 23, the PC_P slot is multiplied by the channel assignment message or the signature number received et the UE by the chip level before transmission. In the method of FIG. 24, the PC_P is channelized with a channelization code corresponding to the channel assignment message or the signature number received at the UE before transmission. In the method of FIG. 25, the PC_P is spread with a scrambling code corresponding to the channel assignment message or the signature received at the UE and then transmitted to the UTRAN. When transmitting the channel assignment message using the multi-signature, the UTRAN uses the channel assignment message for the CPCH allocated to the UE. When allocating the CPCH using one signature, the UTRAN uses the signature for the channel assignment message.

Thereafter, in step 2806, the UE transmits the PC_P generated in step 2805 to the UTRAN, and starts receiving the DL_DPCH transmitted from the UTRAN in step 2807. In addition, the UE measures receiving power of the downlink using the pilot field of the DL_DPCH and inserts a command for controlling transmission power of the downlink in a power control command part of the PC_P according the measured receiving power.

While transmitting the PC_P to the UTRAN and receiving the DL_DPCH, the UE determines in step 2808 whether an error signal for the channel assignment message analyzed by the UE or a specific PCB (Power Control Bit) pattern requiring release of the CPCH has been received from the UTRAN. If it is determined in step 2808 that the analyzed channel assignment message has an error or the PCB pattern indicates a CPCH release, the UE ends transmission of the PC_P in step 2831 and transmits a PCPCH transmission stop status response to the upper: layer and performs the error recovery process, in step 2832.

However, if it is determined in step 2808 that the error signal for the channel assignment message or the specific PCB pattern is not received from the UTRAN, the UE constructs the PCPCH message part according to the analyzed channel assignment message in step 2809.

Continuing at step 2810 of FIG. 28B, the UE starts transmitting the PCPCH message part generated in step 2809. While transmitting the PCPCH message part, the UE performs step 2811 which is identical to step 2808 of FIG. 28A. Upon receipt of an error confirmation message for the channel assignment message or a channel release request message (e.g. the PCB pattern) from the UTRAN in step 2811, the UE performs steps 2841 and 2842. The UE stops transmission of the PCPCH message part in step 2841, and transmits a PCPCH transmission stop status response to the upper layer and performs the error recovery process in step 2842. The channel release request message has two different types. The first type of channel release request message is transmitted when the UTRAN knows, after starting transmission of the PCPCH, that the presently established CPCH has collided with a CPCH of another UE due to the delay in confirming the channel assignment message for the presently established CPCH, transmitted from the UTRAN. The second type of channel release request message is transmitted when the UTRAN transmits a collision message indicating a collision with another user to a first UE which correctly uses the CPCH and a second UE starts transmission using the CPCH over which the first UE is presently communicating with the UTRAN, because the channel assignment message received at the second UE using: the CPCH from the UTRAN has an error. At any rate, upon receipt of the channel release message, the UTRAN command both the first UE which correctly uses the CPCH and the second UE which has received the channel assignment message with an error to stop using the uplink CPCH.

However, if the error signal for the channel assignment mess age or the specific PCB pattern for requesting channel release from the UTRAN is not received from the UTRAN in step 2811, the UE continuously transmits the PCPCH message part in step 2812, and determines in step 2813 whether transmission of the PCPCH message part is completed. If transmission of the PCPCH message part is not completed, the UE returns to step 2812 to continue performing the above operation. Otherwise, if transmission of the PCPCH message part is completed, the UE performs operation of step 2814.

The UE determines in step 2814 whether transmission is made in the acknowledgement mode. If transmission is not made in the acknowledgement mode, the UE ends transmission of the PCPCH message part and performs step 2817 where the UE transmits a PCPCH transmission end status response to the upper layer and ends the CPCH data transmission process. However, if transmission is made in the acknowledgement mode, the UE sets a timer for receiving ACK of the CPCH message part in step 2815. Thereafter, in step 2816, the UE monitors the forward access channel (FACH) during and after transmission of the CPCH message part, to determine whether an ACK or NAK for the CPCH message part has been received from the UTRAN. The UTRAN can transmit an ACK or NAK through the downlink channel as well as the FACH. If an ACK for the CPCH message part is not received through the FACH in step 2816, the UE determines in step 2851 whether the timer set in step 2815 has expired or not. If the timer has not expired yet in step 2815, the UE returns to step 2816 and monitors for an ACK or NAK transmitted from the UTRAN. Otherwise, if the timer has expired in step 2815, the UE transmits a PCPCH transmission fail status response to the upper layer and performs the error recovery process, in step 2852. However, upon receipt of ACK in step 2816, the UE performs step 2817 and ends transmission of the CPCH.

Now, a description of the UTRAN will be made with reference to FIGS. 29A to 29C, wherein "START" of FIG. 29A is connected to "A" of FIG. 27A.

In step 2901 of FIG. 29A, the UTRAN generates the CD/CA_ICH for transmitting ACK for the CD_P detected in step 2708 of FIG. 27A and the channel assignment message generated in step 2710. The CD/CA_ICH can be generated in the method described with reference to FIGS. 13A and 13B. In step 2902, the UTRAN transmits the CA/CD_ICH generated in step 2901, in the methods described with reference to FIGS. 14 and 15. After transmitting the CD/CA_ICH, the UTRAN generates a downlink dedicated channel for controlling transmission power of the uplink CPCH. The generated downlink dedicated channel can correspond to the uplink CPCH transmitted from the UE on a one-to-one basis. The UTRAN transmits the DL_DPCH generated in step 2903, in step 2904, and receives the PC_P transmitted from the UE and analyzes a confirmation message for the received channel assignment message in step 2905. The UTRAN determines in step 2906 whether the channel assignment conformation message transmitted from the UE is identical to the channel assignment message transmitted by the UTRAN, based on the results analyzed in the step 2905. If they are identical in step 2906, the UTRAN performs step 2907, and otherwise, proceeds to step 2921.

The UE can transmit the channel assignment message to the UTRAN using the PC_P in the methods described with reference to FIGS. 22 to 25. In the method of FIG. 22, a pilot bit of the PC_P is multiplied by the channel assignment message or the signature number received at the UE before transmission. In the method of FIG. 23, the PC_P slot is multiplied by the channel assignment message or the signature number received at the UE by the chip level before transmission. In the method of FIG. 24, the PC_P is channelized with a channelization code corresponding to the channel assignment message or the signature number received at the UE before transmission. In the method of FIG. 25, the PC_P is spread with a scrambling code corresponding to the channel assignment message or the signature received at the UE and then transmitted to the UTRAN. When transmitting the channel assignment message using the multi-signature, the UTRAN uses the channel assignment message for the CPCH allocated to the UE. When allocating the CPCH using one signature, the UTRAN uses the signature for the channel assignment message.

The UTRAN determines in step 2921 of FIG. 29B whether a CPCH corresponding to the channel assignment confirmation message received in step 2905 is used by another UE. If it is determined in step 2921 that the CPCH is not used by another UE, the UTRAN performs step 2925 where the UTRAN transmits a PCPCH transmission stop status response to the upper link and performs the error recovery process. The "error recovery process" performed by the UTRAN refers to ordering the UE to stop transmission of the CPCH by transmitting a CPCH transmission stop message to the UE through the downlink dedicated channel in use, transmitting the CPCH transmission stop message to the UE through the FACH, or continuously transmitting a specific bit pattern previously appointed with the UE. In addition, the error recovery process may include a method in which the UTRAN continuously transmits a command for decreasing transmission power of the uplink through the DL_DPCH received at the UE.

If it is determined in step 2921 that the CPCH corresponding to the channel assignment confirmation message received in step 2905 is used by another UE, the UTRAN transmits a power-down command through the DL_DPCH which is commonly used by the two UEs, in step 2922. Thereafter, in step 2923, the UTRAN releases the channel by transmitting the channel release message or the specific PCB pattern to the two UEs through the FACH. The UTRAN may use the downlink dedicated channel as well as the FACH, when transmitting the channel release message or the specific PCB pattern. After step 2923, the UTRAN stops transmitting the DL_DPCH to the UE in step 2924, and ends reception of the CPCH in step 2925.

Otherwise, if the channel confirmation message received from the UE in step 2906 is consistent with the channel assignment message allocated by the UTRAN, the UTRAN performs step 2907 where the UTRAN receives the PC_P transmitted from the UE and generates a power control command for controlling transmission power of the PCP. One object of controlling transmission power of the PC_P is to properly control initial transmission power of the uplink PCPCH transmitted from the UE. In step 2908, the UTRAN transmits the generated power control command through a power control command field of the downlink dedicated physical control channel (DL_DPCCH) out of the downlink dedicated channels generated in step 2903. The UTRAN determines in step 2909 whether reception of the PC_P is completed. If reception of the PC_P is not completed, the UTRAN returns to step 2908, and otherwise, proceeds to step 2910. Whether reception of the PCP is completed can be determined by using a timer to examine whether the 8 PC_P slots have all been received. If reception of the PC_P slots are completed in step 2909, the UTRAN starts receiving the message part of the uplink PCPCH in step 2910, and determines in step 2911 whether reception of the message part of the uplink PCPCH. If reception of the PCPCH message part is not completed, the UTRAN continuously receives the PCPCH is completed. If reception of the PCPCH message part is completed, the UTRAN determines in step 2912 of FIG. 29C whether the UE has transmitted the PCPCH in the acknowledgement transmission mode. If the UE has transmitted the PCPCH in the acknowledgement transmission mode, the UTRAN performs step 2931, and if the UE has transmitted the PCPCH not in the acknowledgement transmission mode, the UTRAN performs step 2915.

If the UE has transmitted the PCPCH in the acknowledgement transmission mode in step 2912, the UTRAN determines in step 2913 whether the message part of the received PCPCH has an error. If the received PCPCH message part has an error, the UTRAN transmits NAK through the FACH in step 2931. If the received PCPCH message part has no error, the UTRAN transmits an ACK through the FACH in step 2914 and ends reception of the CPCH in step 2915.

As described above, the UTRAN can actively allocate the CPCH requested by the UE and can reduce the time required for setting up the CPCH. In addition, it is possible to decrease a probability of a collision which may be caused when a plurality of UEs requests the CPCH, and to prevent a waste of radio resources. Furthermore, it is possible to secure stable assignment of the common packet channel through the PC_P between the UE and the UTRAN, and to provide stability in using the common packet channel.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. An uplink channel assignment method for user equipment (UE) in a CDMA (Code Division Multiple Access) communication system, comprising the steps of:
   transmitting an access preamble signal having channel information, said channel information being used to access a base station;
   receiving an access preamble acquisition indicator signal from the base station in response to the access preamble signal;
   transmitting a collision detection preamble for the reconfirmation of the right of using an uplink channel in response to the received access preamble acquisition indicator signal;
   receiving a first signal indicating acquisition of the collision detection preamble and a second signal indicating channel assignment, in response to the collision detection preamble; and
   upon receipt of the first and second signal, transmitting uplink channel data through an uplink channel assigned by the second signal.

2. The uplink channel assignment method as claimed in claim 1, wherein the channel is allocated according to a combination of a signature included in the access preamble and a signature included in the second signal, in the channel assignment step.

3. The uplink channel assignment method as claimed in claim 2, wherein the signature included in the access preamble indicates a channel characteristic desired by the user equipment (UE) and the signature included in the second indicator signal indicates assignment information of the channel which can support the channel characteristic desired by the user equipment (UE).

4. An uplink channel assignment method for a base station, in a CDMA communication system, comprising the steps of:
   receiving an access preamble signal having channel characteristic, said channel characteristic being used by a specific user equipment (UE) to access the base station;
   generating, upon receipt of the access preamble signal, an access preamble acquisition indicator signal in response to the received access preamble signal;
   transmitting the generated access preamble acquisition indicator signal;
   receiving a collision detection preamble signal from the user equipment (UE) in response to the access preamble acquisition indicator signal;
   generating a first indicator signal representing acquisition of the collision detection preamble in response to the collision detection preamble, and a second indicator signal representing assignment of the channel; and
   transmitting the generated first and second indicator signals.

5. An uplink channel assignment method as claimed in claim 4, wherein the base station further comprising the step of:
   receiving the uplink channel data through the channel which is determined according to the combination of the channel information by the access preamble signal and information in the second indicator signal.

6. A method for transmitting a message over an uplink common packet channel in a mobile station for a CDMA communication system, comprising the steps of:
   selecting a signature corresponding to a channel characteristic to be used for transmitting the message;
   generating an access preamble having the selected signature corresponding to the channel characteristic;
   transmitting the generated access preamble;
   receiving a response signal to the access preamble;
   selecting, upon receipt of the response signal, a signature used for a collision detection preamble;
   generating the collision detection preamble including the selected signature;
   transmitting the generated collision detection preamble;
   receiving a response signal to the collision detection preamble;
   receiving an channel assignment signal for a common packet channel, said assignment signal having a channel information to be used for transmitting the message; and
   transmitting the message through the assigned common packet channel.

7. The method as claimed in claim 6, wherein the message transmitting step comprises the steps of:
   transmitting the power control preamble to adjust a appropriate power level for the message; and transmitting the message.

8. A method for assigning an uplink common packet channel in a base station for a CDMA mobile communication system, comprising the steps of:
  receiving an access preamble including a signature corresponding to a data rate of the common packet channel to be used;
  generating a first response signal using the signature included in the access preamble;
  transmitting the generated first response signal;
  receiving a collision detection preamble;
  generating a second response signal using a signature corresponding to: the collision detection preamble;
  generating a channel assignment signal including a signature for assigning an available common packet channel having the data rate;
  transmitting the generated second response signal and the generated channel assignment signal;
  assigning the common packet channel using a combination of the signature corresponding to the channel assignment signal and the signature included in the access preamble; and
  receiving the message through the assigned common packet channel.

9. A method for transmitting a message through an uplink common packet channel in a mobile station for a CDMA communication system, comprising the steps of:
  determining, when a message to be transmitted through an uplink common packet channel is generated, a maximum data rate being supportable by the common packet channel;
  selecting a signature for a data rate to be used;
  generating an access preamble including the selected signature for the data rate to be used;
  transmitting the generated access preamble;
  receiving an access preamble acquisition indicator signal corresponding to the access preamble;
  selecting a signature among collision detection signatures;
  generating a collision detection preamble including the selected signature among collision detection signatures;
  transmitting the generated collision detection preamble;
  receiving a collision detection indicator signal corresponding to the collision detection preamble and a channel assignment indicator signal including a signature for designating channel assignment;
  determining an uplink common packet channel by a combination of the channel assignment indicator signal and the signature included in the access preamble; and
  transmitting the message through the determined common packet channel.

10. The method as claimed in claim 9, wherein the transmitting the collision detection preamble step comprises the step of:
  transmitting the generated collision detection preamble using a different scrambling code from a scrambling code for the access preamble.

11. The method as claimed in claim 9, wherein the determining the common packet channel step comprises the step of:
  determining a common packet channel designated by a signature included in the channel assignment indicator signal among common packet channels having a data rate corresponding to the signature included in the access preamble signal.

12. A method for assigning an uplink common packet channel in a base station for a CDMA communication system, comprising the steps of:
  receiving an access preamble including a signature corresponding to a data rate to be used by a mobile station;
  transmitting, upon receipt of the access preamble, an access preamble acquisition indicator signal including a signature corresponding to the signature in the access preamble;
  receiving a collision detection preamble after transmission of the access preamble acquisition indicator signal;
  transmitting, upon receipt of the collision detection preamble, a collision detection indicator signal and a channel assignment indicator signal including a signature for designating a channel; and
  receiving a message through the designated channel determined by the: signature in the access preamble and the channel assignment indicator signal.

13. The method as claimed in claim 12, wherein the access preamble acquisition indicator signal include information about the data rate being supportable by common packet channels.

14. The method as claimed in claim 12, wherein the access preamble acquisition indicator signal include information about the data rate and information about availability of multi-code.

15. A method for assigning an uplink common packet channel in a mobile station for a CDMA communication system, comprising the steps of:
  selecting, when a message to be transmitted through the uplink common packet channel is generated, a signature for a data rate to be used;
  generating an access preamble including the selected signature;
  transmitting the generated access preamble;
  examining, upon receipt of a channel assignment indicator signal, a signature included in the channel assignment indicator signal; and
  selecting a common packet channel corresponding to the signature included in the channel assignment indicator signal from a group of common packet channels, said group of common packet channels corresponding to the signature indicated by the access preamble.

16. A method for assigning an uplink common packet channel in a base station for a CDMA communication system, comprising the steps of:
  receiving an access preamble including a signature for a data rate to be used by a mobile station;
  selecting, when there is an available common packet channel among common packet channels having a data rate corresponding to the signature included in the access preamble, a signature corresponding to a channel number of said available common packet channel;
  generating a channel assignment indicator signal including the selected signature; and
  transmitting the generated channel assignment indicator signal.

17. A common packet channel assigning device for a mobile station in a CDMA communication system, comprising:
  an access channel transmitter for transmitting an access preamble signal having channel information, said channel information being used to access a base station;

an access preamble acquisition indicator channel receiver for receiving an access preamble acquisition indicator signal transmitted by the base station in response to the access preamble signal;

a collision detection channel transmitter for transmitting a collision detection preamble in response to the received access preamble acquisition indicator signal, said collision detection preamble being for detecting a collision;

an indicator signal channel receiver for receiving a first signal indicating acquisition of the collision detection preamble and for receiving a second signal indicating channel assignment, said first signal being transmitted by the base station in response to the collision detection preamble signal; and a common packet channel transmitter for assigning, upon receipt of the, first signal, a common packet channel according to information indicated by the second signal.

18. An uplink common packet channel assignment device for a base station in a CDMA communication system, comprising:

an access preamble channel receiver for receiving an access preamble signal, said access preamble signal having channel information, said channel information being used by a specific mobile station to access the base station;

an access preamble acquisition indicator channel transmitter for generating, upon receipt of the access preamble signal, an access preamble acquisition indicator signal in response to the received access preamble signal, and for transmitting the generated access preamble acquisition indicator signal;

a collision detection preamble channel receiver for receiving a collision detection preamble from the mobile station;

an indicator channel transmitter for generating a first indicator signal representing acquisition of the collision detection preamble in response to the collision detection preamble, for generating a second indicator signal representing assignment of the common packet channel, and for transmitting the generated first and second indicator signals; and a common packet channel receiver for receiving the common packet channel according to said channel information in the access preamble and to the second indicator signal.

19. A device for transmitting a message through an uplink common packet channel in a mobile station for a CDMA communication system, comprising:

an access channel transmitter for selecting a signature corresponding to a data rate to be used for transmitting the message, for generating an access preamble including the selected signature corresponding to the data rate, and for transmitting the generated access preamble;

an access preamble acquisition indicator channel receiver for receiving a response signal to the access preamble;

a collision detection channel transmitter for selecting, upon receipt of the response signal, a signature used for a collision detection preamble, for generating the collision detection preamble including the selected signature used for the collision detection preamble, and for transmitting the generated collision detection preamble;

an indicator channel receiver for receiving a response signal to the collision detection preamble, and a channel assignment signal for a common packet channel having the data rate to be used for transmitting the message; and a common packet channel transmitter for determining the common packet channel using the signature included in the received channel assignment signal and the signature used for the access preamble, and for transmitting the message through the assigned common packet channel.

20. A device for assigning an uplink common packet channel in a base station for a CDMA communication system, comprising:

an access channel receiver for receiving an access preamble including a signature corresponding to a data rate of the common packet channel to be used by a mobile station;

an access preamble acquisition indicator channel transmitter for generating an acquisition indicator signal using the signature included in the access preamble, and for transmitting the generated acquisition indicator signal;

a collision detection preamble channel receiver for receiving a collision detection preamble;

an indicator channel transmitter for generating an indicator signal using a signature corresponding to a signature included in the collision detection preamble, for generating a channel assignment indicator signal including a signature for assigning an available common packet channel having the data rate to be used for transmitting a message, and for transmitting the generated indicator signal and the channel assignment indicator signal; and a common packet channel receiver for assigning the common packet channel indicated by the signature included in the transmitted channel assignment indicator signal and the signature used for the access preamble, and for receiving the message through the assigned common packet channel.

21. A device for assigning an uplink common packet channel in a mobile station for a CDMA communication system, comprising:

an access preamble channel transmitter for selecting, when a message to be transmitted through an uplink common packet channel is generated, a signature for a data rate to be used, for generating an access preamble including the selected signature, and for transmitting the generated access preamble;

a channel allocation indicator channel receiver for receiving a channel assignment indicator signal; and a common packet channel transmitter for examining a signature included in the channel assignment indicator signal, and for selecting a common packet channel corresponding to the signature included in the channel assignment indicator signal among a group of the common packet channels corresponding to the signature included in the access preamble.

22. A device for assigning an uplink common packet channel in a base station for a CDMA communication system, comprising:

an access channel receiver for receiving an access preamble including a signature for a data rate to be used by a mobile station;

a channel assignment indicator channel transmitter for selecting, when there is an available common packet channel among common packet channels having a data rate corresponding to the signature included in the access preamble, a signature corresponding to a channel number of said available common packet channel, for generating a channel assignment indicator signal including the selected signature, and for transmitting the generated channel assignment indicator signal; and a common packet channel receiver for receiving a common packet charnel corresponding to the channel assignment indicator signal among the channels having the data: rate corresponding to the signature for the access preamble.

* * * * *